United States Patent [19]

Burke, Jr., deceased et al.

[11] 4,132,563

[45] Jan. 2, 1979

[54] INTRALEUCOSPHERULOID/ORGANIC COLOR PIGMENT COMPOSITIONS AND PROCESSES FOR PRODUCING SAME

[75] Inventors: Oliver W. Burke, Jr., deceased, late of Fort Lauderdale, Fla., by Norma Scala, administratrix; Victor T. Humphreys, Pompano Beach, Fla.

[73] Assignees: Marion Darrah; Joseph Y. Houghton, both of Pompano Beach, Fla.

[21] Appl. No.: 712,256

[22] Filed: Aug. 6, 1976

[51] Int. Cl.² .......................... C08K 9/02; C08K 9/04; C08K 9/10

[52] U.S. Cl. .......................... 106/308 M; 106/308 B; 106/308 Q; 106/308 F; 106/308 N; 106/308 S; 106/309; 260/42.14; 260/42.15; 260/42.16; 260/42.21; 260/42.53

[58] Field of Search ............... 260/42.21, 42.53, 42.14, 260/42.15, 42.16; 106/308 M, 308 B, 308 Q, 308 F, 308 N, 308 S

[56] References Cited

U.S. PATENT DOCUMENTS

| | | | |
|---|---|---|---|
| 2,751,369 | 6/1956 | Te Grotenhuis | 260/42.53 |
| 2,786,822 | 3/1957 | Vesce | 260/42.55 |
| 3,133,893 | 5/1964 | Newman | 260/42.21 |
| 3,423,358 | 1/1969 | Burke | 260/42.43 |
| 3,502,582 | 3/1970 | Clemens | 260/42.53 |
| 3,700,690 | 10/1972 | Burke | 260/42.55 |

Primary Examiner—James H. Derrington
Attorney, Agent, or Firm—Hall & Houghton

[57] ABSTRACT

An intraleucospheruloid/organic color pigment composition and a process for producing the same: the intraleucospheruloid/organic color pigment composition consisting essentially of (a) intraleucospheruloid pigment consisting essentially of spheruloids of essentially transparent polymer material, preferably cross-linked to essential insolubility in any physical solvent, having primary particles of an average size not exceeding 4 microns in diameter which have embedded therein particulate leuco pigment composition consisting essentially of inorganic opaque white and/or transparent white pigment material having a different refractive index from that of the polymer and primary particles of an average size not exceeding 0.2 micron in diameter; and (b) organic color pigment material consisting of organic color pigment composition having primary particles of an average size of less than 0.2 micron in diameter; said combination of (a) and (b) being in a weight ratio of from 1:100 to 100:1. The inorganic pigment material incorporated in the intraleucospheruloid pigment acts as an internal reflector of light already colored by passing through the ultra-fine organic color pigment material bonded or adsorbed on the surface thereof, to cause the intraleucospheruloid pigment to itself assume such color by internal reflection and refraction and to in addition reflect said light again through said color pigment. In the process for its production, the organic color pigment material is reduced to an average particle size of 0.2 micron or less, which is well below the normal pigmentary size range, and is then caused to be adsorbed or adhered to said intraleucospheruloid pigment by chemical or physical bonding. Cooperative features are also disclosed.

55 Claims, 7 Drawing Figures

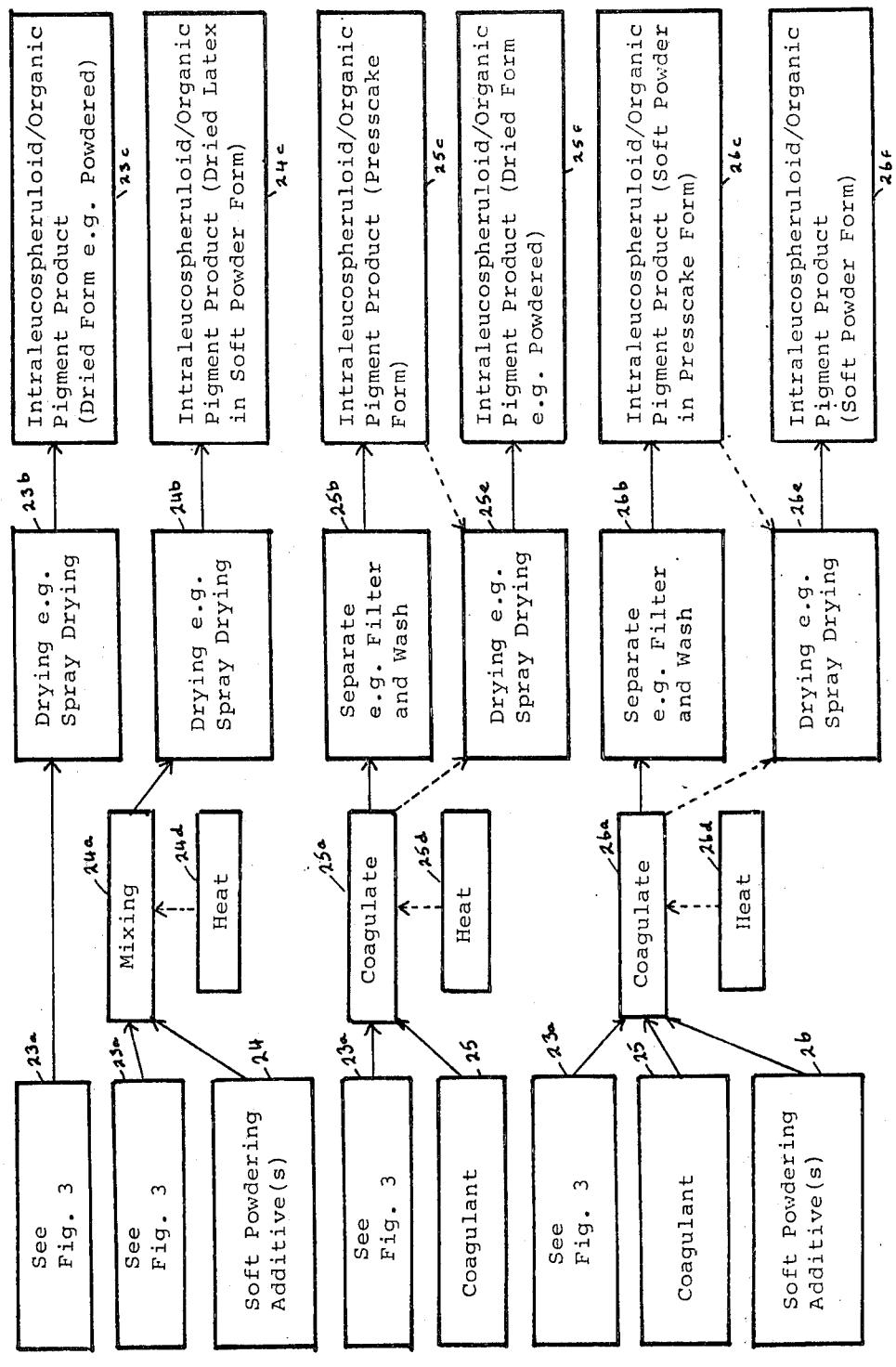

INTRALEUCOSPHERULOID/ORGANIC COLOR PIGMENT COMPOSITIONS AND PROCESSES FOR PRODUCING SAME

BACKGROUND OF THE INVENTION

1. Field of the Invention

This invention relates to colored composite pigment compositions of high refractive index and hue intensity and aims generally to improve the same and provide novel process for the production thereof.

2. Description of the Prior Art

In the prior art it has been well known to produce the so-called "Laked" or "Extended" pigment colors usually by precipitation of a soluble organic dye or pigment color onto an inert and inherently colorless or white substrate material to impart either useful pigmentary properties to an otherwise unsuitable organic or inorganic color material or to give improved physical properties to an already useful color. Such treatments and combinations included the enclosing or encapsulation of inorganic color material, such as the lead chromate yellows with a siliceous envelope or encapsulation to inhibit or reduce its toxicological properties, and also included the laking of azo and related organic pigments on such insoluble substances as alumina, Blanc Fixe and the like.

All these methods simply dilute the color portion of the resultant pigment composition and result in an essentially wet or dry dispersion of the color pigment intimately admixed with the inert or extender portion of the composition.

Such laked or extended colors are usually considerably duller than the original chromogen containing constituent and not infrequently are themselves easily disunited into the separate components of the composition. This is especially true concerning the use of mixtures of organic color pigments per se with the so-called substrate or extender inorganic pigment compounds.

SUMMARY OF THE INVENTION

We have discovered that intraleucospheruloid pigments which are per se a new and valuable inorganic-/organic pigment composition as disclosed in our co-pending application Ser. No. 712,254 filed concurrently herewith (Case 90-B herein incorporated by reference) can be combined with organic color pigment compositions by means and methods disclosed herein to give new and valuable color pigment compositions which not only have a very high degree of light stability regardless of the use to which they are put but also can provide improved physical characteristics such as storage stability, ease of handling and incorporation into vehicles such as paints, thermoplastic materials, etc. and improved color value or strength over that which has heretofore been possible or available from a conventional laking or mixing of pigmentary components by physical means.

It is believed that these effects may partially be explained by the following hypothesis: the peculiar structure of the intraleucospheruloid pigment material scatters light within and from itself yet is effectively opaque to same, because of the high relative refractive index of the inorganic pigment particles used therein; said intraleucospheruloid pigment material being essentially larger than the organic color pigment particles of less than light reflective size attracts them to form an essentially transparent yet colored deposit or outer layer embracing it by which light reaching it is colored, and then, by the high refractive index of the inorganic particles is reflected back through said outer color envelope again to reinforce its apparent color to the viewer. It is thus apparent that the higher the refractive index of the inorganic reflective particles within the intraleucospheruloid pigment, which itself has a relatively large size compared to the organic color pigment material deposited therewith, the greater will be the apparent benefit; and that, as will be understood by those skilled in the art, since the intraleucospheruloid pigment is relied upon for covering power, the expensive organic colors may be reduced to less than light reflective size, and while the spheruloids must be considerably larger than either type of pigment particles, it may advantageously be produced to approach or have the highest hiding power, usually delineated as being between about 0.2 and 0.4 micron; as detailed in "Pigment Handbook" Volume III by Temple C. Patton, published by John Wiley & Sons 1973 hereby incorporated by reference.

Such intraleucospheruloid/organic color pigment compositions may be produced to be either inert chemically or possess anionic, cationic or amphoteric characteristics, either in themselves or by incorporation within their structure of materials imparting such functionality as hereinafter disclosed.

In a preferred embodiment of the invention a process is provided for producing insoluble intraleucospheruloid pigment composition, which process comprises, in combination: (a) providing in liquid medium a particulate pigment composition consisting essentially of inorganic leuco pigment composition dispersed in said medium with 0–100% by weight of the total of surface active agent material set forth in clause (c) of this paragraph, said inorganic leuco pigment composition being essentially insoluble in water and having primary particles of an average size less than 0.2 micron in diameter and said inorganic leuco pigment material being selected from the class consisting of the following groups (1) siliceous pigment compositions selected from (i) the natural silica pigments, (ii) the precipitated silica pigments (iii) the pyrogenic silica pigments, (iv) the alkaline-earth metal silicate pigments, (v) the aluminum silicate pigments, (vi) the zinc silicate pigments, (vii) the zirconium silicate pigments and (viii) combinations of any two or more of the foregoing, (2) titanium dioxide pigment compositions, (3) pigments selected from the class consisting of the following groups (i) alkaline-earth metal carbonate and sulfate pigments, (ii) alumina pigments, (iii) hydrated aluminum oxide pigments, (iv) antimony oxide pigments, (v) zinc oxide pigments, (vi) zirconium oxide pigments and (vii) combinations of any two or more of the foregoing, and (4) combinations of any two or more members selected respectively from groups of (1), (2) and (3); said leuco pigment composition containing from 0 to an equal weight of pigment bonding agent material from the class consisting of (i) water soluble alkali metal silicates precipitated in the presence of at least a part of the leuco pigment composition, (ii) water soluble titanium compounds precipitated in the presence of at least a part of the leuco pigment composition, (iii) water soluble and dispersible aminoplasts preformed and formed in situ and adhered to at least a part of the leuco pigment composition, (iv) water soluble and dispersible phenoplasts preformed and formed in situ and adhered to at least a part of the leuco pigment composition, (v) water soluble and dispersible organic polymers having carboxyl, amine, sulfate and sulfonic acid groups and salts thereof precipitated in the presence of at least a part of the leuco pigment composition, and (vi) water soluble and dispersible organic silanes adhered to at least a part of the leuco pigment composition; and said particulate pigment composition having from 0 to an equal weight of nitrogenous material therewith, said nitrogenous material being selected from the class consisting of (i) oleophilic amines, (ii) oleophilic imines, (iii) oleophilic amine carboxylates, (iv) the oleophilic quaternary ammonium compounds, (v) water soluble polyamines, (vi) water soluble imines and polyimines, and (vii) combinations of two or more members of the foregoing; (b) forming an aqueous emulsion polymerization system consisting essentially of (1) the composition of (a), (2) the balance, if any, of 100% of the total of surface active agent material set forth in (c), (3) monomer material selected in a ratio of said monomer material to said pigment composition lying in the range of 100:1 to 1:20 by weight, said monomer material consisting essentially of ethylenically unsaturated monomer material selected from the class consisting of (i) monomer material polymerizable through a single ethylenically unsaturated group in the amount of 0% to 99.8% by weight of said monomer material and (ii) monomers polymerizable through a plurality of ethylenically unsaturaged groups in an amount, in the range of 0.2 to 100% by weight of said monomer material, sufficient to produce polymer cross-linked to essential insolubility in any physical solvent and (4) emulsion polymerization initiator in an effective amount in the range of 0.2% to 10% by weight of the said monomer material, dispersed in an aqueous medium; (c) the ratio of the total of the surface active agent material present after (b) to said particulate pigment composition and monomer material lying in the range of 2:1 to 1:40 by weight and said total of surface active agent material being selected from the class of polymeric and nonpolymeric surface active agents and combinations thereof capable of effecting emulsion polymerization in the said system of the selected ethylenically unsaturated monomer material to yield polymer particles with the inorganic pigment provided in step (a) embedded therein; (d) effecting emulsion polymerization in said system at sufficient temperatures in the range of 0 to 200° C. for sufficient time in the range of a few minutes to 24 hours to permit the polymerization to proceed far enough in the range of from 50 to 100% conversion by weight of said monomer material to produce in aqueous dispersion an intraleucospheruloid pigment consisting essentially of spheruloids of organic polymer material cross-linked to essential insolubility in any physical solvent, having primary particles of an average size not exceeding 4 microns in diameter, and having embedded therein the still smaller size particles of said particulate pigment composition; (e) providing a particulate organic color pigment combination consisting essentially of organic color pigment composition dispersed in an aqueous medium with from 0 to 150 parts by weight of surface active agent material per 100 parts by weight of said organic color pigment composition, said organic color pigment composition being essentially insoluble in water and having primary particles of an average size less than 0.2 micron in diameter, and being selected as desired from the class of such water insoluble organic pigments, which class includes the following groups: (i) the azo pigments including the condensed azo and related pigments, (ii) the triphenylmethane pigments, (iv) the anthraquinone, indigoid and related pigments such as are commonly called "vat pigments" including such newer composition as the "Perylene" colors, (v) the quinacridone pigments, (vi) the dionazine pigments, (vii) the azomethine pigments, (viii) the fluororubine pigments, (ix) the naphthindolizinedione pigments an (x) miscellaneous organic pigment compositions and combinations of the foregoing; and said surface active agent material being selected from the class consisting of the polymeric and nonpolymeric surface active agents and combinations thereof; (f) combining in a weight ratio in the range of 1:100 to 100:1, dry basis, the aqueous dispersions formed in steps (d) and (e), with from 0 to an equal weight, based on the organic color pigment present, of pigment bonding agent material, and from 0 to an equal weight, based on the organic color pigment present, of nitrogenous material, and destabilizing the combination to form an aqueous slurry of intraleucospheruloid/organic color pigment composition; said pigment bonding agent material being selected from the class consisting of (i) water soluble and dispersible aminoplasts preformed and formed in situ and adhered to at least a part of the pigment composition, (ii) water soluble and dispersible phenoplasts preformed and formed in situ and adhered to at least a part of the pigment composition, and (iii) water soluble and dispersible organic polymers having carboxyl, amine, sulfate and sulfonic acid groups and salts thereof precipitated in the presence of at least a part of said organic color pigment composition, and (iv) water soluble and dispersible organic silanes; and said nitrogenous material being selected from the class consisting of (i) oleophilic amines, (ii) oleophilic imines, (iii) oleophilic amine carboxylates and acetate, (iv) the oleophilic quaternary ammonium compounds, (v) water soluble polyamines, (vi) water soluble imines and polyimines, and (vii) combinations of two or more members of the foregoing; and (g) recovering said intraleucospheruloid/organic color pigment composition.

In this embodiment the monomer material may comprise several portions added sequentially, at least one of the portions comprising cross-linking monomer as set forth; the cross-linking monomer may consist essentially of material copolymerizable with vinyl monomers and be wholly or partially selected from the unsaturated conjugated drying oils and their acids and derivatives thereof, in the ratio to the vinyl and/or other copolymerizable monomer material of 0.2:99.8 to 20:80 by weight.

The product of this preferred embodiment is particularly desirable because we have discovered that it may be modified to be soft powdering as hereinafter disclosed whereas said technique is inapplicable to non-cross-linked oil soluble intraleucospheruloid/organic color pigment composition.

For special purposes and with less general advantage a less preferred embodiment of the invention may be employed wherein the monomer material in step (b) consists essentially of ethylenically unsaturated monomer material selected from the class consisting of monomers polymerizable through a single ethylenically unsaturated group, to produce intraleucospheruloids in step (d) consisting of leuco pigment embedded in essentially noncross-linked organic polymer material for combining with the organic color pigment in step (f).

Whether prepared by the preferred or less preferred embodiments the products may be recovered in step (g) in aqueous dispersed form, in presscake form, or in bulk-dried or in spray dried form and may be used in vehicles in which the polymer portion of the product is insoluble and when, as above noted, the polymer portions of the product are cross-linked to insolubility in any physical solvent the products may be recovered in soft powdered form and/or be used in any suitable vehicle.

Thus, as just described, the polymer portion of the intraleucospheruloid pigment of the composition of applicants' invention is insoluble in the environment of intended use, and in the preferred practice of the invention is cross-linked to insolubility in all physical solvents, although in certain instances such cross-linking may be omitted with limitation of the special utility of the product to environments in which its polymer portion is essentially insoluble. Further, in accordance with the invention, means are also provided for aiding the fixation of the intraleucospheruloid/inorganic pigment composition to the environment of intended use by physical and/or chemical bonding.

We have found it essential to reduce the inorganic pigment to an average particle size essentially below 0.2 micron and preferably of 0.2 to 0.1 micron diameter, which values are well below the optimum pigmentary range employed in conventional practice and that it is then possible to embed such ultra fine inorganic leuco pigment particles within transparent polymer spheruloids of not more than 4 microns of average particle size to thereby obtain the new and useful specular characteristics of the present invention. The reduction in organic leuco pigment size to such ultra fineness may be effected by micronizing in a liquid medium, e.g. in a ball-mill or preferably a sandmill. The liquid medium may be an aqueous solution of dispersing agent preferably selected from these known to be suitable for effecting emulsion polymerization, or it may be a liquid body of monomer material with or without such dispersing agent, and with or without a volatile organic diluent miscible with said monomer, the monomer material being suitable for polymerization in the formation of the final product.

The inorganic leuco pigment starting material may be in any conveniently available form, either as wet presscake which may or may not have been subjected to such special treatment as is proprietary to the manufacturer, e.g. surface modification or formation into an aqueous paste; or it may be any dry inorganic leuco pigment composition commercially available with or without such aforementioned surface modifications.

The polymerization of the monomer or monomers with the inorganic leuco pigment composition is carried out in the presence of sufficient emulsifier material to effect emulsion polymerization of the monomer material, and the nature and quantity of initiator and emulsifier, the degree of conversion of monomer to polymer, and the temperature of polymerization are selected to produce intraleucospheruloid pigment having primary particles of an average size not exceeding 4 microns so that the potential hiding power and specular characteristics available may be effectively utilized and retained in the finished product. The necessary dispersant or surface active agent employed in aqueous micronizing of the inorganic leuco pigment material can be as low as is consistent with reduction of the particle size to the desired level and the maintenance of its size stability.

Functional groups may be introduced either into the initial intraleucospheruloid pigment composition by selection of the monomer or monomers or may be later introduced by means of graft polymerization techniques, or by selection of the emulsifier or emulsifiers, particularly those of a polymeric character, which become incorporated into the intraleucospheruloid pigment particles.

In the case where two or more inorganic leuco pigment materials are combined in the spheruloids to produce new and novel specular characteristics, such combinations show little of the loss of refractive index or other specular characteristics associated with normal physical mixtures when two or more inorganic leuco pigments are blended together, but retain the superior characteristics of the superior component to a marked degree.

We have also found it to be essential to reduce the organic color pigment material to an average particle size essentially below 0.2 micron, and preferably below 0.02 micron, which values are well below the conventional optimum pigmentary range and that it is then possible to combine such ultra fine color particles with the intraleucospheruloid polymer spheruloids of not more than 4 microns of average particle size to thereby obtain the new and useful coloration characteristics of the present invention. The reduction in organic color pigment size to such ultra fineness may be effected by micronizing in an aqueous medium e.g. in a ball mill or preferably a sand mill, containing a surface active agent selected from the class consisting of the polymeric and nonpolymeric surface active agents and combinations thereof.

The organic color pigment starting material may be in any conveniently available form, either as wet presscake which may or may not have been subjected to such special treatment as acid pasting; or it may be any dry organic color pigment composition commercially available, or it may have been partially or completely laked as in the case of pigments from water soluble acid dyes, or it may be an aqueously dispersed paste such as is commercially available for many of the organic color pigments.

Thus, objects of the invention, severally and interdependently, are to provide new features and new combinations of steps, which contribute to produce new and improved pigment compositions and processes for production of same. Other objects and advantages of the invention will be apparent from the above general description and the following more particular descriptions of preferred embodiments thereof, which however, are illustrative but not restrictive of the invention, the scope of which is more particularly pointed out in the appended claims.

Before proceeding with the more particular descriptions, reference will be made to certain definitions of terms employed herein:

(1) Inorganic Pigments

The term "inorganic pigments" and "inorganic pigment material" as used herein designates the inorganic pigmentary materials both natural and manufactured in origin which are usually described as white or "opaque white pigments". It also includes for the purposes herein the semi opaque white pigments or "transparent white pigments" or "extender or filler pigments."

The invention is generally applicable to such inorganic pigments and is not limited to the use of any particular inorganic pigment or pigments. As illustrative but not restrictive of those that may be used and improved by this invention are the opaque white and transparent white pigments such as are referred to in the Handbook of Chemistry and Physics, Weast, 55th edition 1974–1975, published by CRC Press; herein incorporated by reference; in the 3rd edition (1973) of "The Color Index", Volume 3 published jointly by the "British Society of Dyers and Colourists" and the "American Association of Textile Chemists and Colorists", herein incorporated by reference; and in Volume 1 of "The Pigment Handbook", published by John Wiley and Sons 1973, edited by Temple C. Patton, also herein incorporated by reference.

Among the most useful of the inorganic pigments, but not restrictively, may be listed the siliceous pigments including the natural silica pigments, the precipitated silica pigments, the pyrogenic silica pigments, the alkaline earth silicate pigments, the aluminum silicate pigments, the zinc silicate pigments, the zirconium silicate pigments; the titanium dioxide pigments and pigment compositions; alkaline-earth carbonate and sulfate pigments, the alumina and hydrated aluminum oxide pigments, antimony oxide pigments, zinc oxide pigments, zirconium oxide pigments and combinations of any two or more of such pigments. Typical representatives of these inorganic pigments are set forth in the examples by way of illustration.

(2) Organic Color Pigments

The term "organic color pigments" as used herein designates the organic pigmentary materials which are colored as distinguished from water white or opaque white.

The invention is generally applicable to such organic color pigments and is not limited to the use of any particular organic color pigment. As illustrative but not restrictive of those that may be used and improved by the invention are those organic color pigments set out in "The Chemistry of Synthetic Dyes" by K. Venkataraman, Vol. V, especially Section 6, pages 314–474, Academic Press, New York, N.Y., (1971), herein incorporated by reference, which include pigments of the well known Azo class exemplified by the acetoacetarylide azo; the pyrazolone azo, the α-naphthol azo, the 2-hydroxy-3-naphtholic acid azo; the 2-hydroxy-3- naphtharylide azo and the naphtholsulfonic acid azo pigments; the triphenylmethane pigments and related compounds; the phthalocyanine pigments; the antraquinone, indigoid and related pigments; the quinacridone pigments; the dioxazine pigments; the azamethine pigments; the fluoroubine pigments; the naphthindolizinedione pigments and other miscellaneous organic pigmentary compositions; in "The Chemistry of Synthetic Dyes and Pigments" by Herbert A. Lubs, Reinhold, New York (1955), herein incorporated by reference; and in "The Color Index", 3rd Edition (1973) published jointly by the "British Society of Dyers and Colourists" and the "American Association of Textile Chemists and Colorists", also herein incorporated by reference. Typical representatives of these organic color pigments are set forth in the examples herein by way of illustration.

(3) Surface Active Agent Material

Among the dispersing and/or emulsifying agents available for use as surface active agents herein we have found that the only essential criterion for such agent is that it, or it in combination with one or more additional dispersants and/or emulsifiers which may be used, should be capable of supporting emulsion polymerization. Having regard to this criterion surface active agents or as they are more generally classified "Surfactants" (which encompasses both grinding, wetting and emulsifying agents) may be either anionic, nonionic, cationic or amphoteric; of either singular molecular structure or polymeric nature; it being understood that when two or more of such agents are employed together they must be compatible with each other. For example nonpolymeric or polymeric anionic surfactants may be combined with each other and with nonionic and/or amphoteric surfactants, polymeric or nonpolymeric; and nonpolymeric or polymeric cationic surfactants may be combined with each other or with nonionic and/or amphoteric surfactants; and amphoteric and/or nonionic surfactants may be combined with each other. Thus it is possible to use a very wide range of commercially available surface active agents for achieving the degree of grinding, the emulsion polymerization, and the production of intrachromospheruloid pigments as latices suitable for particular uses, as hereinafter exemplified, comprehensive listings of which are set out in the treatises "Detergents and Emulsifiers 1974 Annual" by John W. McCutcheon, published by John W. McCutcheon, Inc., Morristown, N.J., especially under the headings of Emulsifiers Suitable for Emulsion Polymerization, etc. and "Surface Active Agents and Detergents" Anthony N. Schwartz et al., Interscience Publishers, Inc., New York (1958), Vol. 2, pages 153–172, each of which is herein incorporated by reference.

Among the commercially available surfactants may be mentioned the anionic surfactants, e.g. carboxylic acids and their derivatives, sulfonic esters, alkanesulfonates, alkylarylsulfonates and phosphate esters; the nonionic surfactants, e.g. polyethenoxy ethers of alkylphenols, polyethenoxy ethers of alcohols and mercaptans, difunctional and poly-functional polyethenoxy esters, miscellaneous polyethenoxy esters, polyethenoxy compounds with amide and miscellaneous lingages and various polyhydroxy compounds; the cationic surfactants, e.g. the straight chain alkyl ammonium compounds, the cyclic alkylammonium compounds, the olefin derived compounds, and the quaternary compounds derived from the same; the amphoteric surfactants e.g. those derived from betaines and phenolic solutions; and the polymeric surface active agents set out in the said McCutcheon and Schwartz et al. treatises. Typical examples of representative surfactants of these classes and combinations thereof are set forth in the Examples hereinafter, it being understood that said Examples are but illustrative and not restrictive of the invention, e.g. the recently available fluorocarbon surfactants have also been found effective, especially when used in small proportions with other less expensive surfactants, for both the micronizing steps and the emulsion polymerization steps. Typical of these fluorocarbon surfactants are the "Zonyl" trade-marked fluorocarbon surfactants of the DuPont Company, such as Zonyl A or P (anionic), Zonyl C (cationic), Zonyl N (nonionic), and Zonyl B (amphoteric).

(4) Micronizing

The term "micronizing" as used herein connotes the physical reduction in particle size in a liquid medium of the leuco or color pigment materials by means of an appropriate grinding system, e.g. a ball-mill or a sand-mill, to the particle size desired in the step concerned, with the aid of a surface active system, if necessary, to assist the grinding and inhibit agglomeration of the micronized particles into aggregate particles of larger size. Both ball-mills and sand-mills or sand grinders are well known to the pigment art and commercially available. The balls in the case of a ball-mill, or the sand or like grinding material in the case of the sand-mill, are herein termed micronizing media.

(5) Monomer Materials

The monomer materials which may be used in practicing the present invention are the monomer compounds containing and emulsion polymerizable through one or more ethylenically unsaturated $>C=C<$ groups to form homopolymers, copolymers or grafted polymers to constitute the essentially transparent particles formed about the individual leuco pigment entities herein.

Such compounds containing a polymerizable through a single one of such groups produce linear polymers unless copolymerized with cross-linking monomer, i.e. monomer containing a plurality of such groups which category for the purpose of this invention, includes not only polyvinyl, polyalkyl and vinyl-allyl monomers but also the drying oil substances emulsion copolymerizable with other ethylenically unsaturated compounds.

The polymer bodies surrounding the inorganic pigment particles in accordance with this invention preferably are cross-linked to insolubility in all physical solvents, but may be insoluble only in the intended environment of use. With these criteria for guidance, the monomer materials and emulsion polymerization procedures employable may be selected by one skilled in the art from any of those available.

Among the mono-ethylenically unsaturated monomers available for preparation of the improved pigment composition are monovinyl aromatic compounds such as styrene, the methyl styrenes, the ethyl styrenes, the dimethyl styrenes, the diethyl styrenes, the isopropyl styrenes and mixed alkyl styrenes; nuclear substituted vinyl aryl compounds where the substitution is alkyl, aryl alkyl, aralkyl, cycloalkyl, alkoxy, aryloxy, chloro, fluoro, chlormethyl, fluormethyl and trifluoromethyl nuclear derivatives; halogenated derivatives of these various aromatic vinyl compounds such as the mono and dichloro styrenes; the alkyl substituted mono and dichloro styrenes; the vinyl naphthalenes, e.g. methyl vinyl naphthalene and their halogenated derivatives; the vinyl aryl acids and vinyl alkyl acids such as acrylic acid and the alpha-alkyl substituted acrylic acids such as methacrylic acid, and esters of such acids as glycidyl, methyl, ethyl, propyl, butyl, isobutyl and other esters of aliphatic alcohols; the amides of acrylic and methacrylic acid and derivatives thereof such as the methacrylamides, acrylamides, N-methylacrylamides, N-N-diethylacrylamide, N-ethylmethacrylamide, N-N-dimethylmethacrylamide, etc.; the nitriles such as acrylonitrile, methacrylonitrile, ethylacrylonitrile, chloroacrylonitrile and other nitriles; the alkyl esters of alphaethylenic aliphatic dicarboxylic acids such as diethyl fumarate and diethyl-chloro maleate; the unsaturated ketones, methyl vinyl ketone and methyl isopropenyl ketone; the vinyl pyridines; the vinyl quinolines; vinyl furans; vinyl carbazoles, the esters of vinyl alcohols such as vinyl acetate; acetylamino substituted acrylic and methacrylic acids, and their esters, methyl, ethyl, propyl- and the like such as α-acetaminoacrylate and the α-n-butyraminoacrylates, etc.; the ethers of olefinic alcohols especially the ethers of vinyl and allyl type alcohols such as vinyl ethyl ether, vinyl butyl ether, vinyl tolyl ether, divinyl ether, methyl isopropenyl ether, methallyl ethyl ether; the unsaturated aldehydes such as acrolein and methacrolein and the like; the allyl and vinyl nitrogen ring compounds such as triallylcyanurate; copolymerizable alkenyl chlorides including methallyl chloride, allyl chloride, vinyl trichloride, vinylidene chloride, 1-chloro-1-fluoro ethylene and 4-chlorobutene-1; and the vinylidines.

Among the cross-linking or polyethylenically unsaturated monomers which may be used alone or in combination with other emulsion polymerizable ethylenically unsaturated compounds, are the polyvinyl, polyallyl and vinyl-allyl compounds such as polyvinyl aromatic compounds, for example divinylbenzene, divinyltoluene, divinylxyline, divinylethylbenzene, trivinylbenzene, divinylnaphthalene, divinylmethylnaphthalenes; the vinyl esters, allyl esters and vinyl allyl esters of carboxylic and polycarboxylic acids including polymerizable ester monomers such as diallylmaleate, vinylcrotonate, allyl methacrylate, allyl acrylate, ethylene glycol dimethacrylate, divinylsuccinate, divinyladipate, vinylacrylate, vinylmethacrylate.

The copolymerizable "drying oils" which may be used as cross-linking agents include the unsaturated vegetable oils and the unsaturated fish oils which oils are capable of forming films by oxidation on exposure to air and further includes these oils in their raw state, in bodied form and/or otherwise modified, as by air blowing. The term "drying oil substances" includes (1) the drying oils, especially those containing conjugated unsaturation e.g., tung oil, citicica oil, isano oil, conjugated linseed oil, conjugated soya bean oils, fish oil, etc., (2) the air blown or bodied drying oils, whether from conjugated or non-conjugated drying oils and whether bodied by heat and/or catalytically, (3) the fatty acids including their dimers, trimers and tetramers derived from such drying or modified drying oils.

In preparing modified improved intraleucospheruloid pigment compositions by graft polymerization techniques, active sites may be provided by grafting with butadiene, isoprene, piperylene, methyl pentadiene and/or other hydrocarbon dienes and also the polar dienes such as chloroprene and cyanobutadiene.

(6) Polymerization Initiator

Examples of suitable emulsion polymerization catalysts or initiators that may be used include water soluble catalysts such as the perbonates, persulfates and perchlorates of potassium sodium and ammonia; which may be used with or without small amounts of heavy metal salts such as those of iron, cobalt, etc, with or without a reducing agent such as sodium bisulfite or metabisulfite, or the catalyst may be an inorganic peroxide such as barium peroxide, sodium peroxide, hydrogen peroxide; an aliphatic acyl peroxide such as acetyl peroxide, lauryl peroxide, stearyl peroxide; and aromatic acyl peroxide such as benzoyl peroxide, or phthaloyl peroxide; a mixed peroxide such as acetyl benzoyl peroxide, acetyl stearyl peroxide; organic aliphatic and aromatic azo compounds such as azobisisobutyronitrile and certain azo dye structures; or it may be a hydroperoxide such as cumene hydroperoxide or diisopropylbenzene hydroperoxide which is often used with a reducing agent such as tetraethylenepentamine, and ferrous sulfate as a source of iron with sodium or potassium pyrophosphate to complex the iron.

Or heat or radiation initiation systems may be used.

A mercaptan such as dodecylmercaptan may sometimes be used in small amounts as a polymerization initiator, whereas in larger amounts it serves as a polymerization modifier; or aluminum salts such as the halides; organic and inorganic acids; metal compounds of the unsaturated acids such as cobalt and manganese resinates, linoleates and maleates may be used. The catalyst system chosen is only important insofar as it affects the rate of the polymerization reaction, always taking into account that the system chosen must not react unfavorably with the inorganic pigment or pigments being used.

(7) pH Adjustment

By pH adjustment is meant the addition of either acid or base to adjust the pH for micronizing to within the desired range which may be most efficient for the purpose in question, e.g. to be compatible with the pigmentary, monomeric, and/or surfactant materials being used. Preferred additives are the organic acids such as acetic, formic, hydroxyacetic to lower the pH, and ammonium hydroxide to raise the pH. Inorganic acids and/or bases may be used provided they do not form objectionable amounts of salts which would interfere with the process or attack the equipment being used.

(8) Polymerization Vessel

By polymerization vessel is meant any suitable vessel equipped with the necessary mechanical stirrer, temperature controls, and apertures for addition of reactants prior and during the polymerization step, constructed of suitable materials such as stainless steel or preferably glass lined to avoid contamination of the polymerization ingredients.

(9) Emulsion Polymerization

By the term emulsion polymerization is meant the polymerization in aqueous medium of polymerizable ethylenically unsaturated monomer or monomers, linear or cross-linking in nature, in such a manner that the polymer formed is in such a finely divided form that it remains suspended as particles having Brownian movement.

(10) Latex

By the term latex is meant the aqueous dispersion of the intraleucospheruloid pigment composition in which the intraleucospheruloid pigment particles are so small that they are essentially non-settling, i.e. maintained in suspension by Brownian movement.

(11) Soft Powdering Agent(s)

The term soft powdering agent(s) or additive(s) as used herein connotes materials selected from the class consisting of aliphatic, cycloaliphatic and aromatic hydrocarbons and their alcohols having boiling points between 90° C. and 200° C. preferably the predominantly aliphatic hydrocarbon solvents of this class such as Solvent Naphtha, and Stoddard Solvent. Naphtha Solvent, or Solvent Naphtha is a mixture of low boiling hydrocarbons having a boiling point range of 90°-165° C. obtained in the distillation of coal tar, petroleum or shale oil, and may contain appreciable portions of benzene or its homologues. Stoddard Solvent is a petroleum distillate with a minimum flash point of 100° F., 90% distillable at 375° F. with an end point of 410° F.

In accordance with this invention, said hydrocarbon materials are preferably applied in conjunction with an oil soluble surface active agent. The oil-soluble surface active agent is selected from the class of materials extensively defined by Schwartz, Perry and Berch in their book "Surface Active Agents and Detergents", Vol. II, Interscience Publishers, Inc., New York (1958), especially at pages 244-247 and pages 597-605, herein incorporated by reference. Such useful surface active agents include the dialkyl sulfosuccinates, the mahogany sulfonates, long chain (16-18 carbon atoms) alkyl aromatic sulfonates, dialkyl naphthalene sulfonic acids, esters of higher fatty acids, higher amine salts of naphthalene sulfonic acids, lanolin, lanolin fatty acids, naphthenic acids and their salts, glycol ethers, acyclic alcohols and keto alcohols, fatty alkylol amides and the sorbitan and polyethenoxy sorbitan nonionics.

(12) Soft Powder Products

The term "soft powder" or "soft powdered" intraleucospheruloid/organic color pigment as applied to products producible by the present invention connotes the physical characteristics resulting from the treatment herein disclosed of the aqueously wet, never previously dried, cross-linked insoluble intraleucospheruloid/organic color pigment with the aforesaid soft powdering agents before drying the same to a dry pigment product, i.e. the characteristic that the soft powdered dried product has such a soft form that it is in, or readily reduced to, a fine soft powder without any extended attrition, thereby being more readily dispersible in any medium than the same product not so treated. The mechanism accounting for this characteristic is not clearly understood, but it is believed that the hydrocarbon components of the soft powdering additives, which are carried on to the surfaces of the intraleucospheruloid/organic color pigment particles by means of the oil soluble surfactant components thereof subsequently removed in the wash water, inhibit hydrogen bridging between the intraleucospheruloid/organic color pigment particles by occupying the sites at which such could occur until after the elimination from the system of the aqueous phase, and thereafter are substantially removable at a more elevated temperature when their presence is not desired in the soft powdered product.

(13) Coagulant

By coagulant we mean any additive capable of destabilizing the emulsified system under consideration, for causing coagulation of its solids content; the coagulant used will of course vary depending largely on the type of system, i.e. the type of surfactant used and/or the functionality, if any, of the intraleucospheruloid/organic polymer. For example, anionic systems may be coagulated with either acids such as acetic or formic, hydrochloric, sulfuric, alkaline-earth metal salts, zinc and aluminum and other colorless ions of heavy metals, water soluble alcohols, or water insoluble amines preferably as their water soluble salts. Cationic systems may be coagulated with water insoluble acids, preferably as the water soluble alkali metal salts thereof and/or the water soluble amine thereof, and ammonium hydroxide or water soluble alcohols. Nonionic systems are often coagulated with water soluble alcohols with or without the addition of acids. Anionic latices of intraleucospheruloid/organic color pigment compositions may also be coagulated by combining therewith cationic latices or substrate material surfaced with cationic polymer, and vice versa.

(14) Pigment Bonding Agent(s)

The inorganic pigment material may be modified either physically or chemically by the addition of incorporation of modifying agent material during either the micronizing or polymerization steps or both, as well as during the combination of the intraleucospheruloid pigment with the organic color pigment material.

Pigment bonding agents which may be used to aid fixation of the inorganic pigment to organic polymeric material may be inorganic, e.g. a water soluble alkali metal silicate or a water soluble titanium compound for example, titanium tetrachloride or oxychloride. Alternatively they may be organic, e.g. an aqueous dispersion of a water soluble organic condensation resin such as an aminoplast or a phenoplast, which may be formed in situ by sequential addition of aqueous solutions or reactants for forming such resins. By reactants which form aminoplastics or aminoplasts we mean urea, melamine, thiourea and quanidine, etc., condensed with formaldehyde, glyoxal, etc. By reactants to form phenoplasts we means phenol and/or substituted phenolic alcohols such as the cresols, xylenols and/or reorcinol, etc., condensable with formaldehyde and/or higher aldehydes such as glyoxal or furfural, etc. We use the term phenoplasts in the same manner as used by T. S. Carswell in his book entitled "Phenoplasts. Their Structure, Properties and Chemical Technology," published in 1947 by Interscience Publishers, Inc., New York, N.Y. We use the term aminoplastics in the same manner that C. P. Vale uses this term in his book entitled, "Aminoplastics," published in 1940 by Cleaver-Hume Press, Ltd., London, England.

Or a bonding agent may be a polar ethylenically unsaturated monomeric material adsorbed and/or absorbed by the inorganic material during the micronizing step.

Also the water soluble organo-silane compounds, e.g., Z6020 Silane available from Dow Chemical Company may be used.

Bonding agents which may be used to aid the substantivity of the inorganic to the organic phase of the intraleucospheruloid pigments by chemical bonding include aqueous solutions or dispersions of organic polymers depositable on the inorganic pigment material and containing carboxy, amine, sulfate, and/or sulfonic acid groups and/or salts thereof. Nitrogenous containing material such as oleophilic amines, oleophilic imines, oleophilic amine carboxylates, oleophilic quaternary ammonium compounds, water soluble polyamines, water soluble imines and combinations thereof may also be used.

(15) Nitrogenous Material

By the term "nitrogenous material" we mean organic nitrogen containing material selected from oleophilic amines such as the primary and secondary amines derived from fatty acids such as cocoanut, soya oleic and tallow such as are manufactured by Armak under the trade names "Armeens" and "Duomeens" as well as the carboxylate and acetate salts thereof e.g. "Armac" and "Duomac"; the quaternary ammonium compounds e.g. "Arquad", and the "Monaquats" which are quaternized derivatives of substituted imidazolines manufactured by Mona Industries; polyamines such as tetraethylenepentamine; the water soluble polyethylenimines such as are manufactured by Dow Chemical Company under the trade name of PEI 16, PEI 18, PEI 600; and water soluble imines and polyimines such as ethylenimine, 1, 2-propylenimine, 2, 3-butylenimine, 1, 2-butylenimine and others as may be represented by the general formula

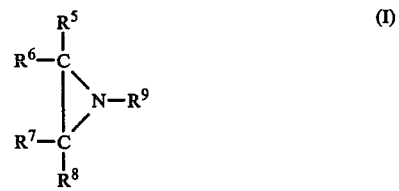

wherein $R^5$, $R^6$, $R^7$ and $R^8$ each represent hydrogen atom or an alkyl radical, and $R^9$ represents hydrogen atom, an alkyl radical, an acyl radical or a group of one of the following three formulae:

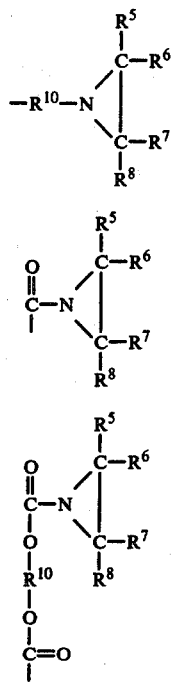

wherein $R^{10}$ is an alkylene radical.

(16) Pigment Modifying Agent

The inorganic pigment material and/or intraleucospheruloid pigment material may be modified either physically or chemically by the addition or incorporation of modifying material during or following the micronizing step. For example the modifier may be a bonding agent to aid in bonding the inorganic pigment particles to the polymer spheruloids, or to aid the fixation of the intraleucospheruloid material to a substrate material. The modifying agent may comprise one or more of these substances or compounds which can be employed, although not essential to the process, to obtain certain specific advantages or modifications to the process or products thereof. Such substances may include nitrogenous material such as water soluble or insoluble amines, imines and polyamines and polyimines, added to the inorganic pigment material during the micronizing step to render it more oleophilic, and/or water soluble or dispersible condensation resin products or the components thereof, added during the micronizing or subsequent steps.

(17) Separation by Screening

Separation by screening or conventional screening when employed in the Examples herein, connotes that the micronized inorganic pigment is washed away from the micronizing medium and the screen with diluting liquid or a part thereof.

(18) 50% Divinylbenzene

The term 50% divinylbenzene as used herein denotes the commercially available product regarded as an approximately equal mixture of divinyl and mono-vinyl materials.

(19) Microscopic Examination

The term "microscopic examination" as used in the Examples hereinafter denotes examination with an optical microscope, i.e. a Leitz "Ortholux" research microscope which is regarded as having a resolving power of 0.2 micron and a lower limit of visibility for well separated particles of 0.02 micron diameter, and average particle sizes herein set forth were determined accordingly.

In the Examples herein set forth the product from the polymerization step was determined by microscopic examination to be in spheruloids of less than 4.0 microns average diameter, and was essentially nonsettling i.e. a latex.

DESCRIPTION OF PREFERRED EMBODIMENTS

BRIEF DESCRIPTION OF DRAWINGS

In the accompanying drawings illustrative of preferred embodiments of the invention:

FIGS. 4, 5, 6 and 7 are process flow diagrams showing the procedures for isolation and drying of the intraleucospheruloid/organic color pigment composition in various forms.

GENERAL PROCEDURE

Figure 1:
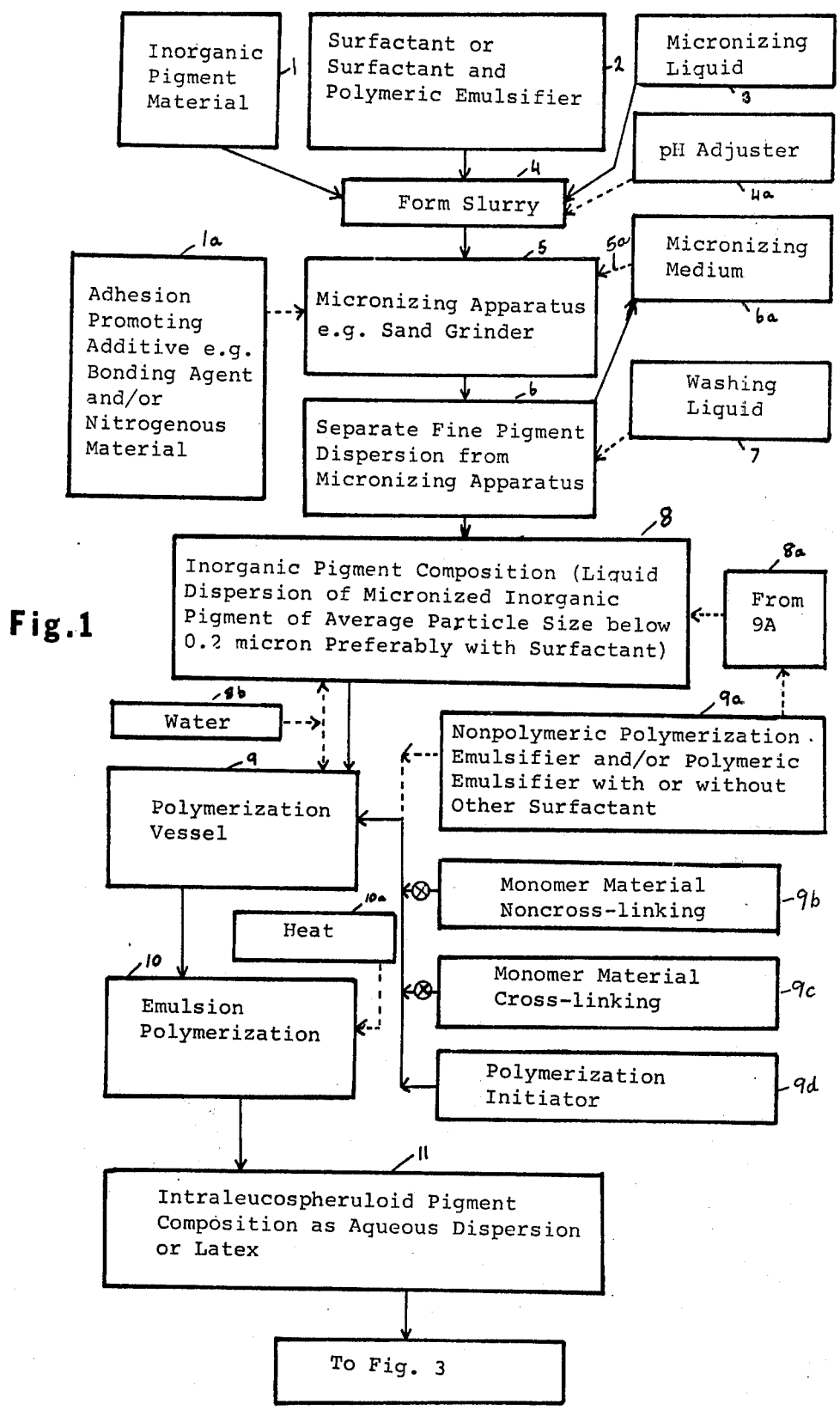
FIG. 1 is a process flow diagram of the procedure for production of the intraleucospheruloid pigment in latex and/or other forms.

The general procedure for preparing intraleucospheruloid/organic color pigment compositions in accordance with the process of this invention is illustrated in the drawings. In this procedure (FIG. 1) (a) an inorganic pigment composition 8 is first provided consisting essentially of liquid having dispersed therein micronized inorganic pigment essentially insoluble in the said liquid. When an aqueous micronizing liquid 3 is employed it comprises surface active agent material which stabilizes the dispersion of the micronized inorganic pigment in said aqueous phase, in which the inorganic pigment is so finely divided that the average particulate entities thereof are essentially below 0.2 micron in diameter. As shown in FIG. 1 this may be accomplished by charging to a micronizing apparatus 5, e.g. a ball mill or a sand mill, a slurry 4 of inorganic pigment material 1 with sufficient water 3 to facilitate the grinding and sufficient surface active agent material 2 to stabilize the dispersion so produced. The charge of slurry 4 is then micronized as at 5 until the inorganic pigment particles are so finely divided that the average particulate entities thereof have an average particle size of less than 0.2 micron and preferably between 0.2 and 0.1μ in diameter. In this aqueous micronizing process the ratio of inorganic pigment material to water to obtain efficient grinding should be in the range of 20:80 to 30:70 and the ratio of surface active agent material to water should be in the range of 5:95 to 20:80 parts by weight or even somewhat more. Applicable ratios are subject to variation depending on the particular inorganic pigment material and/or surface active agent material concerned, are not highly critical, and may be optimized empirically.

The separated inorganic pigment material composition 8, with or without added surface active agent material 8a (which may be provided at this stage if desired, especially if the dispersion is to be stored for a substantial time before further processing) is then ready for the next step of the procedure.

When a nonaqueous micronizing liquid 3 is employed, the present invention contemplates use as such liquid of a volatile readily removable organic solvent or a part or all of the ethylenically unsaturated monomer material to be employed in the polymerization step 10 with or without added volatile organic solvent miscible with the monomer material. In such instance the amount of surface active agent material 2 employed in the micronizing step 5 can be reduced to zero, or a part or all of the surface active agent or emulsifier to be used in the emulsion polymerization may be present during the micronizing step. Generally the same considerations as to proportions of liquids to solids and empirical practices apply whether the medium be aqueous or nonaqueous. Obviously, when micronizing in flammable material the temperature and the conditions of grinding, such as maintenance of an inert atmosphere and use of explosion-proof electrical equipment, must be controlled in the interests of safety. When it is desirable to employ a wash liquid 7 for removing fine pigment dispersion from the micronizing medium, it is desirable to use a washing liquid which is employed as a component in the polymerization 10. When such a nonaqueous micronizing system is employed the micronized inorganic pigment material 6 is then emulsified in 8 with the aid of water 8b and surface active agent material 8a capable of supporting emulsion polymerization to form an inorganic pigment composition 8 containing therein sufficient inorganic pigment material, surface active agent material, monomer material and water to form an emulsion polymerization composition which is charged to the polymerization vessel 9. Should it be more convenient the necessary water 8b and emulsifier material 8a may be charged directly to the polymerization vessel 9 and the nonaqueous inorganic pigment composition 8 added thereafter.

Preferably in either of the above procedures the degree of micronization is monitored during step 5 by microscopic examination of samples of the micronized slurry to determine when the necessary inorganic pigment particle size has been attained, at which time the inorganic pigment composition 8 is separated from the micronizing medium 6a, e.g. sand, which may be recycled as at 5a to the micronizing apparatus employed to carry out the micronizing step 5.

During this micronizing step 5 there may also be incorporated if desired additional adhesion or bonding agent components 1a, e.g. water soluble alkali metal silicates, aminoplasts, phenoplasts, and their components, water soluble and/or dispersible polymers and the like, and/or nitrogenous materials, and/or monomer material.

In the next step the finely divided pigment entities in said composition 8 are converted into intraleucospheruloid pigment by forming about said inorganic pigment entities, bodies of essentially transparent polymer of not over 4 microns in particle size diameter. To accomplish this step the inorganic pigment composition 8 is charged to a polymerization vessel 9 with sufficient surface active agent material 9a (additional to that supplied at 2 or at 8a) if necessary, to provide a total content of surface active agent material appropriate for the emulsion polymerization of monomer material, e.g. 9b, with the aid of an emulsion polymerization initiator 9d, which materials are also charged to the polymerization vessel. Sufficient monomer material is charged so that when polymerized to the desired conversion, usually 100% conversion, the ratio of the inorganic pigment content to the polymer content of the intraleucospheruloid pigment will be in the range of 1:100 to 20:1 (preferably 1:10 to 4:10). As indicated at 10a heat may be supplied to expedite the polymerization 10, as is well known to those skilled in the emulsion polymerization art.

By such procedures the conversion step (b) produces from the micronized inorganic pigment material and monomer material supplied, an essentially stable aqueous dispersion, i.e. latex, of intraleucospheruloid pigment 11, which is further processed as hereinafter described to produce the intraleucospheruloid/organic color pigment material.

Figure 2:
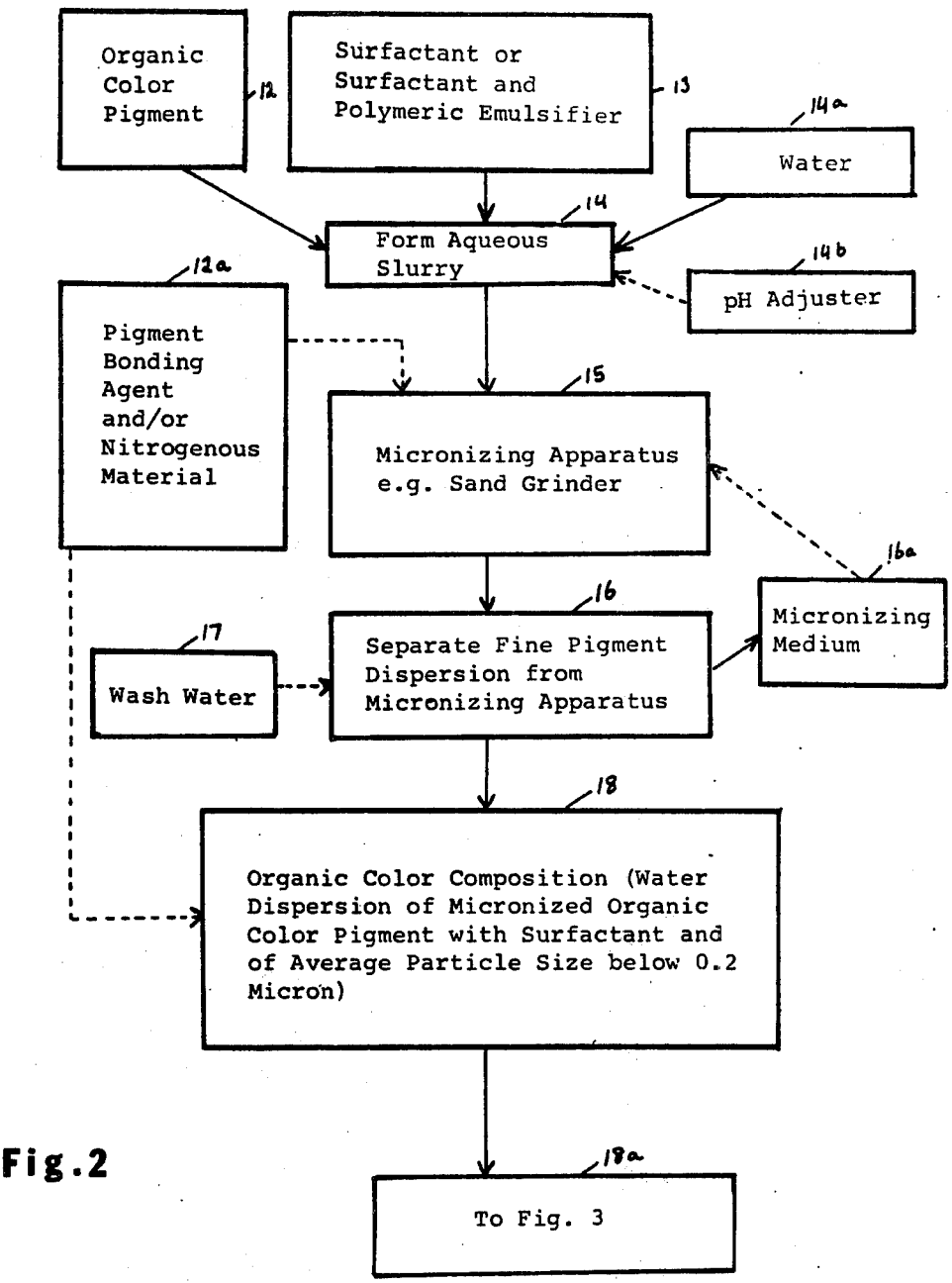
FIG. 2 is a process flow diagram of the procedure for production of the organic color pigment composition in various combinations.
Figure 3:
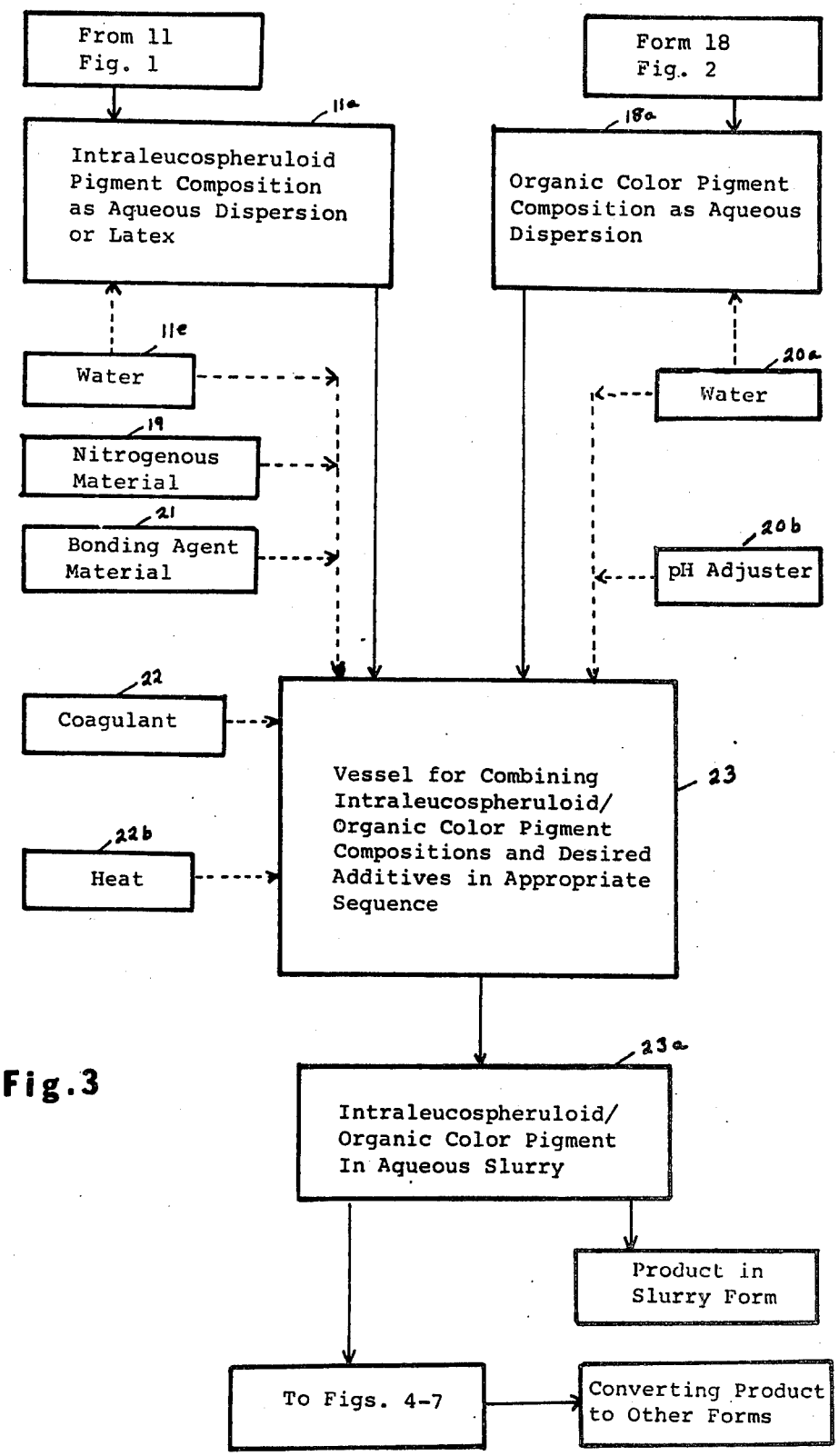
FIG. 3 is a process flow diagram of the procedure for combining the intraleucospheruloid pigment with the organic color pigment composition.

In FIG. 2 an organic color pigment composition 18 is provided consisting essentially of water having dispersed therein organic color pigment material the individual particulate entities thereof having been reduced in size until the primary particles thereof are of an average diameter less than 0.2 micron. This is accomplished as shown in FIG. 2 by charging to a micronizing apparatus 15 e.g. a sand-mill, colloid-mill or ball-mill, a slurry of organic color pigment material 12 with sufficient water 14a to facilitate the dispersion and/or grinding and sufficient surface active agent material 13 to stabilize the dispersion so produced together with sufficient micronizing or dispersion medium 16a as may be required to effect particle size reduction. The charge of slurry 14 is then subjected to micronizing as at 15 sufficient to produce a dispersion of organic color pigment material 18 within the limits and range of primary particle size as desired and required for combination with the intraleucospheruloid pigment material as shown in FIG. 3. In this micronizing process the ratio of organic color pigment material 12 to surface active agent material 13 may be from 0 to 150 parts by weight of organic pigment material employed, depending on the end use of the intraleucospheruloid/organic color pigment composition and usually will be from 0 to 5 parts for 100 parts of organic color pigment material.

During this micronizing or dispersing step 15 there may also be incorporated if desired additional chemical components such as pigment bonding agent material 12a and/or nitrogenous material should it be desired to incorporate the same during step 15.

The dispersed or micronized organic color pigment composition 15 is then separated by conventional means e.g. screening 16 from the dispersion medium to yield a product 18 ready for combination with the intraleucospheruloid pigment produced as shown in FIG. 1.

In FIG. 3 combination is effected in an agitated reaction vessel 23 of the aqueous dispersion of intraleucospheruloid pigment 11 produced in FIG. 1 and the aqueous dispersion of organic color pigment 18 produced in FIG. 2. Preferably although not essentially the intraleucospheruloid pigment composition 11a is first charged, followed by the aqueous organic color pigment dispersion 18a. In either event the aqueous dispersion of the two components is formed as shown at 23 depending on the type and tinctorial strength of the intraleucospheruloid/organic color pigment being manufactured it is understood that the combination of said components may be in a weight ratio range of from 1:100 to 100:1 dry basis. Also depending on the chemical nature of the two components 11a and 18a, that is to say the presence of reactive chemical groups therein, the intraleucospheruloid/organic color pigment composition may then be removed as at 23a with or without the assistance of heat as provided at 22b to give the intraleucospheruloid/organic color pigment in aqueous slurry form. Or additional components such as pigment bonding agent material 21, nitrogenous material 19 and/or destabilizing agent 22 may be added to the combination reaction vessel 23 with or without the aid of heat 22b to produce the product 23a.

As further shown in FIG. 3, the intraleucospheruloid/organic color pigment composition in aqueous slurry with or without the additional bonding and modifying additives 19 through 22 may be withdrawn from 23a either for use as an aqueous slurry for use in coloring aqueous systems, e.g. latex paints, paper pulp, textile printing formulations etc., or may be further processed to produce intraleucospheruloid/organic color pigment in other forms as illustrated in FIGS. 4 to 7.

As shown in FIG. 4, the intraleucospheruloid/organic color pigment slurry 23a may be converted to a dry powdered product 23c by drying, preferably spray drying, as shown at 23b. When spray drying is employed the dispersion or slurry being dried may be reduced to a very fine spray in order to obtain a finely divided spray dried product without additional processing. As shown in FIG. 5, the need for such a very fine spray drying procedure may be eliminated by combining with crosslinked intraleucospheruloid/organic color pigment slurry 23a, as at 24a, soft powdering additive(s) 24, with or without the aid of heat 24d, and drying this mixture, which will produce the intraleucospheruloid/organic color pigment in dried soft powder form 24c, requiring little or no mechanical attrition to contribute a useful powdered product. These dried intraleucospheruloid/organic color pigment products 23c and 24c are more readily shipped and stored than the intraleucospheruloid/organic color pigment slurry and may be employed for the same purposes as set forth in connection with the intraleucospheruloid/organic color pigment slurry 23a.

Referring to FIG. 6 instead of drying the intraleucopsheruloid/organic color pigment slurry directly, as in FIGS. 4 and 5, the intraleucospheruloid/organic color pigment slurry or dispersion 23a may be coagulated as at 25a with the aid of a coagulant 25 with or without the aid of heat 25d, and the coagulum of intraleucospheruloid/organic color pigment may then be separated from the serum as at 25b, e.g. by centrifuging or filtering and washing, to produce the intraleucospheruloid/organic color pigment in wet presscake form 25c. Such wet presscake form has advantages for certain uses where a product is required that is substantially free of surface active agent material and excess water; e.g. as in the flushed color industry and may also be used for the same purposes as the intraleucospheruloid/organic color pigment dispersion or slurry 23a, or the dried surface active agent material containing intraleucospheruloid/organic color pigment powders 23c and 24c. The coagulated intraleucospheruloid/organic color pigment material 25a, which may have its characteristics modified by the coagulant and/or any other modifier which may be present therein, can itself be dried as indicated by the arrow leading from 25a to 25e in FIG. 6. Where a dry intraleucospheruloid/organic color pigment essentially free of surface active agent material and/or coagulant material residues is preferred, the intraleucospheruloid/organic color pigment presscake 25c may be dried as indicated by the arrow leading from 25c to 25e to yield the product in such form as shown at 25f.

As shown in FIG. 7, the procedure of FIG. 6 may be modified by adding to the intraleucospheruloid/organic color pigment slurry or dispersion 23a when crosslinked, not only coagulant material 25, but also soft powdering additive(s) 26, which may be introduced either before or after the coagulation is effected at 26a (with or without the aid of heat 26d). The so modified coagulated intraleucospheruloid/organic color pigment slurry may then be treated in the same manner as described in connection with items 25b, 25c, 25e, and 25f as indicated by the respective corresponding items 26b, 26c, 26e and 26f in FIG. 7 and the modified products 26c and 26f will then include the soft powder advantages described in connection with FIG. 5. Such dry intraleucospheruloid/organic color pigments 26f are especially suitable for incorporation into nonaqueous systems, especially oil based paint and printing inks and the opacifying and hue modification of thermoplastic compounds.

EXAMPLES

By way of illustration of the scope of this invention but not to be interpreted as being restrictive in any manner, the following examples are given in both detailed procedural and table form:

Examples 1-19 Detailed step-wise procedures for producing intraleucospheruloid/organic color pigment compositions.

Tables 1-7 Preparations of organic color pigment dispersions.

Tables 8-14 Preparation of intraleucospheruloid pigment material using cross-linked polymer combinations.

Tables 15-20 Preparation of intraleucospheruloid/organic color pigment compositions from combinations of material produced in tables 1-7 and 8-14.

Tables 21-27 Preparation of organic color pigment dispersions.

Tables 28-34 Preparation of intraleucospheruloid pigment material using noncross-linked polymer combinations.

Tables 35-40 Preparation of intraleucospheruloid/organic color pigment compositions from intraleucospheruloid pigment material produced in Tables 21-27 and 28-34.

In the examples given herein, a particular point of distinction between the preferred cross-linked embodiments of the invention and the less preferred noncross-linked embodiments is that the cross-linking renders the spheruloids not only insoluble in physical solvents, but also nonfusible. Thus the preferred embodiments are particularly adapted for use in plastic melts before extrusion, as the infusibility assures integrity of the spheruloids under extrusion temperatures and insures against any alteration of the flow characteristics of the melt, which may be caused by softening of the spheruloids in the case of the less preferred embodiments. In addition, the cross-linking of a polymer increases its density and thus increases its refractive index to a degree. Therefore the cross-linking, as well as the choice of monomer materials used, aids in adapting the product to have the necessary difference in refractive index from that of a vehicle in which it is intended to be used, particularly when the vehicle has a density or refractive index only slightly below that of the corresponding noncross-linked spheruloids.

Whether the spheruloids are cross-linked or non-cross-linked, their uniformity in size and spheruloidal nature particularly adapt them for use in electrostatic coating systems, and by controlling the polymerization conditions as above exemplified the size of the spheruloids may be maintained within specified limits adapting them for gloss or matte finishes or for special purposes as desired.

EXAMPLE 1 (Coagulation with organic base and soft powder procedure)

Step A 100 grams of Phthalocyanine Heliogen Green A presscake (Pigment Green 7, CI 74260) containing 35% dry pigment solids were charged to a sand mill together with 150 ml. of water, 2 grams of Duponol ME, 2 grams of Tamol SN and 5 grams of Tamol 731, together with 300 volumetric parts of Ottawa sand. The pH was adjusted to 9-10 with ammonium hydroxide (28%) and the charge was milled until a representative sample under microscopic examination showed essentially all of the organic color particles to be below 0.2 micron in diameter. The microground organic color pigment composition was separated from the grinding medium by conventional means, e.g. screening, for use in step C.

Step B 100 grams of a Titanium Dioxide pigment slurry containing 60 grams solids (TiPure LW slurry — DuPont) was charged to a sand grinding apparatus together with 20 grams of glacial acetic acid and 25 grams of N-tallow trimethylene diamine (Duomeen T). 300 grams of water and sufficient grinding medium, namely Ottawa sand-, was added to ensure efficient grinding. The charge was milled until a representative sample under microscopic examination showed that essentially all the particles thereof were below 0.2 micron in diameter. After separation from the grinding medium e.g. by conventional screening, the inorganic pigment dispersion was charged to a polymerization vessel equipped for emulsion polymerization and the volume adjusted to 600 cc. with additional water as required. The system was purged with nitrogen and a mixture of 45 grams of styrene, 5 grams of dimethylaminoethylmethacrylate, and 10 grams of 50% divinylbenzene, said monomer mixture containing 1½ grams of azobisisobutyronitrile dissolved therein was added. The reaction vessel was heated to 75°-80° C. and maintained at this temperature for five hours under agitation. On cooling an intraleucospheruloid pigment was obtained which under microscopic examination shows essentially all its primary particles to be composed of spheruloids below 0.5 micron in size.

Step C

The intraleucospheruloid pigment dispersion produced in step B above was placed in a reaction vessel equipped with temperature controls and means for producing turbulent agitation and the volume adjusted to 1500 ml. with water. With continuous stirring 10 ml. of a 10% aqueous solution of tetraethylenepentamine were added followed by the organic color pigment composition produced in step A. The addition was made slowly at ambient temperature to allow reaction to take place between the anionic component material (step A) and the cationic component material (step B). When the addition of A to B was completed the pH was adjusted to between 8.5 and 9.0 with dilute ammonium hydroxide solution and the reaction stirred for 10 to 15 minutes. 25 ml. of a 33% solution of Aerosol OT in Solvesso 140 were then run in and the charge heated with turbulent agitation to 75°-80° C. during 2-3 hours and held at that temperature for 4 hours. The charge was then filtered and washed to yield an intensely colored bright green intraleucospheruloid/organic pigment composition. A portion of this product, retained in a wet presscake form, was suitable for use in aqueous systems. A portion of the presscake, oven dried, (spray drying could be substituted) yielded the pigment composition in soft powder form which was useful for coloration of nonaqueous systems such as oil based paints, thermoplastics and related fields. Microscopic examination of the intraleucospheruloid/organic pigment composition showed no separation of the components, that is to say all particles were evenly colored green and appeared as individual color pigment entities.

EXAMPLE 2 (Limited micronizing of inorganic pigment material)

The procedures given in Example 1 were followed with the exception that in step B the micronizing of the inorganic pigment composition was continued only until microscopic examination revealed that all particulate inorganic material was essentially within the range of 0.1 to 0.2 micron in diameter. This product was satisfactory.

EXAMPLE 3 (Sequential addition of monomer material to polymerization step)

The procedures given in Example 1 were followed with the exception that in step B the monomer material was sequentially added; the first 35 gram portion being styrene and dimethylaminoethylmethacrylate, added at the start of the polymerization, the second 15 grams being styrene, added 4 hours from the start of the polymerization i.e. after the reaction temperature of 75°-80° C. had been reached and the final 10 grams of 50% divinylbenzene being added 4 hours later; the reaction was terminated 4 hours after the last addition of monomer material. This product was also satisfactory.

EXAMPLE 4 (Coagulation by means of anionic/cationic reaction)

Step A

An organic color pigment dispersion of Vat Red 29 was prepared according to the procedure hereinafter outlined in Table 6-1, for use in step C.

Step B 60 grams of a titanium dioxide pigment TiPure R900 was charged to a ball mill together with 300 ml. of water, sufficient grinding medium to grind the charge and 10 grams of Monaquat TIBC (a substituted imidazoline quaternized with benzyl chloride). The charge was ball-milled for 24 hours during which period 20 grams of titanium tetrachloride were slowly introduced, maintaining the temperature of the charge below 20° C. by means of external cooling. Microscopic examination of a representative sample at the end of this period showed no particulate inorganic pigment material greater than 0.2 micron in diameter.

The inorganic pigment suspension was discharged into a polymerization reaction vessel equipped with temperature controls, external heating means and apparatus for inducing turbulent agitation and diluted to 500 ml. volume with water containing 20 grams of Duomeen T and sufficient acetic acid to dissolve same and adjust the pH of the total charge to between 4.5 and 5.0. 50 grams of a monomer solution containing 40 grams of styrene and 10 grams of 50% divinylbenzene were added together with 3.0 grams of potassium persulfate dissolved in 50 ml. of water and 1.5 grams of sodium bisulfite dissolved in 50 ml. of water. The system was purged with nitrogen and heated to 65°-70° C. and held at this temperature for 4 hours to produce the intraleucospheruloid pigment composition.

Step C

The intraleucospheruloid pigment composition produced in step B was charged to a reaction vessel equipped with temperature controls and means for producing turbulent agitation of the volume adjusted to 1500-2000 ml. with water. The organic color pigment composition produced in step A was run in slowly at ambient temperature to allow reaction to take place between the anionic component material (step A) and the cationic component (Step B). When the addition of A to B was completed the intraleucospheruloid/red organic pigment composition had coagulated and the pH was adjusted to between 7.0 and 8.0 with dilute ammonium or sodium hydroxide solution. The isolation procedure of Example 1 was then followed to yield a bright red intraleucospheruloid/organic color pigment composition in presscake form, having similar advantages.

EXAMPLE 5 (Inorganic pigment coground with monomer and soft powder procedure)

Step A 40 grams of Benzidine Yellow (Pigment Yellow 12, CI 21090) were charged to a sand mill together with 20 grams of styrene/methacrylic acid/acrylonitrile copolymer, ammonium salt ratio 25/65/10, and 2 grams of Tamol SN (condensed naphthalene sulfonic acid, sodium salt), 10 ml. of 25% ammonium hydroxide, 300 ml. of water and 300 volumetric parts of a grinding media, namely Ottawa sand. The charge was milled until a representative sample under microscopic examination showed essentially all of the color particles to be below 0.2 micron in diameter. The microground organic color pigment composition was separated from the grinding medium by conventional means, i.e. screening, for use in step C.

Step B 100 grams of a Titanium Dioxide pigment slurry containing 60 grams solids (TiPure LW slurry — DuPont) was charged to a sand grinding apparatus together with 20 grams of 4-vinylpyridine copolymer, 10 grams of glacial acetic acid and 20 grams of Triton X 400 (stearyl dimethyl benzyl ammonium chloride 85% active). 200 grams of water and 300 volumetric parts of Ottawa sand were added and the charge milled for 5 hours. At that point 20 grams of diethylaminoethylmethacrylate were added and the milling continued for a further 35 hours at which time a representative sample under microscopic examination showed essentially all of the inorganic pigment particles to be below 0.1 micron in diameter. After separation from the grinding medium e.g. by conventional screening the inorganic pigment dispersion was charged to a polymerization vessel equipped for emulsion polymerization and the volume adjusted to 600 ml. with additional water as required. The system was purged with nitrogen and a mixture of 60 grams of methylmethacrylate, 10 grams of cyclohexylmethacrylate and 10 grams of ethyleneglycoldimethacrylate added. The temperature was raised with agitation to 45° C. at which point 3 grams of cumene hydroperoxide were run in and the heating continued to 75°–80° C. and the reaction held within this range for 8 hours. On cooling a white intraleucospheruloid latex was obtained which under microscopic examination showed all of its primary particles to be essentially below 0.2 micron in diameter.

Step C

The product of step B was placed in a reaction vessel equipped with temperature controls and means for producing turbulent agitation and the volume adjusted to 1500 ml. with water. With continuous stirring 10 ml. of a 10% aqueous solution of tetraethylenepentamine were added followed by the organic pigment composition produced in step A. The addition was made slowly at ambient temperature to allow reaction to take place between the anionic polymeric surface active agent of the product of step A and the cationic polymeric surface active agent of the product of step C. When the addition of A to B was completed the pH was adjusted to about 7 with dilute ammonium hydroxide and the reaction stirred for 10 minutes. At this point 40 ml. of a 10% solution of sorbitan monolaurate dissolved in Solvent Naphtha was run in and the reaction heated to 75°–80° C. during 1 hour, and held within this range for 4–5 hours. The coagulum was separated from the serum by conventional filtration, washing and drying, to yield a bright yellow intraleucospheruloid/organic color pigment in soft powder form suitable for use in oleophilic and thermoplastic systems.

EXAMPLE 6 (Soft powder procedure, spray dried product)

The procedure of Example 5 was repeated with the exception that in place of the 10% solution of sorbitan monolaurate in Solvent Naphtha, was used 35 ml. of a 20% solution of diamyl sodium sulfosuccinate dissolved in Solvesso 140, and that after heating, the product was spray dried to give the intraleucospheruloid/organic color pigment in spray dried soft powder form, having utility as in Example 5.

EXAMPLE 7 (Coagulation with organic base and soft powder procedure)

The procedure of Example 1 was followed with the exception that in place of the 25 ml. of Aerosol OT in Solvesso 140 was used 45 ml. of a 10% solution of polyethylene sorbitan monolaurate dissolved in Solvent Naphtha. A very soft green intraleucospheruloid/organic color pigment resulted on drying, of like utility.

EXAMPLE 8 (Coagulation with organic water soluble coagulants)

An intraleucospheruloid/organic color pigment composition was produced by combining in a reaction vessel the organic color pigment composition produced in Table 1, Example 4, with the intraleucospheruloid pigment composition produced in Table 9, Example 3. The volume of the mixture was adjusted to 2000 ml. with water and coagulation effected by the addition with good agitation of a solution of 30 grams of sodium lauryl sulfate in 200 ml. of water slowly run in together with dilute ammonium hydroxide solution to adjust the pH at the end of the addition to 6.5 to 7.0. The reaction mixture was then heated to 75° C. during 1 hour and the serum separated from the coagulum by filtration. The product was in part retained as a bright yellow presscake useful for coloring aqueous based systems, and in part further processed by drying and grinding to yield the intraleucospheruloid/organic color pigment in a form suitable for use in oil based and thermoplastic systems.

EXAMPLE 9 (Coagulation with polymeric coagulant)

The procedure of the preceding Example was followed with the exception that in place of the 30 grams of sodium lauryl sulfate solution was used 30 grams of a copolymer of styrene, methacrylic acid and acrylonitrile, ratio 25/60/10 as the ammonium salt; and that there was also added after coagulation, 40 ml. of a 20% solution of ditertiary-octyl sodium sulfosuccinate dissolved in Stoddard Solvent. On spray drying, a bright yellow soft powdered intrachromospheruloid/organic color pigment was obtained, of like utility.

EXAMPLE 10 (Grinding organic color with aminoplast)

An intraleucospheruloid/organic color pigment composition was produced by combining in a reaction vessel the organic color pigment produced in Table 3, Example 5, with the intraleucospheruloid pigment composition produced in Table 8, Example 3, together with 1000 ml. of water, with the exception that to the micronizing step A of the Pigment Red 122 was also added 20 grams of a primary condensation resin produced from the aqueous acidic reaction of 1 mole of melamine with 1½ moles of formaldehyde. The combination of intraleucospheruloid pigment, resin, and organic color pigment was heated to 85°–90° C. and held at this temperature for 5 hours to effect insolubilization of the resin and facilitate the bonding together of the organic color pigment with the intraleucospheruloid pigment. The product was spray dried to give a deep red intraleucospheruloid/organic color pigment composition containing reactive condensation resin products therein, useful for forming textile printing pastes.

EXAMPLE 11 (Grinding organic color with water soluble imines)

The procedure of the preceding Example was followed with the exception that in place of the condensation resin added to step A, was added 40 grams of a water soluble polyethylenimine, PEI 600 (manufactured by Dow) to yield an intraleucospheruloid/organic color pigment containing polyethylenimine incorporated therein and having increased affinity for cellulosic materials, glass, and other printing surface, to which it may be applied in a suitable vehicle.

EXAMPLE 12 (Coagulation with amine acetate)

The procedure given in Table 17, Example 4, was followed with the exception that coagulation was effected by the addition of a solution of 25 parts of Armac T (N-tallow trimethlene acetate) to yield a soft oleophilic bright red intraleucospheruloid/organic color pigment composition, of like utility.

EXAMPLE 13 (Coagulation with water soluble imine)

The procedure of the preceding Example was followed with the exception that in place of the Armac T solution, was added 30 grams of a water soluble polyethylenimine, PEI 18 (manufactured by Dow) to yield a bright red intraleucospheruloid/organic color pigment composition having a affinity for cellulosic materials, and useful accordingly.

EXAMPLE 14 (Coagulation with organic compounds)

The procedure of Table 17, Example 5, was followed with the exception that coagulation was effected by the addition of a solution of 30 grams of a copolymer of styrene/methacrylic acid/acrylonitrile, ratio 25/65/10, as the ammonium salt). A deep red intraleucospheruloid/organic color pigment composition was obtained having affinity for cullulosic materials, and useful accordingly.

EXAMPLE 15 (Coagulation with amine compounds)

The procedure of Table 15, Example 1, was followed with the exception that coagulation was effected by the addition of 35 grams of Duomeen T (N-tallow trimethylene diacetate) in 200 ml. of 20% acetic acid solution, and that further was added 40 ml. of a 20% solution of diamyl sodium sulfosuccinate dissolved in Solvent Naphtha to produce a bright yellow oleophilic soft powdered intraleucospheruloid/organic color pigment composition, useful in textile printing.

EXAMPLE 16 (Coagulation with water soluble metal salts)

The intraleucospheruloid pigment latex produced in Table 10, Example 4, was charged to a reaction vessel equipped with stirrer and temperature controls and neutralized to a pH of 6.5 to 7 with dilute ammonium hydroxide solution. The organic color pigment dispersion produced in Table 4, Example 1, was then run in with stirring, followed by the addition of a solution of 30 grams of aluminum sulfate and 10 grams of zinc sulfate to effect coagulation of the solids. The slurry was then heated to 70° C. during 1 hour, filtered and washed free of water soluble salts to yield a bright blue intraleucospheruloid/organic color pigment composition suitable for use in aqueous based systems such as latex paints, or for flushing into oil bases systems.

EXAMPLE 17 (Coagulation of anionic systems with water soluble metal salts)

The procedure of Table 16, Example 1 was followed with the exception that coagulation was effected by the addition of a solution of 35 grams of calcium chloride dissolved in 200 grams of water. Following filtration and washing, an orange presscake was obtained, suitable for coloration of paper in the beater.

EXAMPLE 18 (Coagulation of anionic systems with water soluble metal salts)

The procedure of Table 18, Example 1 was followed with the exception that instead of spray drying the latex, it was coagulated by the addition of 40 grams of zinc acetate dissolved in 200 grams of water, following which the slurry was acidified to a pH of 6 with acetic acid and 40 ml. of a 10% solution of polyethylene sorbitan monolaurate dissolved in Solvesso 140 added. The mixture was then heated to 75°–80° C., and held at this temperature range for 4–5 hours. On filtering, washing and drying an extremely soft bright blue intraleucospheruloid/organic color pigment was obtained, which was readily dispersible in oil based vehicles for coating.

EXAMPLE 19 (Micronizing the inorganic pigment in nonaqueous systems)

The procedure of Example 1 was followed with the exception that step B was practiced as follows:

50 grams of a dry Titanium Dioxide pigment (TiPure R900 — DuPont) were charged to a sand grinding apparatus equipped with means for blanketing the charge with an inert gas, namely nitrogen, and explosion proof electrical fittings, together with 120 grams of styrene, 40 grams of methylmethacrylate, 10 grams of dimethylaminoethylmethacrylate and 20 grams of 50% divinylbenzene, and sufficient grinding medium, namely Ottawa sand to ensure efficient grinding. The charge was milled until a representative sample under microscopic examination showed that essentially all the inorganic pigment particles thereof were below 0.2 micron in diameter. After separation from the grinding medium by conventional screening, the inorganic pigment dispersion in the monomer material was charged to a polymerization vessel equipped for emulsion polymerization containing therein a solution of 80 grams of N-tallow trimethylene diamine diacetate in 600 ml. of water together with sufficient acetic acid to adjust the pH to around 5.0. The addition of the inorganic pigment dispersion in the monomer was made slowly with agitation to ensure complete emulsification of the monomer dispersion. After the addition was completed, the emulsion polymerization vessel was heated with continuing agitation to 45°–50° C. at which point 4 grams of cumene hydroperoxide were introduced. The heating was continued to 75°–80° C. and the polymerization reaction held at this temperature for 7–8 hours.

The product of step B was combined with the product of Step A following the procedure given in Example 1 to produce a bright green intraleucospheruloid/organic pigment in soft powder form, generally useful as a pigment.

The following tabular Examples further exemplify the application of the procedures hereinabove set forth, give the proportions of ingredients in grams, in the order of their addition and the order of the processing operations, as well as the nature of the products produced thereby.

In the Examples, materials designated by chemical name under "Trade Name" are of commercial grade; those designated by proprietary name thereunder are further identified therewith.

TABLES 1–7

Preparation of Aqueous Dispersions of Organic Color Pigment Compositions

TABLE 1
Preparation of Aqueous Dispersions of Organic Color Pigment Compositions
(parts by weight)

| Example No. 1- | | 1 | 2 | 3 | 4 | 5 |
|---|---|---|---|---|---|---|
| A. | Dispersion and/or Micronizing Step | | | | | |
| 1. | Pigment Class Trade Name | Azo Permagan Yellow | Azo Benzedine Yellow | Vat Yellow GC | Azamethine Irgazin Yellow 2GLT | Azamethine Irgazin Yellow 3RLT |
| | Color Index Name | Yellow 14 | Yellow 12 | Yellow 2 | Yellow 109 | Yellow 110 |
| | Color Index Number | 21095 | 21090 | 67300 | — | — |
| | Pigment, dry basis | 25 | 25* | 30 | 25 | 25 |
| 2. | Surface Active Agent Material | | | | | |
| | Duponol ME[1] | 5 | — | — | — | 2 |
| | Tamol SN[2] | 2 | — | — | — | 2 |
| | Duomeen T[3] | — | 10 | — | 10 | — |
| | Triton X 305[4] | — | — | 10 | — | — |
| | Tamol 731[5] | — | — | — | — | 5 |
| | Acetic Acid | — | 5 | — | 5 | — |
| | Ammonium Hydroxide 28% | 5 | — | 5 | — | 5 |
| 3. | Water | | | | | |
| | Quantity | 213 | 210 | 205 | 210 | 211 |
| 4. | Dispersing or Micronizing Step | | | | | |
| | Method | Sand | Sand | Sand | Ball | Sand |
| | Time, hours, approx. | 48 | 48 | 48 | 60 | 48 |
| | Temperature °C. | 28 | 28 | 28 | 28 | 28 |
| | Average particle size, Diameter (microns) | <0.2 | <0.2 | <0.02 | <0.2 | <0.2 |
| 5. | Separation | | | | | |
| | Screening (X) | X | X | X | X | X |
| 6. | Water Dilution | 200 | 200 | 200 | 200 | 200 |
| 7. | Yield - Aqueous Pigment Dispersion | 450 | 450 | 450 | 450 | 450 |

*used as wet presscake material
[1] sodium lauryl sulfate (100% active)
[2] sodium salt of condensed napthalene sulfonic acid
[3] N-tallow trimethylene diamine (85% active)
[4] octylphenoxy polyethoxy ethanol (70% active)
[5] sodium salt of polymeric carboxylic acid (100% active)

TABLE 2
Preparation of Aqueous Dispersions of Organic Color Pigment Compositions
(parts by weight)

| Example No. 2- | | 1 | 2 | 3 | 4 | 5 |
|---|---|---|---|---|---|---|
| A. | Dispersion and/or Micronizing Step | | | | | |
| 1. | Pigment Class Trade Name | Vat Brilliant Orange RK | Vat Brilliant Orange GR | Azo Permanent Orange Toner | Azamethine Irgazin Orange RLT | Azamethine Irgazin Yellow 3RLT |
| | Color Index Name | Orange 3 | Orange 7 | Orange 5 | Orange 42 | Yellow 110 |
| | Color Index Number | 59300 | 71105 | 12075 | — | — |
| | Pigment, dry basis | 30* | 30* | 20 | 25 | 25 |
| 2. | Surface Active Agent Material | | | | | |
| | Aerosol 22[1] | 10 | — | — | — | 10 |
| | Blancol[2] | 2 | — | — | — | 2 |
| | Gafax RE 870[3] | — | 15 | — | — | — |
| | Triton X 405[4] | — | — | 20 | — | — |
| | Triton X 400[5] | — | — | — | 20 | — |
| | Acetic Acid | — | — | — | 10 | — |
| | Ammonium Hydroxide 28% | 5 | 15 | — | — | 5 |
| 3. | Water | | | | | |
| | Quantity | 203 | 190 | 210 | 195 | 208 |
| 4. | Dispersing or Micronizing Step | | | | | |
| | Method | Sand | Sand | Ball | Sand | Sand |
| | Time, hours, approx. | 48 | 48 | 60 | 48 | 48 |
| | Temperature °C. | 28 | 28 | 28 | 28 | 28 |
| | Average particle size, Diameter (microns) | <0.2 | <0.02 | <0.2 | <0.2 | <0.2 |
| 5. | Separation | | | | | |
| | Screening (X) | X | X | X | X | X |
| 6. | Water Dilution | 200 | 200 | 200 | 200 | 200 |
| 7. | Yield Aqueous Pigment Dispersion | 450 | 450 | 450 | 450 | 450 |

*used as wet presscake material
[1] tetrasodium N-(1,2-dicarboxyethyl)-n-octadecyl sulfosuccinate (35% active)
[2] sodium salt of a sulfonated napthalene-formaldehyde condensate (86% active)
[3] free acid of complex organic phosphate ester (100% active)
[4] octylphenoxy polyethoxy ethanol (70% active)
[5] stearyl dimethyl benzyl ammonium chloride (82% active)

TABLE 3

Preparation of Aqueous Dispersion of Organic Color Pigment Compositions
(parts by weight)

| Example No. 3- | | 1 | 2 | 3 | 4 | 5 |
|---|---|---|---|---|---|---|
| A. | Dispersion and/or Micronizing Step | | | | | |
| 1. | Pigment Class | Azamethine | Vat | Vat | Azo | Quinacridone |
| | Trade Name | Iragazin Red 2BLT | Indanthrene Red FBBA | Indanthrene Rubine R | Pigment Carmine FFY | Magenta |
| | Color Index Name | Red 180 | Red 10 | Red 13 | Red 5 | Red 122 |
| | Color Index Number | — | 67000 | 70320 | 12490 | — |
| | Pigment, dry basis | 30 | 30* | 15* | 20 | 20* |
| 2. | Surface Active Agent Material | | | | | |
| | DACQ[1] | 20 | — | — | — | 10 |
| | Duponol ME[2] | — | — | 2 | 2 | — |
| | Surfactant QS20[3] | — | 10 | — | — | — |
| | Triton X 305[4] | 5 | 5 | — | 15 | 10 |
| | Tanaphen A 600[5] | — | — | 15 | — | — |
| | Acetic Acid | 5 | — | — | — | 5 |
| | Ammonium Hydroxide 28% | — | 15 | 5 | 5 | — |
| 3. | Water | | | | | |
| | Quantity | 190 | 190 | 213 | 208 | 205 |
| 4. | Dispersing or Micronizing Step | | | | | |
| | Method | Sand | Sand | Ball | Sand | Sand |
| | Time, hours, approx. | 48 | 48 | 60 | 48 | 48 |
| | Temperature °C. | 28 | 28 | 28 | 28 | 28 |
| | Average particle size, Diameter (microns) | <0.2 | <0.2 | <0.2 | <0.2 | <0.2 |
| 5. | Separation | | | | | |
| | Screening (X) | X | X | X | X | X |
| 6. | Water Dilution | 200 | 200 | 200 | 200 | 200 |
| 7. | Yield | | | | | |
| | Aqueous Pigment Dispersion | 450 | 450 | 450 | 450 | 450 |

*Used as wet presscake material
[1] tallow amino propyl amine quaternized with allyl chloride (100% active)
[2] sodium lauryl sulfate (100% active)
[3] complex phosphate ester (70% active)
[4] octylphenoxy polyethoxy ethanol (70% active)
[5] modified phenolic derivative (50% active)

TABLE 4

Preparation of Aqueous Dispersions of Organic Color Pigment Compositions
(parts by weight)

| Example No.4- | | 1 | 2 | 3 | 4 | 5 |
|---|---|---|---|---|---|---|
| A. | Dispersion and/or Micronizing Step | | | | | |
| 1. | Pigment Class | Phthalocyanine | Dioxazine | Vat | Vat | Triphenyl methane |
| | Trade Name | Heliogen Blue BG | Carbazole Violet | Indanthrene Blue BC | Sandothrene Blue NCD | Victoria Blue |
| | Color Index Name | Blue 15 | Violet 23 | Blue 6 | Blue 14 | Blue 1 |
| | Color Index Number | 74160 | 51319 | 69825 | 69810 | 42595 |
| | Pigment, dry basis | 25* | 20 | 30* | 30* | 20 |
| 2. | Surface Active Agent Material | | | | | |
| | Duponol ME[1] | 2 | 1 | — | — | 2 |
| | SMA Copolymer[2] | 15 | — | — | — | 15 |
| | SAMV Amphoteric Copolymer[3] | — | 15 | — | 15 | — |
| | N-group polymer[4] | — | — | 15 | — | — |
| | Zonyl FSA[5] | 1 | 1 | — | — | 1 |
| | Acetic Acid | — | — | 5 | 5 | — |
| | Ammonium Hydroxide 28% | 5 | 5 | — | — | — |
| 3. | Water, Quantity | 202 | 208 | 200 | 200 | 212 |
| 4. | Dispersing or Micronizing Step | | | | | |
| | Method | Ball | Sand | Sand | Ball | Sand |
| | Time, hours, approx. | 60 | 48 | 48 | 60 | 48 |
| | Temperature °C. | 28 | 28 | 28 | 28 | 28 |
| | Average particle size Diameter (microns) | <0.2 | <0.2 | <0.02 | <0.2 | <0.2 |
| 5. | Separation | | | | | |
| | Screening (X) | X | X | X | X | X |
| 6. | Water Dilution | 200 | 200 | 200 | 200 | 200 |
| 7. | Yield | | | | | |
| | Aqueous Pigment Dispersion | 450 | 450 | 450 | 450 | 450 |

*used as wet presscake material
[1] sodium lauryl sulfate (100% Active)
[2] copolymer of styrene, methacrylic acid and acrylonitrile, ratio 25/65/10
[3] copolymer of styrene, acrylonitrile, methacrylic acid and 4-vinylpyridine, ratio 25/10/29/36
[4] homopolymer of 4-vinylpyriidine
[5] fluorochemical surface active agent (50% active)

TABLE 5

Preparation of Aqueous Dispersions of Organic Color Pigment Compositions
(parts by weight)

| Example No. 5- | | 1 | 2 | 3 | 4 | 5 |
|---|---|---|---|---|---|---|
| A. | Dispersion and/or Micronizing Step | | | | | |
| 1. | Pigment Class | Quinacridone | Dioxazine | Vat | Vat | Misc. |
| | Trade Name | Monastral Red Y | Heliogen Violet | Perylene Red | Pink FFT | Green Gold |
| | Color Index Name | Violet 19 | Violet 23 | Red 29 | Red 1 | Green 10 |
| | Color Index Number | 46500 | 51319 | 71140 | 73340 | 12775 |
| | Pigment, dry basis | 25 | 15* | 30 | 30 | 25 |
| 2. | Surface Active Agent Material | | | | | |
| | Alipal CO 433[1] | 5 | — | — | — | 5 |
| | Triton X 405[2] | 5 | 10 | — | 15 | 5 |
| | Duomeen T[3] | — | — | 10 | — | — |
| | Zonyl FSC[4] | — | — | 1 | — | — |
| | Zonyl FSA[5] | 1 | 1 | — | — | 1 |
| | Acetic Acid | — | — | 5 | — | — |
| | Ammonium Hydroxide 28% | 5 | 5 | — | 5 | 5 |
| 3. | Water, Quantity | 209 | 219 | 204 | 200 | 209 |
| 4. | Dispersing or Micronizing Step | | | | | |
| | Method | Sand | Sand | Sand | Ball | Sand |
| | Time, hours, approx | 48 | 48 | 48 | 60 | 48 |
| | Temperature °C. | 28 | 28 | 28 | 28 | 28 |
| | Average particle size Diameter (microns) | <0.2 | <0.2 | <0.2 | <0.2 | <0.2 |
| 5. | Separation | | | | | |
| | Screening (X) | X | X | X | X | X |
| 6. | Water Dilution | 200 | 200 | 200 | 200 | 200 |
| 7. | Yield | | | | | |
| | Aqueous Pigment Dispersion | 450 | 450 | 450 | 450 | 450 |

*used as wet presscake material
[1] sodium salt of a sulfate ester of an alkylphenoxy poly(ethyleneoxy)ethanol (28% active)
[2] octylphenoxy polyethoxy ethanol (70% active)
[3] N-tallow trimethylene diamine (85% active)
[4] fluorochemical surface active agent (50% active)
[5] fluorochemical surface active agent (50% active)

TABLE 6

Preparation of Aqueous Dispersions of Organic Color Pigment Compositions
(parts by weight)

| Example No. 6- | | 1 | | 2 | |
|---|---|---|---|---|---|
| A. | Dispersion and/or Micronizing Step | | | | |
| 1. | Pigment Class | Vat | Azamethine | Phtalocyanine | Dioxazine |
| | Trade Name | Perylene Red | Irgazin Yellow 2GLT | Heliogen Blue BG | Dioxazine Violet |
| | Color Index Name | Red 29 | Yellow 109 | Blue 15 | Violet 23 |
| | Color Index Number | 71140 | — | 74160 | 51319 |
| | Pigment, dry basis | 20* | 5 | 25* | 5 |
| 2. | Surface Active Agent Material | | | | |
| | Duponol ME[1] | | 2 | | — |
| | Tamol SN[2] | | 2 | | — |
| | Tamol 731[3] | | 7 | | — |
| | Duomeen T[4] | | — | | 10 |
| | Triton X 400[5] | | — | | 5 |
| | Acetic Acid | | — | | 10 |
| | Ammonium Hydroxide 28% | | 5 | | — |
| 3. | Water, Quantity | | 209 | | 195 |
| 4. | Dispersion or Micronizing | | | | |
| | Method | | Sand | | Ball |
| | Time, hours, approx. | | 48 | | 60 |
| | Temperature °C. | | 28 | | 28 |
| | Average Particle Size Diameter (microns) | | <0.2 | | <0.2 |
| 5. | Separation | | | | |
| | Screening (X) | | X | | X |
| 6. | Water Dilution | | 200 | | 200 |
| 7. | Yield | | | | |
| | Aqueous Pigment Dispersion | | 450 | | 450 |

*used as wet presscake material
[1] sodium lauryl sulfate (100% active)
[2] sodium salt of condensed napthalene sulfonic acid
[3] sodium salt of polymeric carboxylic acid (100% active)
[4] N-tallow trimethylene diamine (85% active)
[5] stearyl dimethyl benzyl ammonium chloride (82 % active)

TABLE 7

Preparation of Aqueous Dispersions of Organic Color Pigment Compositions
(parts by weight)

| Example No. 7- | 1 | | 2 | |
|---|---|---|---|---|
| A. Dispersion and/or Micronizing Step | | | | |
| 1. Pigment Class | Phthalocyanine | Triphenylmethane | Vat | Vat |
| Trade Name | Heliogen Blue BG | Victoria Blue | Ponsol Jade Green | Yellow GC |
| Color Index Name | Blue 15 | Blue 1 | Green 1 | Yellow 2 |
| Color Index Number | 74160 | 42595 | 59825 | 67300 |
| Pigment, dry basis | 25* | 10 | 25* | 10 |
| 2. Surface Active Agent Material | | | | |
| duomeen T[1] | | 10 | | — |
| Triton X 405[2] | | 2 | | 2 |
| Polyfon H[3] | | — | | 5 |
| Tamol 731[4] | | — | | 5 |
| Zonyl FSC[5] | | 1 | | — |
| Acetic Acid | | 5 | | — |
| Ammonium Hydroxide 28% | | — | | 5 |
| 3. Water, quantity | | 347 | | 348 |
| 4. Dispersing or Micronizing Step | | | | |
| Method | | Sand | | Sand |
| Time, hours, approx | | 48 | | 48 |
| Temperature °C. | | 28 | | 28 |
| Average Primary Particle size, Diameter (microns) | | <0.02 | | <0.2 |
| 5. Separation | | | | |
| Screening (X) | | X | | X |
| 6. Water, dilution | | 200 | | 200 |
| 7. Yield Aqueous pigment dispersion | | 600 | | 600 |

*used as wet presscake material
[1] N-tallow trimethylene diamine (85% active)
[2] octylphenoxy polyethoxy ethanol (70% active)
[3] sodium lignin sulfonate (100% active)
[4] sodium salt of a polymeric carboxylic acid (100% active)
[5] fluorochemical surface active agent (50% active)

TABLES 8–14

Preparation of Intraleucospheruloid Pigment Compositions Using Cross-linked Polymer Combinations

TABLE 8

Preparation Intraleucospheruloid Pigment Compositions
(parts by weight)

| Example No. 8 | 1 | 2 | 3 | 4 | 5 |
|---|---|---|---|---|---|
| A. Dispersion and/or Micronizing Step | | | | | |
| 1. Trade Name | HiSil 233 | TiPure LW | Oncor 23A | Silene D | Excelopax zirconium silicate |
| Pigment, dry basis | 40 | 40 | 40 | 40 | 40 |
| 2. Surface Active Agent* Material | | | | | |
| Alipal CO 433[1] | 10 | 10 | 10 | — | 10 |
| SMA copolymer[2] | 10 | — | 20 | — | — |
| SAMV amphoteric copolymer[3] | — | 20 | — | — | 20 |
| N-group polymer[4] | — | — | — | 20 | — |
| Triton X405[5] | — | — | — | 20 | — |
| Acetic Acid | — | — | — | 5 | — |
| Ammonium hydroxide | 2 | 10 | 5 | — | 2 |
| 3. Water, Quantity | 288 | 270 | 275 | 265 | 278 |
| 4. Dispersing or Micronizing Step | | | | | |
| Method | Ball | Sand | Sand | Ball | Sand |
| Time, hours, approx. | 24 | 48 | 48 | 36 | 48 |
| Temperature °C. | 28 | 28 | 28 | 28 | 28 |
| Average particle size Diameter (microns) | <0.2 | 0.1–0.2 | <0.2 | <0.2 | <0.2 |
| 5. Separation | | | | | |
| Screening (X) | x | X | X | X | X |
| 6. Water, dilution | 250 | 250 | 250 | 250 | 250 |
| 7. Yield Aqueous pigment dispersion | 600 | 600 | 600 | 600 | 600 |
| B. Polymerization Step | | | | | |
| 8. Surface Active Agent* | | | | | |
| a. Quantity, type | 20[1] | 20[1] | 10[1] | 20[5] | 10[1] |
| b. Quantity, type | 20[5] | 20[5] | — | — | 10[5] |
| Water | 60 | 60 | 90 | 80 | 80 |

TABLE 8-continued

Preparation Intraleucospheruloid Pigment Compositions

| Example No. 8 | (parts by weight) | | | | |
|---|---|---|---|---|---|
| | 1 | 2 | 3 | 4 | 5 |
| 9. Monomer Material | | | | | |
| Non Crosslinking | | | | | |
| Styrene | 50 | — | 25 | — | — |
| Methylmethacrylate | — | 50 | 25 | 25 | — |
| Vinyltoluene | — | — | — | 25 | 50 |
| 9b. Monomer Material Crosslinking | | | | | |
| Divinylbenzene 50% | 10 | 10 | 10 | 10 | 10 |
| 10. Polymerization Initiator | | | | | |
| AZDN[6] | 2.5 | 2.5 | 2.5 | 2.5 | 2.5 |
| 11. Polymerization Conditions | | | | | |
| Time, hours | 5 | 6 | 5 | 6 | 5 |
| Temperature, °C. | 80 | 75 | 80 | 75 | 80 |
| Conversion | | | | | |
| Approx. 100% (X) | X | X | X | X | X |
| 12. Intraleucospheruloid Pigment Dispersion | | | | | |
| Yield | 760 | 760 | 760 | 760 | 760 |
| Latex (X) | — | X | — | — | — |

*capable of effecting emulsion polymerization
[1]sodium salt of a sulfate ester of an alkylphenoxy poly(ethyleneoxy)ethanol (28% active)
[2]copolymer of styrene, methacrylic acid and acrylonitrile, ratio 25/65/10
[3]copolymer of styrene, acrylonitrile, methacrylic acid and 4-vinylpyridine, ratio 25/10/29/36
[4]homopolymer of 4-vinylpyridine
[5]octylphenoxy polyethoxy ethanol (70% active)
[6]azobisisobutyronitrile
HiSil 233 tradename for PPG Industries precipitated silica, reinforcing grade
TiPure LW tradename for DuPont titanium dioxide pigment
Oncor 23A tradename for NL Industries antimony oxide pigment
Silene D tradename for PPG Industries precipitated silica, calcium modified
Excelopac tradename for NL Industries zirconium silicate

TABLE 9

Preparation of Intraleucospheruloid Pigment Compositions

| Example No. 9 | (parts by weight) | | | | |
|---|---|---|---|---|---|
| | 1 | 2 | 3 | 4 | 5 |
| A. Micronizing Step | | | | | |
| 1. Trade Name | TiPure LW | Unitane OR 450 | Titanox RA | TiPure R941 Slurry | Oncor 23A |
| Pigment, dry basis | 40 | 40 | 40 | 40 | 40 |
| 2. Surface Active Agent* Material | | | | | |
| Alipal CO 433[1] | 40 | 20 | — | — | 20 |
| Triton X405[2] | — | — | — | 40 | 20 |
| Monaquat TIBC[3] | — | 2 | 40 | 2 | 2 |
| Ammonium hydroxide 28% | 10 | 5 | — | 5 | 5 |
| Acetic acid | — | — | 20 | — | — |
| 3. Water, Quantity | 310 | 283 | 300 | 263 | 263 |
| 4. Dispersion or Micronizing | | | | | |
| Method | Ball | Sand | Ball | Sand | Sand |
| Time, hours, approx | 36 | 24 | 36 | 24 | 36 |
| Temperature, °C. | 28 | 28 | 28 | 28 | 28 |
| Average particle size Diameter (microns) | <0.2 | <0.2 | <0.2 | <0.1 | <0.2 |
| 5. Separation | | | | | |
| Screening (X) | X | X | X | X | X |
| 6. Water Water dilution 200 | 200 | 200 | 200 | 200 | |
| 7. Yield | | | | | |
| Aqueous Pigment Dispersion | 600 | 550 | 600 | 550 | 550 |
| B. Polymerization Step | | | | | |
| 8. Surface Active agent* | | | | | |
| a. Quantity type | 30[2] | 30[1] | 20[2] | 20[2] | 30[1] |
| b. Quantity type | — | — | — | — | 10[2] |
| Water | 60 | 60 | 80 | 70 | 50 |
| Ammonium hydroxide 28% | 10 | 10 | — | 10 | 10 |
| 9. Monomer Material | | | | | |
| Non Crosslinking | | | | | |
| Styrene | 60 | — | 60 | 40 | — |
| Methylmethacrylate | — | 70 | — | 30 | 70 |
| Dimethylaminoethylmethacrylate | 5 | 5 | — | 5 | 5 |
| 9b. Monomer Material Crosslinking | | | | | |
| Divinylbenzene 50% | 20 | — | 20 | 20 | — |
| Ethyleneglycoldimethacrylate | — | 10 | — | — | 10 |
| Oiticia Oil | 1 | 1 | — | 1 | — |
| 10. Polymerization Initiator | | | | | |
| AZDN[4] | 3 | 3 | — | 3 | — |
| Potassium persulfate | — | — | 2.5 | — | 2.5 |
| Sodium bisulfite | — | — | 1.25 | — | 1.25 |
| 11. Polymerization Conditions | | | | | |
| Time, hours | 5 | 5 | 6 | 5 | 7 |

TABLE 9-continued
Preparation of Intraleucospheruloid Pigment Compositions
(parts by weight)

| Example No. 9 | 1 | 2 | 3 | 4 | 5 |
|---|---|---|---|---|---|
| Temperature, °C. | 80 | 80 | 70 | 80 | 65 |
| Conversion, approx. 100% (X) | X | X | X | X | X |
| 12. Intraleucospheruloid Pigment Dispersion | | | | | |
| Yield | 785 | 735 | 780 | 745 | 735 |
| Latex (X) | — | — | — | X | — |

*capable of effecting emulsion polymerization
[1] sodium salt of a sulfate ester of an alkylphenoxy poly(ethyleneoxy)ethanol 28% active)
[2] octylphenoxy polyethoxy ethanol (70% active)
[3] substituted imidazoline quaternized with benzyl chloride (100% active)
[4] azobisisobutyronitrile
TiPure LW tradename for DuPont titanium dioxide pigment
Unitane OR450 tradename for American Cyanamid Corp. Titanium dioxide pigment
Titanox RA tradename for NL Industries titanium dioxide pigment
TiPure R 941 tradename for DuPont titanium dioxide pigment
Oncor 23A tradename for NL Industries antimony oxide pigment

TABLE 10
Preparation of Intraleucospheruloid Pigment Compositions
(parts by weight)

| Example 10- | 1 | 2 | 3 | 4 | 5 |
|---|---|---|---|---|---|
| A. Dispersion and/or Micronizing Step | | | | | |
| 1. Trade Name | Al-Sil-Ate HO | Excelopax Zirconium silicate | Reinforcing grade wet PP silica | Paper grade wet PP silica | Ludox colloidal silica HS 40 |
| Pigment, dry basis | 30 | 40 | 40 | 40 | 35 |
| 2. Surface Active Agent* Material | | | | | |
| Duponol ME[1] | 2 | — | — | 2 | — |
| Triton X 400[2] | — | 10 | — | — | — |
| Triton X 405[3] | 10 | 10 | 10 | — | — |
| Alipal CO 433[4] | — | — | 5 | 10 | — |
| Duomac T[5] | 2 | — | 2 | 2 | — |
| Acetic acid | — | 5 | — | — | — |
| Ammonium hydroxide 25% | 5 | — | 5 | 5 | — |
| 3. Water, Quantity | 251 | 285 | 288 | 241 | 265 |
| 4. Dispersion or Micronizing | | | | | |
| Method | Sand | Sand | Sand | Sand | Stirring |
| Time, hours, approx. | 24 | 48 | 24 | 24 | — |
| Temperature, °C. | 28 | 28 | 28 | 28 | 28 |
| Average Particle Size Diameter (microns) | <0.2 | <0.2 | <0.2 | <0.1 | <0.02 |
| 5. Separation, Screening (X) | X | X | X | X | — |
| 6. Water dilution | 200 | 250 | 200 | 250 | 200 |
| 7. Yield | | | | | |
| Aqueous Pigment Dispersion | 500 | 600 | 550 | 550 | 500 |
| B. Polymerization Step | | | | | |
| 8. Surface Active Agent* | | | | | |
| a. Quantity, type | 10[1] | 10[2] | 30[3] | 10[1] | 30[3] |
| b. Quantity, type | 20[3] | 20[3] | — | — | — |
| Water | 70 | 70 | 70 | 90 | 70 |
| 9. Monomer Material Non Crosslinking | | | | | |
| Styrene | 50 | 30 | — | 50 | 61 |
| 4-vinylpyridine | — | 5 | — | — | 10.5 |
| Methacrylic acid | — | — | — | 5 | 8.5 |
| Methylmethacrylate | — | 20 | 50 | 15 | — |
| 9b. Monomer Material Crosslinking | | | | | |
| Divinylbenzene 50% | 10 | 10 | 10 | 10 | 10 |
| 10. Polymerization Initiator | | | | | |
| AZDN[6] | 2.5 | 2.5 | 2.5 | 2.5 | 3 |
| 11. Polymerization Conditions | | | | | |
| Time, hours | 5 | 5 | 5 | 5 | 5 |
| Temperature, °C. | 80 | 80 | 80 | 80 | 80 |
| Conversion, approx. 100% (X) | X | X | X | X | X |
| 12. Intraleucospheruloid Pigment Dispersion | | | | | |
| Yield | 660 | 765 | 710 | 730 | 690 |

TABLE 10-continued

Preparation of Intraleucospheruloid Pigment Compositions

(parts by weight)

| Example 10- | 1 | 2 | 3 | 4 | 5 |
|---|---|---|---|---|---|
| Latex (X) | — | X | X | X | X |

*capable of effecting emulsion polymerization
[1] sodium lauryl sulfate (100% active)
[2] stearyl dimethyl benzyl ammonium chloride (82% active)
[3] octylphenoxy polyethoxy ethanol (70% active)
[4] sodium salt of a sulfate ester of an alkylphenoxy poly(ethyleneoxy)ethanol 28% active
[5] n-tallow trimethylene diamine diacetate (85% active)
[6] azobisisobuyronitrile
Al-Sil-Ate HO tradename for Freeport Kaolin aluminum silicate
Excelopax tradename for NL Industries zirconium silicate
Ludox HS 40 tradename for DuPont collodial silica

TABLE 11

Preparation of Intraleucospheruloid Pigment Compositions
(parts by weight)

| Example No. 11- | | 1 | 2 | 3 | 4 | 5 |
|---|---|---|---|---|---|---|
| A. | Dispersion and/or Micronizing Step | | | | | |
| 1. | Trade Name | HiSil 404 | Hi Sil 233 | Cab-O-Sil M5 | Celite 281 | Silene EF |
|  | Pigment, dry basis | 40 | 40 | 40 | 40 | 40 |
| 2. | Surface Active Agent* Material | | | | | |
|  | Triton X405[1] | 20 | — | — | 20 | 20 |
|  | Triton X400[2] | — | 20 | — | — | — |
|  | Alipal CO433[3] | — | — | 10 | — | 45 |
|  | Tamol SN[4] | 2 | — | 2 | 2 | — |
|  | Ammonium hydroxide 28% | 5 | — | — | 5 | — |
|  | Acetic acid | — | 10 | — | — | — |
| 3. | Water, quantity | 283 | 280 | 348 | 283 | 295 |
| 4. | Dispersion or Micronizing | | | | | |
|  | Method | Sand | Ball | Sand | Sand | Ball |
|  | Time, hours, approx. | 24 | 36 | 24 | 24 | 36 |
|  | Temperature °C. | 28 | 28 | 28 | 28 | 28 |
|  | Average Particle Size Diameter (microns) | <0.2 | <0.1 | <0.1 | <0.2 | <0.2 |
| 5. | Separation | | | | | |
|  | Screening (X) | X | X | X | X | X |
| 6. | Water Dilution | 200 | 200 | 200 | 200 | 200 |
| 7. | Yield | | | | | |
|  | Aqueous Pigment Dispersion | 550 | 550 | 600 | 550 | 600 |
| B. | Polymerization Step | | | | | |
| 8. | Surface Active Agent* | | | | | |
|  | a. Quantity, type | 20[1] | 20[1] | 20[3] | 20[1] | — |
|  | b. Quantity, type | 10[3] | — | — | 10[3] | — |
|  | Water | 70 | 80 | 80 | 70 | 100 |
| 9. | Monomer Material Non Crosslinking | | | | | |
|  | Styrene | 60 | — | — | 20 | 30 |
|  | Methylmethacrylate | — | 60 | — | 40 | 30 |
|  | Vinyltoluene | — | — | 60 | — | — |
| 9b. | Monomer Material Crosslinking | | | | | |
|  | Divinylbenzene 50% | 10 | — | 10 | — | 10 |
|  | Ethyleneglycoldimethacrylate | — | 10 | — | 10 | — |
| 10. | Polymerization Initiator | | | | | |
|  | AZDN[5] | 2 | — | 2 | — | 2 |
|  | Potassium persulfate | — | 2.5 | — | 2.5 | — |
|  | Sodium bisulfite | — | 1.25 | — | 1.25 | — |
| 11.- | Polymerization Conditions | | | | | |
|  | Time, hours | 5 | 6 | 5 | 6 | 5 |
|  | Temperature, °C. | 80 | 70 | 80 | 70 | 80 |
|  | Conversion, approx. 100% (X) | X | X | X | X | X |
| 12. | Intraleucospheruloid Pigment Dispersion | | | | | |
|  | Yield | 720 | 720 | 770 | 720 | 770 |
|  | Latex (X) | — | X | X | — | — |

*capable of effecting emulsion polymerization
[1] octylphenoxy polyethoxy ethanol (70% active)
[2] stearyl dimethyl benzyl ammonium chloride (82% active)
[3] sodium salt of a sulfate ester of an alkylphenoxy poly(ethyleneoxy)ethanol (28% active)
[4] sodium salt of a condensed naphthalene sulfonic acid
[5] azobisisobutyronitrile
HiSil 404 tradename for PPG Industries precipitated silica, paper grade
HiSil 233 tradename for PPG Industries precipitated silica, reinforcing grade
Cab-O-Sil M5 tradename for Cabot Corporation pyrogenic silica
Celite 281 tradename for Johns-Manville Corp. natural silica
Silene EF tradename for PPG Industries precipitated silica, calcium modified

TABLE 12

Preparation of Intraleucospheruloid Pigment Composition
(parts by weight)

| Example No. 12- | 1 | 2 | 3 | 4 | 5 |
|---|---|---|---|---|---|
| A. Dispersion and/or Micronizing Step | | | | | |
| 1. Trade Name | Zirconium Oxide | Zinc Oxide | Alumina | Aluminum Hydroxide | Barium Sulfate |
| Pigment, dry basis | 30 | 30 | 40 | 40 | 30 |
| 2. Surface Active Agent* Material | | | | | |
| Alipal CO 433[1] | — | 10 | 10 | — | 10 |
| Triton X400[2] | 10 | — | — | — | — |
| Triton X405[3] | 10 | 10 | 10 | 25 | 10 |
| Ammonium Hydroxide 28% | — | — | — | 2 | 2 |
| Acetic Acid | 5 | — | — | — | — |
| 3. Water, quantity | 245 | 250 | 290 | 283 | 248 |
| 4. Dispersion or Micronizing | | | | | |
| Method | Sand | Sand | Sand | Sand | Ball |
| Time, hours, approx. | 48 | 48 | 48 | 36 | 48 |
| Temperature ° C. | 28 | 28 | 28 | 28 | 28 |
| Average Particle Size Diameter (microns) | <0.2 | <0.2 | <0.2 | <0.2 | <0.2 |
| 5. Separation Screening (X) | X | X | X | X | X |
| 6. Water Dilution | 200 | 200 | 200 | 200 | 200 |
| 7. Yield Aqueous Pigment Dispersion | 500 | 500 | 550 | 550 | 500 |
| 8. Polymerization Step | | | | | |
| 8. Surface Active Agent* | | | | | |
| a. Quantity, type | 35[3] | 25[1] | 15[1] | 35[3] | 25[1] |
| b. Quantity, type | — | 10[3] | 15[3] | — | — |
| Water | 65 | 65 | 70 | 65 | 75 |
| 9. Monomer Material Non Crosslinking | | | | | |
| Methylmethacrylate | — | 10 | 20 | — | 40 |
| Styrene | 50 | 30 | 60 | 60 | 30 |
| Acrylonitrile | 10 | 20 | — | — | 5 |
| Dimethylaminoethylmethacrylate | 10 | 5 | — | — | 5 |
| 9b. Monomer Material Crosslinking | | | | | |
| Ethyleneglycoldimethacrylate | 10 | 5 | 10 | — | 10 |
| Tung Oil | — | 2 | 1 | — | 1 |
| Divinylbenzene 50% | — | — | — | 20 | — |
| 10. Polymerization Initiator AZDN[4] | 3 | 3 | 3 | 3 | 3 |
| 11. Polymerization Conditions | | | | | |
| Time, hours | 5 | 5 | 5 | 5 | 5 |
| Temperature, ° C. | 80 | 80 | 80 | 80 | 80 |
| 33 Conversion, approx 100% (X) | X | X | X | X | X |
| 12. Intraleucospheruloid Pigment Dispersion Yield | 680 | 670 | 740 | 730 | 690 |

*capable of effecting emulsion polymerization
[1] sodium salt of a sulfate ester of an alkylphenoxy poly(ethylenoxy)ethanol (28% active)
[2] stearyl dimethyl benzyl ammonium chloride (82% active)
[3] octylphenoxy polyethoxy ethanol (70% active)
[4] azobisisobutyronitrile

TABLE 13

Preparation of Intraleucospheruloid Pigment Compositions
(parts by weight)

| Example No. 13- | 1 | | 2 | |
|---|---|---|---|---|
| A. Dispersion and/or Micronizing Step | | | | |
| 1. Trade Name | Silene D | Alumina | HiSil 233 | Zinc Oxide |
| Pigment, dry basis | 20 | 40 | 20 | 20 |
| 2. Surface Active Agent° Material | | | | |
| Alipal CO 433[1] | | 20 | | 20 |
| Monazoline T[2] | | 2 | | — |
| Triton X 405[3] | | 10 | | 10 |
| Ammonium Hydroxide 28% | | 5 | | — |
| 3. Water, Quantity | | 303 | | 280 |
| 4. Dispersing or Micronizing Step | | | | |
| Method | | Sand | | Sand |
| Time, hours, approx. | | 48 | | 48 |
| Temperature ° C. | | 28 | | 28 |
| Average particle size Diameter (microns) | | <0.2 | | <0.2 |
| 5. Separation, Screening (X) | | X | | X |
| 6. Water Dilution | | 250 | | 250 |
| 7. Yield Aqueous pigment dispersion | | 650 | | 600 |
| B. Polymerization Step | | | | |
| 8. Surface Active Agent° | | | | |

TABLE 13-continued

Preparation of Intraleucospheruloid Pigment Compositions
(parts by weight)

| Example No. 13- | 1 | 2 |
|---|---|---|
| a. Quantity, type | 35[3] | 20[3] |
| Water | 65 | 80 |
| 9. Monomer Material Non Crosslinking | | |
| Vinyltoluene | 40 | 50 |
| Acrylonitrile | 10 | 8 |
| Dimethylaminoethylemethacrylate | 5 | 10 |
| 9b. Monomer Material Crosslinking | | |
| Ethyleneglycoldimethacrylate | 10 | — |
| Oiticia Oil | — | 2 |
| 10. Polymerization Initiator | | |
| AZDN[4] | 3 | 3 |
| 11. Polymerization Conditions | | |
| Time, hours | 6 | 6 |
| Temperature, °C. | 80 | 80 |
| Conversion, approx. 100% (X) | X | X |
| 12. Intraleucospheruloid Pigment | | |
| Dispersion Yield | 815 | 770 |

*Capable of effecting emulsion polymerization
[1] sodium salt of a sulfate ester of an alkylphenoxy poly(ethyleneoxy)ethanol (28% active)
[2] substituted imidazoline of tall oil (100% active)
[3] octylphenoxy polyethoxy ethanol (70% active)
[4] azobisisobutyronitrile
Silene D Tradename for PPG Industries precipitated silica, calcium modified
HiSil 233 Tradename for PPG Industries precipitated silica, reinforcing grade

TABLE 14

Preparation of Intraleucospheruloid Pigment Compositions
(parts by weight)

| Example No. 14- | 1 | | 2 | |
|---|---|---|---|---|
| A. Dispersion and/or Micronizing Step | | | | |
| 1. Trade Name | HiSil 233 | TiPure R941 slurry | HiSil 404 | Zirconium Oxide |
| Pigment, dry basis | 20 | 40 | 20 | 40 |
| 2. Surface Active Agent* Material | | | | |
| Alipal CO433[1] | — | | 20 | |
| Monazoline T[2] | 20 | | 2 | |
| Triton X400[3] | — | | — | |
| Triton X405[4] | 20 | | 10 | |
| Acetic Acid | 10 | | — | |
| Ammonium Hydroxide 28% | — | | 10 | |
| 3. Water, quantity | 290 | | 298 | |
| 4. Dispersion or Micronizing | | | | |
| Method | Sand | | Ball | |
| Time, hours, approx. | 48 | | 60 | |
| Temperature °C. | 28 | | 28 | |
| Average Particle Size Diameter (microns) | <0.1 | | <0.2 | |
| 5. Separation | | | | |
| Screening (X) | X | | X | |
| 6. Water Dilution | 300 | | 300 | |
| 7. Yield | | | | |
| Aqueous Pigment Dispersion | 700 | | 700 | |
| B. Polymerization Step | | | | |
| 8. Surface Active Agent* | | | | |
| a. Quantity, type | 45[3] | | 20[3] | |
| b. Quantity, type | — | | — | |
| Water | 55 | | 80 | |
| 9. Monomer Material Non Crosslinking | | | | |
| Styrene | 40 | | 70 | |
| Methylmethacrylate | 30 | | — | |
| 9b. Monomer Material Crosslinking | | | | |
| Divinylbenzene 50% | 10 | | 10 | |
| 10. Polymerization Initiator | | | | |
| AZDN[5] | 3 | | 3 | |
| 11. Polymerization Conditions | | | | |
| Time, hours | 5 | | 5 | |
| Temperature, °C. | 80 | | 80 | |
| Conversion, approx. 100% (X) | X | | X | |
| 12. Intraleucospheruloid Pigment Dispersion | | | | |
| Yield | 880 | | 880 | |

TABLE 14-continued

Preparation of Intraleucospheruloid Pigment Compositions
(parts by weight)

| Example No. 14- | 1 | 2 |
|---|---|---|
| Latex (X) | X | — |

*capable of effecting emulsion polymerization
[1] sodium salt of a sulfate ester of an alkylphenoxy poly(ethyleneoxy)ethanol (28% active)
[2] substituted imidazoline of tall oil (100% active)
[3] stearyl dimethyl benzyl ammonium chloride (82% active)
[4] octylphenoxy polyethoxy ethanol (70% active)
[5] azobisisobutyronitrile
HiSil 233 tradename for PPG Industries precipitated silica, reinforcing grade
TiPure R941 tradename for DuPont titanium dioxide pigment
HiSil 404 tradename for PPG Industries precipitated silica, paper grade

TABLES 15-20

Preparation of Intraleucospheruloid/Organic Color Compositions, the Polymer Portion thereof being Cross-linked to Essential Insolubility in Physical Solvents

TABLE 15

Preparation of Intraleucospheruloid/Organic Color Pigment Compositions
(parts by weight)

| Example No. 15- | 1 | 2 | 3 | 4 | 5 |
|---|---|---|---|---|---|
| 1. Intraleucospheruloid Pigment Dispersion | | | | | |
| Table No. | 8-1 | 8-2 | 8-3 | 8-4 | 8-5 |
| Amount | 760 | 760 | 760 | 760 | 760 |
| Amount dry basis | 100 | 100 | 100 | 100 | 100 |
| Water | 1340 | 1340 | 1340 | 1340 | 1340 |
| pH | 8-9 | 8-9 | 8-9 | 7-8 | 8-9 |
| 2. Organic Pigment Dispersion | | | | | |
| Table No. | 1-1 | 1-2 | 1-3 | 1-4 | 1-5 |
| Quantity | 450 | 450 | 45 | 450 | 450 |
| Pigment Solids | 25 | 25 | 3 | 25 | 25 |
| Water | 50 | 50 | 55 | 50 | 50 |
| pH | 8-9 | 5-6 | 8-9 | 5-6 | 8-9 |
| 3. Temperature °C. | 28 | 28 | 28 | 28 | 28 |
| pH | 8-9 | 6-7 | 8-9 | 6-7 | 8-9 |
| 4. Nitrogenous Material | | | | | |
| Tetraethylenepentamine | 2 | — | — | 2 | — |
| Armac T[1] | — | 2 | — | — | — |
| Monaquat TIBC[2] | — | — | 2 | — | 2 |
| 5. Temperature | 28 | 28 | 28 | 28 | 28 |
| pH | 8-9 | 7-8 | 8-9 | 7-8 | 8-9 |
| 6. Bonding Agent Material | | | | | |
| "N" sodium silicate 28% | 50 | 50 | — | — | 25 |
| Z6020 Silane[3] | — | — | 1 | — | — |
| SMA Copolymer 20%[4] | — | — | 50 | 50 | — |
| 7. Destabilizing Agent Material | | | | | |
| (a) Acid (X)[5] | X | X | X | X | X |
| (b) Base (X) | — | — | — | — | — |
| (c) Alcohol (X) | — | — | — | — | — |
| 8. Temperature, °C. | 28 | 28 | 28 | 28 | 28 |
| pH | 5-6 | 5-6 | 5-6 | 5-6 | 5-6 |
| 9. Reaction Temperature, °C. | 80 | 80 | 80 | 80 | 80 |
| 10. Reacton Time, Hrs. Approx. | 4 | 4 | 4 | 4 | 4 |
| 11. Primary Particle Size Diameter (microns) | <4.0 | <4.0 | <4.0 | <4.0 | <4.0 |
| 12. Yield - Intraleucospheruloid/ Organic Pigment Composition Dispersion Approx. | 2500 | 2500 | 2000 | 2500 | 2500 |
| 13. Pigment Recovery Method | | | | | |
| (a) Filtration (X) | X | X | X | X | X |
| (b) Spray Drying (X) | — | — | — | — | — |
| 14. Product Available as: | | | | | |
| (a) Wet Coagulum (X) | X | X | X | X | X |
| (b) Dry Coagulum (X)[6] | X | X | X | X | X |
| (c) Spray Dried Powder (X) | — | — | — | — | — |
| 15. Intraleucospheruloid/ Organic Pigment Composition Yield Dry basis | 139 | 139 | 114 | 135 | 132 |

[1] N-tallow amine acetate 100% active
[2] substituted imidazoline Quaternized with benzyl chloride 100% active
[3] N-(2-aminoethyl)-3-aminopropyltrimethoxysilane
[4] copolymer of styrene, methacrylic acid and acrylonitrile, ratio 25/65/10
[5] aq. HCl
[6] when dried

TABLE 16

Preparation of Intraleucospheruloid/Organic Color Pigment Compositions
(parts by weight)

| Example No. 16 | 1 | 2 | 3 | 4 | 5 |
|---|---|---|---|---|---|
| 1. Intraleucospheruloid | | | | | |

TABLE 16-continued
Preparation of Intraleucospheruloid/Organic Color Pigment Compositions
(parts by weight)

| Example No. 16 | 1 | 2 | 3 | 4 | 5 |
|---|---|---|---|---|---|
| Pigment Dispersion | | | | | |
| Table No. | 9-1 | 9-2 | 9-3 | 9-4 | 9-5 |
| Amount | 785 | 735 | 780 | 745 | 735 |
| Amount Dry Basis | 125 | 125 | 120 | 135 | 125 |
| Water | 1215 | 1265 | 1220 | 1255 | 1265 |
| pH | 8-9 | 8-9 | 5-6 | 7-8 | 8-9 |
| 2. Organic Pigment Dispersion | | | | | |
| Table No. | 2-1 | 2-2 | 2-3 | 2-4 | 2-5 |
| Quantity | 45 | 450 | 450 | 450 | 450 |
| Pigment Solids | 3 | 30 | 20 | 25 | 25 |
| Water | 55 | 50 | 50 | 50 | 50 |
| pH | 8-9 | 8-9 | 7-8 | 5-6 | 8-9 |
| 3. Temperature ° C. | 28 | 28 | 28 | 28 | 28 |
| pH | 8-9 | 8-9 | 7 | 7 | 8-9 |
| 4. Nitrogenous Material | | | | | |
| Tetraethylenepentamine | 2 | 2 | — | — | 2 |
| Monazoline T[1] | — | — | 2 | 5 | — |
| PEI 18[2] | — | — | — | — | 20 |
| 5. Temperature ° C. | 28 | 28 | 28 | 28 | 28 |
| pH | 8-9 | 8-9 | 7 | 7 | 8-9 |
| 6. Bonding Agent Material | | | | | |
| SMA Copolymer 20%[3] | 50 | — | — | — | — |
| "N" sodium silicate 28% | — | 50 | — | — | — |
| 7. Destablizing Agent Material | | | | | |
| (a) Acid (X)[4] | X | X | — | — | X |
| (b) Base (X)[5] | — | — | X | — | — |
| (c) Alcohol (X)[6] | — | — | — | X | — |
| 8. Temperature, ° C. | 30 | 30 | 30 | 28 | 30 |
| pH | 5-6 | 5-6 | 10-11 | 7 | 5-6 |
| 9. Reaction Temperature, ° C. | 75 | 75 | 80 | 70 | 75 |
| 10. Reaction Time, Hours, Approx. | 5 | 5 | 4 | 5 | 5 |
| 11. Primary Particle Size Diameter (microns) | <4.0 | <4.0 | <4.0 | <4.0 | <4.0 |
| 12. Yield - Intraleucospheruloid/ Organic Pigment Compositions Dispersion Approx. | 2000 | 2500 | 2500 | 2500 | 2500 |
| 13. Pigment Recovery Method | | | | | |
| (a) Filtration (X) | X | X | X | — | X |
| (b) Spray Drying (X) | — | — | — | X | — |
| 14. Product Available As: | | | | | |
| (a) Wet coagulum (X) | X | X | X | — | X |
| (b) Dry Coagulum (X)[7] | X | X | X | — | X |
| (c) Spray Dried Powder (X) | — | — | — | X | — |
| 15. Intraleucospheruloid/ Organic Pigment Composition Yield (dry basis) | 138 | 169 | 140 | 218 | 150 |

[1] substituted imidazoline of tall oil 100% active
[2] water soluble polyethyleneimine
[3] copolymer of styrene, methacrylic acid and acrylonitrile, ratio 25/65/10
[4] acetic
[5] NH₄OH
[6] isopropyl
[7] when dried

TABLE 17
Preparation of Intraleucospheruloid/Organic Color Pigment Compositions
(parts by weight)

| Example No. 17- | 1 | 2 | 3 | 4 | 5 |
|---|---|---|---|---|---|
| 1. Intraleucospheruloid Pigment Dispersion | | | | | |
| Table No. | 10-1 | 10-2 | 10-3 | 10-4 | 10-5 |
| Amount | 660 | 765 | 710 | 730 | 690 |
| Amount Dry Basis | 90 | 105 | 100 | 120 | 125 |
| Water | 1340 | 1235 | 1290 | 1270 | 1310 |
| pH | 8-9 | 5-6 | 8-9 | 8-9 | 7-8 |
| 2. Organic Pigment Dispersion | | | | | |
| Table No. | 3-1 | 3-2 | 3-3 | 3-4 | 3-5 |
| Quantity | 450 | 450 | 45 | 45 | 450 |
| Pigment Solids | 30 | 30 | 1 | 2 | 20 |
| Water | 50 | 50 | 55 | 55 | 50 |
| pH | 5-6 | 8-9 | 7-8 | 7-8 | 5-6 |
| 3. Temperature ° C. | 28 | 28 | 28 | 28 | 28 |
| pH | 7 | 7 | 8-9 | 8-9 | 6-7 |
| 4. Nitrogenous Material | | | | | |
| Duomac T[1] | — | — | 2 | — | — |
| Arquad T -50[2] | — | — | — | 2 | — |
| Tetraethylenepentamine | — | — | 2 | — | 2 |
| 5. Temperature ° C. | 28 | 28 | 28 | 28 | 28 |
| pH | 7 | 7 | 8-9 | 8-9 | 6-7 |
| 6. Bonding Agent Material | | | | | |
| Z6020 silane[3] | 1 | — | — | — | 2 |
| "N" sodium silicate 28% | — | — | 50 | 50 | — |
| 7. Destablizing Agent Material | | | | | |
| (a) Acid (X)[4] | — | — | X | X | X |

TABLE 17-continued

Preparation of Intraleucospheruloid/Organic Color Pigment Compositions
(parts by weight)

| Example No. 17- | 1 | 2 | 3 | 4 | 5 |
|---|---|---|---|---|---|
| (b) Base (X) | — | — | — | — | — |
| (c) Alcohol (X) | — | — | — | — | — |
| 8. Temperature, °C. | 28 | 28 | 28 | 28 | 28 |
| pH | 7 | 7 | 5–6 | 5–6 | 5–6 |
| 9. Reaction Temperature, °C. | 75 | 75 | 75 | 75 | 80 |
| 10. Reaction Time, hours. approx. | 5 | 5 | 5 | 5 | 5 |
| 11. Primary Particle Size Diameter (microns) | <4.0 | <4.0 | <4.0 | <4.0 | <4.0 |
| 12. Yield - Intraleucospheruloid/Organic Pigment Composition Dispersion (approx.) | 2500 | 2500 | 2100 | 2100 | 2500 |
| 13. Pigment Recovery Method | | | | | |
| (a) Filtration (X) | — | — | X | X | X |
| (b) Spray Drying (X) | X | X | — | — | — |
| 14. Product Available As: | | | | | |
| (a) Wet Coagulum (X) | — | — | X | X | X |
| (b) Dry Coagulum (X)[5] | — | — | X | X | X |
| (c) Spray Dried Powder (X) | X | X | — | — | — |
| 15. Intraleucospheruloid/Organic Pigment Composition Yield (Dry Basis) | 179 | 180 | 115 | 136 | 147 |

[1]-N-tallow trimethylenediamine diacetate 85% active
[2]tallow trimethyl ammonium chloride
[3]-N-(2-aminoethyl)-3-aminopropyltrimethoxysilane
[4]dil. $H_2SO_4$
[5]when dried

EXAMPLE 17-1-a

This Example is prepared exactly as in Example 17-1 with the exception that the Intraleucospheruloid pigment dispersion from Table 10-1 was reduced to 33 parts, thus yielding an Intraleucospheruloid/organic color pigment composition of greatly increased color strength suitable for masterbatch coloration of rubber.

TABLE 18

Preparation of Intraleucospheruloid/Organic Color Pigment Compositions
(parts by weight)

| Example No. 18 | 1 | 2 | 3 | 4 | 5 |
|---|---|---|---|---|---|
| 1. Intraleucospheruloid Pigment Dispersion | | | | | |
| Table No. | 11-1 | 11-2 | 11-3 | 11-4 | 11-5 |
| Amount | 720 | 720 | 770 | 720 | 770 |
| Amount dry basis | 110 | 110 | 110 | 110 | 110 |
| Water | 1280 | 1280 | 1230 | 1280 | 1230 |
| pH | 7–8 | 5–6 | 8–9 | 7–8 | 8–9 |
| 2. Organic Pigment Dispersion | | | | | |
| Table No. | 4-1 | 4-2 | 4-3 | 4-4 | 4-5 |
| Quantity | 450 | 450 | 450 | 450 | 450 |
| Pigment Solids | 25 | 20 | 30 | 30 | 20 |
| Water | 50 | 50 | 50 | 50 | 50 |
| pH | 8–9 | 8–9 | 6–7 | 8–9 | 8–9 |
| 3. Temperature °C. | 28 | 28 | 28 | 28 | 28 |
| pH | 8 | 7 | 8 | 8–9 | 8–9 |
| 4. Nitrogenous Material | | | | | |
| Tetraethylenepentamine | 2 | 2 | — | — | — |
| PEI 600[1] | — | — | 5 | — | — |
| 5. Temperature °C. | 28 | 28 | 28 | 28 | 28 |
| pH | 8 | 7 | 8 | 8–9 | 8–9 |
| 6. Bonding Agent Material | | | | | |
| "N" Group polymer 20%[2] | 10 | — | — | — | — |
| Z6020 silane[3] | — | —10 | — | 1 | 1 |
| SMAV Amphoteric Copolymer 20%[4] | — | — | 50 | — | — |
| 7. Destabilizing Agent Material | | | | | |
| (a) Acid (X)[5] | — | — | X | X | X |
| (b) Base (X)[6] | X | — | — | — | — |
| (c) Alcohol (X)[7] | — | X | — | — | — |
| 8. Temperature, °C. | 30 | 30 | 30 | 30 | 30 |
| pH | 10–11 | 7 | 5–6 | 5–6 | 5–6 |
| 9. Reaction Temperature, °C. | 75 | 70 | 80 | 80 | 80 |
| 10. Reaction Time, hours approx. | 5 | 4 | 4 | 4 | 4 |
| 11. Primary Particle Size Diameter (microns) | <4.0 | <4.0 | <4.0 | <4.0 | <4.0 |
| 12. Yield - Intraleucospheruloid/Organic Pigment Composition Dispersion Approx. | 2500 | 2500 | 2500 | 2500 | 2500 |
| 13. Pigment Recovery Method | | | | | |
| (a) Filtration (X) | X | X | X | X | X |
| (b) Spray Drying (X) | — | — | — | — | — |
| 14. Product Available as: | | | | | |
| (a) Wet Coagulum (X) | X | X | X | X | X |
| (b) Dry Coagulum (X)[8] | X | X | X | X | X |
| (c) Spray Dried Powder (X) | — | — | — | — | — |
| 15. Intraleucospheruloid/Organic Pigment Composition | | | | | |

TABLE 18-continued

Preparation of Intraleucospheruloid/Organic Color Pigment Compositions
(parts by weight)

| Example No. 18 | 1 | 2 | 3 | 4 | 5 |
|---|---|---|---|---|---|
| Yield (Dry Basis) | 137 | 130 | 150 | 141 | 131 |

[1] water soluble polyethyleneimine
[2] 4-vinylpyridine homopolymer
[3] N-(2-1aminoethyl)-3-aminopropyltrimethoxysilane
[4] copolymer of styrene, acrylonitrile, methacrylic acid and 4-vinylpyridine, ratio 25/10/29/36
[5] acetic
[6] aq. NaOH
[7] isopropyl
[8] when dried

TABLE 19

Preparation of Intraleucospheruloid/Organic Color Pigment Compositions
(parts by weight)

| Example No. 19- | 1 | 2 | 3 | 4 | 5 |
|---|---|---|---|---|---|
| 1. Intraleucospheruloid Pigment Dispersion | | | | | |
| Table No. | 12-1 | 12-2 | 12-3 | 12-4 | 12-5 |
| Amount | 680 | 670 | 740 | 730 | 690 |
| Amount dry basis | 110 | 100 | 130 | 120 | 120 |
| Water | 1320 | 1330 | 1260 | 1270 | 1310 |
| pH | 5-6 | 8-9 | 8-9 | 7-8 | 8-9 |
| 2. Organic Pigment Dispersion | | | | | |
| Table No. | 5-1 | 5-2 | 5-3 | 5-4 | 5-5 |
| Quantity | 450 | 450 | 450 | 450 | 450 |
| Pigment Solids | 25 | 15 | 30 | 30 | 25 |
| Water | 50 | 50 | 50 | 50 | 50 |
| pH | 8-9 | 7-8 | 5-6 | 7-8 | 8-9 |
| 3. Temperature ° C. | 28 | 28 | 28 | 28 | 28 |
| pH | 7 | 7-8 | 7 | 7-8 | 8-9 |
| 4. Nitrogenous Material | | | | | |
| Duomac T[1] | — | 1 | — | 1 | 1 |
| Monaquat TIBC[2] | — | — | — | 1 | 1 |
| 5. Temperature ° C. | 28 | 28 | 28 | 28 | 28 |
| pH | 7 | 7-8 | 7 | 7-8 | 8-9 |
| 6. Bonding Agent Material | | | | | |
| Urea | 10 | — | — | — | — |
| Formaldehyde 37% | 20 | — | — | — | — |
| Melamine (recrystalized) | 10 | — | — | — | 7 |
| 7. Destabilizing Agent Material | | | | | |
| (a) Acid (X)[3] | X | — | — | — | X |
| (b) Base (X)[4] | — | — | X | X | — |
| (c) Alcohol (X)[5] | — | X | — | — | — |
| 8. Temperature, ° C. | 30 | 28 | 30 | 30 | 30 |
| pH | 5-6 | 7-8 | 10-11 | 10-11 | 5-6 |
| 9. Reaction Temperature, ° C. | 75 | 70 | 80 | 80 | 75 |
| 10. Reaction Time, hours, Approx. | 4 | 5 | 5 | 5 | 4 |
| 11. Primary Particle Size Diameter (Microns) | <4.0 | <4.0 | <4.0 | <4.0 | <4.0 |
| 12. Yield - Intraleucospheruloid/Organic Pigment Composition Dispersion Approx. | 2500 | 2500 | 2500 | 2500 | 2500 |
| 13. Pigment Recovery Method | | | | | |
| (a) Filtration (X) | X | — | X | X | X |
| (b) Spray Drying (X) | — | X | — | — | — |
| 14. Product Available As: | | | | | |
| (a) Wet Coagulum (X) | X | — | X | X | X |
| (b) Dry Coagulum (X)[6] | X | — | X | X | X |
| (c) Spray Dried Powder (X) | — | X | — | — | — |
| 15. Intraleucospheruloid/Organic Pigment Composition Yield (Dry Basis) | 135 | 115 | 160 | 150 | 145 |

[1] N-tallow trimethylene diamine diacetate 85% active
[2] substituted imidazoline of tall oil quaternized with benzyl chloride 100% active
[3] acetic
[4] NH₄OH
[5] isopropyl
[6] when dried

TABLE 20

Preparation of Intraleucospheruloid/Organic Color Pigment Compositions
(parts by weight)

| Example No. 20- | 1 | 2 | 3 | 4 |
|---|---|---|---|---|
| 1. Intraleucospheruloid Pigment Dispersion | | | | |
| Table No. | 13-1 | 13-2 | 14-1 | 14-2 |
| Amount | 815 | 770 | 880 | 880 |
| Amount Dry Basis | 125 | 110 | 140 | 140 |
| Water | 1185 | 1230 | 1120 | 1120 |
| pH | 8-9 | 7-8 | 5-6 | 8-9 |
| 2. Organic Pigment Dispersion | | | | |
| Table No. | 6-2 | 6-1 | 7-2 | 7-1 |
| Quantity | 450 | 450 | 600 | 600 |
| Pigment Solids | 30 | 25 | 35 | 35 |
| Water | 50 | 50 | 100 | 100 |
| pH | 5-6 | 8-9 | 8-9 | 5-6 |
| 3. Temperature ° C. | 28 | 28 | 28 | 28 |
| pH | 7 | 7-8 | 7 | 7 |
| 4. Nitrogenous Material | | | | |
| Tetraethylenepentamine | 2 | 2 | 2 | 2 |
| 5. Temperature ° C. | 28 | 28 | 28 | 28 |
| pH | 7 | 7-8 | 7 | 7 |

TABLE 20-continued
Preparation of Intraleucospheruloid/Organic Color Pigment Compositions
(parts by weight)

| Example No. 20- | 1 | 2 | 3 | 4 |
|---|---|---|---|---|
| 6. Bonding Agent Material | | | | |
| "N" sodium silicate 28% | 50 | — | — | — |
| Aminoplast preformed[1] | — | 10 | — | — |
| Urea | — | — | 10 | — |
| Formaldehyde 37% | — | — | 20 | 20 |
| Melamine (recrystallized) | — | — | 5 | 10 |
| 7. Destabilizing Agent Material | | | | |
| (a) Acid (X)[2] | X | X | X | X |
| (b) Base (X) | — | — | — | — |
| (c) Alcohol (X)[3] | — | X | X | X |
| 8. Temperature, ° C. | 30 | 28 | 28 | 28 |
| pH | 5-6 | 7-8 | 7 | 7 |
| 9. Reaction Temperature, ° C. | 80 | 70 | 70 | 70 |
| 10. Reaction Time, hours, approx. | 4 | 5 | 5 | 5 |
| 11. Primary Particle Size Diameter (Microns) | <4.0 | <4.0 | <4.0 | <4.0 |
| 12. Yield - Intraleucospheruloid/Organic Pigment Composition Dispersion Approx. | 2500 | 2500 | 2700 | 2700 |
| 13. Pigment Recovery Method | | | | |
| (a) Filtration (X) | X | X | X | X |
| (b) Spray Drying (X) | — | — | — | — |
| 14. Product Available As: | | | | |
| (a) Wet Coagulum (X) | X | X | X | X |
| (b) Dry Coagulum (X)[4] | X | X | X | X |
| (c) Spray Dried Powder (X) | — | — | — | — |
| 15. Intraleucospheruloid/Organic Pigment Composition Yield (Dry Basis) | 169 | 135 | 175 | 175 |

[1] preformed condensation product from the aqueous reaction of 1 mole of urea with 1½ moles of formaldehyde (water dispersible)
[2] aq. HCl
[3] isopropyl
[4] when dried

TABLES 21-27
Preparation of Aqueous Dispersions of Organic Color Pigment Compositions

TABLE 21
Preparation of Aqueous Dispersions of Organic Color Pigment Compositions (parts by weight)

| Example No. 21- | 1 | 2 | 3 | 4 | 5 |
|---|---|---|---|---|---|
| A. Dispersion and/or Micronizing Step | | | | | |
| 1. Pigment Class | Vat | Quinacridone | Azo | Azamethine | Triphenylmethane |
| Trade Name | Indanthrene Pink R | Monastral Red B | Pigment Carmine | Irgazin Red 2 BLT | Rhodamine Y |
| Color Index Name | Red 1 | Violet 19 | Red 5 | Red 180 | Red 81 |
| Color Index Number | 73340 | 46500 | 12490 | — | 41560 |
| Pigment, Dry Basis | 25* | 25 | 20 | 30 | 20 |
| 2. Surface Active Agent Material | | | | | |
| Duponol ME[1] | 2 | — | 5 | 10 | — |
| Zonyl FSA[2] | 1 | — | 1 | — | — |
| Duomac T[3] | — | — | — | — | 5 |
| Monaquat TIBC[4] | — | 10 | — | — | 5 |
| Tamol 731[5] | 10 | — | — | — | — |
| Acetic Acid | — | 5 | — | — | 5 |
| Ammonium Hydroxide 28% | 5 | — | 5 | 5 | — |
| 3. Water, Quantity | 207 | 210 | 219 | 205 | 215 |
| 4. Dispersing or Micronizing Step | | | | | |
| Method | Ball | Sand | Sand | Ball | Sand |
| Time, hours, approx. | 60 | 48 | 48 | 60 | 48 |
| Temperature ° C. | 28 | 28 | 28 | 28 | 28 |
| Average Particle Size Diameter (microns) | <0.2 | <0.2 | <0.2 | <0.2 | <0.2 |
| 5. Separation | | | | | |
| Screening (X) | X | X | X | X | X |
| 6. Water Dilution | 200 | 200 | 200 | 200 | 200 |
| 7. Yield | | | | | |
| Aqueous Pigment Dispersion | 450 | 450 | 450 | 450 | 450 |

*used as wet presscake material
[1] sodium lauryl sulfate (100% active)
[2] fluorochemical surface active agent (50% active)
[3] N-tallow trimethylene diamine diacetate (85% active)
[4] substituted imidazoline quaternized with benzyl chloride (100% active)
[5] sodium salt of polymeric carboxylic acid (100% active)

TABLE 22
Preparation of Aqueous Dispersions of Organic Color Pigment Compositions (parts by weight)

| Example No. 22- | 1 | 2 | 3 | 4 | 5 |
|---|---|---|---|---|---|
| A. Dispersion and/or Micronizing Step | | | | | |
| 1. Pigment Class | Azo | Vat | Azamethine | Azo | Vat |
| Trade Name | Hansa Yellow 3R | Brilliant Orange GR | Irgazin Orange RLT | Permagen Yellow | Flavanthrone Yellow |
| Color Index Name | Orange 1 | Orange 7 | Orange 42 | Yellow 14 | Yellow 1 |
| Color Index Number | 11725 | 71105 | — | 21095 | 70600 |
| Pigment, Dry Basis | 30 | 30* | 25 | 25 | 20* |
| 2. Surface Active Agent Material | | | | | |
| Aerosol MA[1] | 10 | — | — | — | 10 |
| Tamol SN[2] | 2 | — | — | — | — |
| Triton X405[3] | — | 15 | — | 5 | 5 |
| Triton X 400[4] | — | — | 15 | — | — |

TABLE 22-continued

Preparation of Aqueous Dispersions of Organic Color Pigment Compositions
(parts by weight)

| Example No. 22- | | 1 | 2 | 3 | 4 | 5 |
|---|---|---|---|---|---|---|
| | Gafax RE 870[5] | — | — | — | 10 | — |
| | Acetic Acid | — | — | 7 | — | — |
| | Ammonium Hydroxide 28% | 5 | 5 | — | 15 | 5 |
| 3. | Water, Quantity | 203 | 200 | 203 | 195 | 210 |
| 4. | Dispersing or Micronizing Step | | | | | |
| | Method | Sand | Sand | Sand | Ball | Sand |
| | Time, hours, approx. | 48 | 48 | 48 | 60 | 48 |
| | Temperature °C. | 28 | 28 | 28 | 28 | 28 |
| | Average Particle Size Diameter (microns) | <0.2 | <0.1 | <0.2 | <0.2 | <0.1 |
| 5. | Separation | | | | | |
| | Screening (X) | X | X | X | X | X |
| 6. | Water Dilution | 200 | 200 | 200 | 200 | 200 |
| 7. | Yield | | | | | |
| | Aqueous Pigment Dispersion | 450 | 450 | 450 | 450 | 450 |

*used as wet presscake material
[1]dihexyl ester of sodium sulfosuccinic acid (80% active)
[2]sodium salt of condensed napthalene sulfonic acid
[3]octylphenoxy polyethoxy ethanol (70% active)
[4]stearyl dimethyl benzyl ammonium chloride (82% active)
[5]free acid of complex organic phosphate ester (100% active)

TABLE 23

Preparation of Aqueous Dispersions of Organic Color Pigment Compositons
(parts by weight)

| Example No. 23- | | 1 | 2 | 3 | 4 | 5 |
|---|---|---|---|---|---|---|
| A. | Dispersion and/or Micronizing Step | | | | | |
| 1. | Pigment Class | Azamethine | Vat | Azo | Phthalocyanine | Phthalocyanine |
| | Trade Name | Irgazin Yellow 2 GLT | Cebanone Yellow GC | Hansa Yellow G | Heliogen Green A | Green Ex Y |
| | Color Index Name | Yellow 109 | Yellow 2 | Yellow 1 | Green 7 | Green 41 |
| | Color Index Number | — | 67300 | 11680 | 74260 | — |
| | Pigment, dry basis | 25 | 25* | 30 | 20* | 25 |
| 2. | Surface Active Agent Material | | | | | |
| | DACQ[1] | 20 | — | — | — | 5 |
| | Duponol ME[2] | — | 5 | — | 5 | — |
| | Tanaphen A 600[3] | — | 15 | — | — | — |
| | Surfactant QS 20[4] | — | — | 20 | 15 | — |
| | Triton X405[5] | — | — | — | — | 10 |
| | Acetic Acid | 10 | — | — | — | — |
| | Ammonium Hydroxide 28% | — | 5 | 20 | 15 | 5 |
| 3. | Water, Quantity | 195 | 200 | 180 | 205 | 205 |
| 4. | Dispersing or Micronizing Step | | | | | |
| | Method | Sand | Sand | Ball | Sand | Sand |
| | Time, hours, approx. | 48 | 48 | 60 | 48 | 48 |
| | Temperature °C. | 28 | 28 | 28 | 28 | 28 |
| | Average Particle Size Diameter (microns) | <0.2 | <0.1 | <0.2 | <0.2 | <0.2 |
| 5. | Separation | | | | | |
| | Screening (X) | X | X | X | X | X |
| 6. | Water Dilution | 200 | 200 | 200 | 200 | 200 |
| 7. | Yield | | | | | |
| | Aqueous Pigment Dispersion | 450 | 450 | 450 | 450 | 450 |

*used as wet presscake material
[1]tallow amino propyl amine quaternized with allyl chloride (100% active)
[2]sodium lauryl sulfate (100% active)
[3]modified phenolic derivative (50% active)
[4]complex phosphate ester (70% active)
[5]octylphenoxy polyethoxy ethanol (70% active)

TABLE 24

Preparation of Aqueous Dispersions of Organic Color Pigment compositions
(parts by weight)

| Example No. 24- | | 1 | 2 | 3 | 4 | 5 |
|---|---|---|---|---|---|---|
| A. | Dispersion and/or Micronizing Step | | | | | |
| 1. | Pigment Class | Vat | Misc. | Phthalocyamine | Vat | Vat |
| | Trade Name | Jade Green | Naphtol Green B | Heliogen Blue BG | Indanthrene Sandothrene Blue BC | Blue NCCD |
| | Color Index Name | Green 1 | Green 12 | Blue 15 | Blue 6 | Blue 14 |
| | Color Index Number | 59825 | 10020 | 74160 | 69825 | 69810 |
| | Pigment, dry basis | 25* | 30 | 20* | 25* | 25* |
| 2. | Surface Active Agent | | | | | |

TABLE 24-continued

Preparation of Aqueous Dispersions of Organic Color Pigment compositions (parts by weight)

| Example No. 24- | | 1 | 2 | 3 | 4 | 5 |
|---|---|---|---|---|---|---|
| | Material | | | | | |
| | Duponol ME[1] | 2 | 1 | — | — | 2 |
| | SMA copolymer[2] | 15 | — | — | — | 15 |
| | SAMV amphoteric Copolymer[3] | — | 15 | — | 10 | — |
| | N-group Polymer[4] | — | — | 15 | 5 | — |
| | Tamol SN[5] | 2 | 1 | — | — | 1 |
| | Acetic Acid | — | — | 5 | 5 | — |
| | Ammonium Hydroxide 28% | 5 | 5 | — | — | 5 |
| 3. | Water, Quantity | 201 | 198 | 210 | 205 | 204 |
| 4. | Dispersing or Micronizing Step | | | | | |
| | Method | Sand | Ball | Sand | Sand | Sand |
| | Time, hours, approx. | 48 | 60 | 48 | 48 | 48 |
| | Temperature °C. | 28 | 28 | 28 | 28 | 28 |
| | Average particle size Diameter (microns) | <0.1 | <0.2 | <0.1 | <0.2 | <0.1 |
| 5. | Separation | | | | | |
| | Screening (X) | X | X | X | X | X |
| 6. | Water Dilution | 200 | 200 | 200 | 200 | 200 |
| 7. | Yield | | | | | |
| | Aqueous Pigment Dispersion | 450 | 450 | 450 | 450 | 450 |

*used as wet presscake material
[1] sodium lauryl sulfate (100% active)
[2] copolymer of styrene, methacrylic acid and acrylonitrile, ratio 25/65/10
[3] copolymer of styrene, acrylonitrile, methacrylic acid and 4-vinylpyridine, ratio 25/10/29/36
[4] homopolymer of 4-vinylpyridine
[5] sodium salt of condensed napthalene sulfonic acid

TABLE 25

Preparation of Aqueous Dispersions of Organic color Pigment compositions (parts by weight)

| Example No. 25- | | 1 | 2 | 3 | 4 | 5 |
|---|---|---|---|---|---|---|
| A. | Dispersion and/or Micronizing Step | | | | | |
| 1. | Pigment Class | Phthalocyanine | Triphenylmethane | Vat | Vat | Dioxazine |
| | Trade Name | Polymon Blue G | Victoria Blue | Indanthrene Black BNN | Indanthrene Blue BC | Heliogen Violet |
| | Color Index Name | Blue 16 | Blue 1 | Green 9 | Blue 6 | Violet 23 |
| | Color Index Number | 74100 | 42595 | 59850 | 69825 | 51319 |
| | Pigment, dry basis | 25 | 20 | 30* | 25* | 15* |
| 2. | Surface Active Agent Material | | | | | |
| | Alipal CO 433[1] | 5 | — | — | 5 | — |
| | Triton X 405[2] | 5 | — | 10 | 5 | — |
| | Duomeen T[3] | — | 10 | — | — | 10 |
| | Zonyl FSC[4] | — | 1 | — | — | — |
| | Blancol[5] | 1 | — | 1 | 1 | 1 |
| | Acetic Acid | — | 5 | — | — | 5 |
| | Ammonium Hydroxide 28% | 5 | — | 5 | 5 | — |
| 3. | Water, Quantity | 209 | 215 | 204 | 209 | 219 |
| 4. | Dispersing or Micronizing Step | | | | | |
| | Method | Ball | Ball | Sand | Sand | Sand |
| | Time, hours, approx. | 60 | 60 | 48 | 48 | 48 |
| | Temperature °C. | 28 | 28 | 28 | 28 | 28 |
| | Average particle size Diameter (microns) | <0.2 | <0.2 | <0.2 | <0.1 | <0.1 |
| 5. | Separation | | | | | |
| | Screening (X) | X | X | X | X | X |
| 6. | Water Dilution | 200 | 200 | 200 | 200 | 200 |
| 7. | Yield | | | | | |
| | Aqueous Pigment Dispersion | 450 | 450 | 450 | 450 | 450 |

*used as wet presscake material
[1] sodium salt of sulfate ester of an alkylphenoxy poly(ethyleneoxy)ethanol 28% active
[2] octylphenoxy polyethoxy ethanol (70% active)
[3] N-tallow trimethylene diamine (85% active)
[4] fluorochemical surface active agent (50% active)
[5] sodium salt of a sulfonated napthalene-formaldehyde condensate (86% active)

TABLE 26

Preparation of Aqueous Dispersions of Organic Color Pigment Compositions (parts by weight)

| Example No. 26- | | 1 | | 2 | |
|---|---|---|---|---|---|
| A. | Dispersion and/or Micronizing Step | | | | |
| 1. | Pigment Class | Vat | Vat | Phthalo | Azo |
| | Trade Name | Ponsol Jade Green | Carbanthrene Yellow G | Heliogen Blue BG | Permagen Yellow |
| | Color Index Name | Green 1 | Yellow 1 | Blue 15 | Yellow 14 |

TABLE 26-continued

Preparation of Aqueous Dispersions of Organic Color Pigment Compositions
(parts by weight)

| Example No. 26- | | 1 | | 2 |
|---|---|---|---|---|
| | Color Index Number | 59825 | 70600 | 74160 | 21095 |
| | Pigment, dry basis | 10* | 10* | 5* | 15 |
| 2. | Surface Active Agent Material | | | | |
| | Monaquat TIBC[1] | | 10 | | — |
| | Monazoline T[2] | | 5 | | — |
| | Duponol ME[3] | | — | | 2 |
| | Zonyl FSA[4] | | — | | 1 |
| | SMA Copolymer[5] | | — | | 20 |
| | Acetic Acid | | 10 | | — |
| | Ammonium Hydroxide 28% | | — | | 10 |
| 3. | Water, Quantity | | 205 | | 197 |
| 4. | Dispersion or Micronizing | | | | |
| | Method | | Sand | | Sand |
| | Time, hours, approx. | | 48 | | 48 |
| | Temperature °C. | | 28 | | 28 |
| | Average Particle Size Diameter (microns) | | <0.1 | | <0.2 |
| 5. | Separation, Screening (X) | | X | | X |
| 6. | Water Dilution | | 200 | | 200 |
| 7. | Yield | | | | |
| | Aqueous Pigment Dispersion | | 450 | | 450 |

*used as wet presscake material
[1]substituted imidazoline quaternized with benzyl chloride (100% active)
[2]substituted imidazoline of tall oil (100% active)
[3]sodium lauryl sulfate (100% active)
[4]fluorochemical surface active agent (50% active)
[5]copolymer of styrene, methacrylic acid and acrylonitrile, ratio 25/65/10

TABLE 27

Preparation of Aqueous Dispersion of Organic Color Pigment Compositions
(parts by weight)

| Example No. 27- | | 1 | | | 2 |
|---|---|---|---|---|---|
| A. | Dispersion and/or Micronizing Step | | | | |
| 1. | Pigment Class | Phthalocyanine | Azo | Vat. Pig. | Triphenylmethane |
| | Trade Name | Heliogen Green G | Permagan Yellow | Perylene Red Toner | Rhodamine Y |
| | Color Index Name | Green 7 | Yellow 14 | Red 123 | Red 81 |
| | Color Index Number | 74260 | 21095 | 71145 | 45160 |
| | Pigment, dry basis | 25* | 15 | 25 | 10 |
| 2. | Surface Active Agent Material | | | | |
| | Polyfon H[1] | | 10 | | — |
| | Duponol ME[2] | | 2 | | — |
| | Triton X400[3] | | — | | 20 |
| | Tamol 731[4] | | 10 | | — |
| | Ammonium hydroxide 28% | | 10 | | — |
| | Acetic Acid | | — | | 10 |
| 3. | Water, quantity | | 237 | | 235 |
| 4. | Dispersion or Micronizing Method | | Sand | | Sand |
| | Time, hours, approx. | | 48 | | 48 |
| | Temperature °C. | | 28 | | 28 |
| | Average Primary Particle Size Diameter (microns) | | <0.02 | | <0.02 |
| 5. | Separation | | | | |
| | Screening (X) | | X | | X |
| 6. | Water, dilution | | 200 | | 200 |
| 7. | Yield | | | | |
| | Aqueous Pigment Dispersion | | 500 | | 500 |

*used as wet presscake material
[1]sodium lignin sulfonate (100% active)
[2]sodium lauryl sulfate (100% active)
[3]stearyl dimethyl benzyl ammonium chloride (82% active)
[4]sodium salt of polymeric carboxylic acid (100% active)

TABLES 28-34

Preparation of Intraleucospheruloid Pigment Compositions, the Organic Polymer Portion thereof being Noncross-linked in Nature

TABLE 28

Preparation of Intraleucospheruloid Pigment Compositions
(parts by weight)

| Example No. 28- | 1 | 2 | 3 | 4 | 5 |
|---|---|---|---|---|---|
| A. Micronizing Step | | | | | |
| 1. Trade Name | Titanox RA47 | TiPure LW | TiPure R941 Slurry | Unitane OR450 | Oncor 23A |

TABLE 28-continued

Preparation of Intraleucospheruloid Pigment Compositions
(parts by weight)

| Example No. 28- | | 1 | 2 | 3 | 4 | 5 |
|---|---|---|---|---|---|---|
| | Pigment, dry basis | 40 | 40 | 40 | 40 | 40 |
| 2. | Surface Active Agent Material* | | | | | |
| | Alipal CO 433[1] | 20 | 40 | — | — | 20 |
| | Duomeen T[2] | — | 2 | 40 | 2 | 2 |
| | Triton X405[3] | — | 50 | — | 40 | 20 |
| | Ammonium Hydroxide 28% | 10 | 5 | — | — | 5 |
| | Acetic Acid | — | — | 20 | — | — |
| 3. | Water, Quantity | 280 | 263 | 250 | 268 | 263 |
| 4. | Dispersion or Micronizing | | | | | |
| | Method | Sand | Ball | Sand | Sand | Sand |
| | Time, hours, approx. | 36 | 48 | 24 | 36 | 36 |
| | Temperature °C. | 28 | 28 | 28 | 28 | 28 |
| | Average Particle Size Diameter (microns) | <0.2 | 0.1–0.2 | <0.1 | <0.2 | <0.2 |
| 5. | Separation, Screening (X) | X | X | X | X | X |
| 6. | Water Dilution | 250 | 250 | 250 | 250 | 250 |
| 7. | Yield | | | | | |
| | Aqueous Pigment Dispersion | 600 | 650 | 600 | 600 | 600 |
| B. | Polymerization Step | | | | | |
| 8. | Surface Active Agent* | | | | | |
| | a. Quantity, type | 30[1] | — | — | 20[1] | 30[3] |
| | b. Quantity, type | — | — | — | — | — |
| | Water | 60 | 90 | 100 | 65 | 60 |
| | Ammonium Hydroxide 28% | 10 | 10 | — | 15 | 10 |
| 9. | Monomer Material Non Crosslinking | | | | | |
| | Styrene | 50 | — | 25 | — | 30 |
| | Methylmethacrylate | — | 50 | 20 | 25 | 10 |
| | Cyclohexylmethacrylate | — | — | — | 20 | 10 |
| | 4 vinylpyridine | 5 | 5 | — | 5 | — |
| 10. | Polymerization Initiator | | | | | |
| | AZDN[4] | 2 | 2 | — | 2 | 2 |
| | Potassium Persulfate | — | — | 2.5 | — | — |
| | Sodium bisulfite | — | — | 1.25 | — | — |
| 11. | Polymerization Conditions | | | | | |
| | Time, hours | 5 | 5 | 6 | 5 | 5 |
| | Temperature, °C. | 80 | 80 | 70 | 80 | 80 |
| | Conversion Approx. 100% (X) | X | X | X | X | X |
| 12. | Intraleucospheruloid Pigment Dispersion | | | | | |
| | Yield | 755 | 805 | 745 | 750 | 750 |
| | Latex (X) | — | X | X | — | — |

*capable of effecting emulsion polymerization
[1]sodium salt of a sulfate ester of an alkylphenoxy poly(ethyleneoxy) ethanol (28% active)
[2]n-tallow trimethylene diamine (85% active)
[3]octylphenoxy polyethoxy ethanol (70% active)
[4]azobisisobutyronitrile
TiPure LW tradename for DuPont titanium dioxide pigment
TiPure R 941 tradename for DuPont titanium dioxide pigment
Unitane OR 450 tradename for American Cyanamid Titanium Dioxide pigment
Oncor 23A tradename for NL Industries Antimony Oxide pigment
Titanox RA47 tradename for NL Industries titanium dioxide pigment

TABLE 29

Preparation of Intraleucospheruloid Pigment Compositions
(parts by weight)

| Example No. 29- | | 1 | 2 | 3 | 4 | 5 |
|---|---|---|---|---|---|---|
| A. | Micronizing Step | | | | | |
| 1. | Trade Name | Zinc Oxide | Zirconium Oxide | Aluminum Oxide | Aluminum Hydrate | Barium Sulfate |
| | Pigment, dry basis | 30 | 40 | 30 | 40 | 30 |
| 2. | Surface Active Agent* Material | | | | | |
| | Alipal CO 433[1] | 10 | — | 10 | — | 10 |
| | Monazoline T[2] | — | 15 | — | — | — |
| | Triton X405[3] | 10 | 10 | 10 | 30 | 10 |
| | Ammonium Hydroxide 28% | — | — | — | 2 | 2 |
| | Acetic acid | — | 7 | — | — | — |
| 3. | Water, Quantity | 250 | 278 | 250 | 278 | 248 |
| 4. | Dispersion or Micronizing | | | | | |
| | Method | Sand | Sand | Ball | Ball | Sand |
| | Time, hours. approx. | 36 | 48 | 60 | 36 | 24 |
| | Temperature °C. | 28 | 28 | 28 | 28 | 28 |
| | Average Particle Size Diameter (microns) | <0. | <0.2 | <0.2 | <0.2 | <0.2 |
| 5. | Separation, Screening (X) | X | X | X | X | X |
| 6. | Water Dilution | 200 | 200 | 200 | 200 | 200 |
| 7. | Yield | | | | | |
| | Aqueous Pigment Dispersion | 500 | 550 | 500 | 550 | 500 |
| B. | Polymerization Step | | | | | |
| 8. | Surface Active Agent* | | | | | |
| | a. Quantity, type | 45[3] | 15[2] | 20[1] | 40[3] | 20[1] |
| | b. Quantity, type | — | 30[3] | 20[3] | — | — |
| | Water | 55 | 48 | 60 | 60 | 80 |

TABLE 29-continued

Preparation of Intraleucospheruloid Pigment Compositions
(parts by weight)

| Example No. 29- | | 1 | 2 | 3 | 4 | 5 |
|---|---|---|---|---|---|---|
| | Acetic Acid | — | 7 | — | — | — |
| 9. | Monomer Material Non Crosslinking | | | | | |
| | Styrene | 40 | 10 | — | 40 | 20 |
| | Methylmethacrylate | — | 40 | 40 | — | 25 |
| | Diethylaminoethylmethacrylate | 5 | — | 5 | 5 | — |
| 10. | Polymerization Initiator | | | | | |
| | AZDN[4] | 2 | 2 | 2 | 2 | 2 |
| 11. | Polymerization Conditions | | | | | |
| | Time, hours | 4 | 4 | 4 | 4 | 4 |
| | Temperature, °C. | 80 | 80 | 80 | 80 | 80 |
| | Conversion, Approx. 100% (X) | X | X | X | X | X |
| 12. | Intraleucospheruloid Pigment Dispersion | | | | | |
| | Yield | 645 | 700 | 645 | 695 | 645 |

*capable of effecting emulsion polymerization
[1]sodium salt of a sulfate ester of an alkylphenoxy poly(ethylenoxy)ethanol (28% active)
[2]substituted imidazoline of tall oil (100% active)
[3]octylphenoxy polyethoxy ethanol (70% active)
[4]azobisisobutyronitrile

TABLE 30

Preparation of Intraleucospheruloid Pigment Compositions
(parts by weight)

| Example No. 30- | | 1 | 2 | 3 | 4 | 5 |
|---|---|---|---|---|---|---|
| A. | Dispersion and/or Micronizing Step | | | | | |
| 1. | Trade Name | Celite 281 | HiSil 233 | HiSil 404 | Cab-O-Sil H5 | Silene EF |
| | Pigment, dry basis | 50 | 40 | 40 | 40 | 40 |
| 2. | Surface Active Agent* Material | | | | | |
| | Tamol SN[1] | 2 | — | — | — | 2 |
| | Duponol ME[2] | 2 | — | — | — | 2 |
| | Triton X405[3] | 10 | 10 | 60 | 10 | 10 |
| | Monazoline T[4] | — | 10 | 10 | 10 | — |
| | Ammonium Hydroxide 28% | 2 | — | — | — | 2 |
| | Acetic Acid | — | 5 | 5 | 5 | — |
| 3. | Water, Quantity | 284 | 285 | 285 | 285 | 294 |
| 4. | Dispersion or Micronizing | | | | | |
| | Method | Ball | Sand | Ball | Sand | Sand |
| | Time, hours approx. | 36 | 24 | 36 | 24 | 24 |
| | Average Particle Size Diameter (microns) | <0.2 | <0.1 | <0.2 | <0.02 | <0.2 |
| | Temperature °C. | 28 | 28 | 28 | 28 | 28 |
| 5. | Separation, Screening (X) | X | X | X | X | X |
| 6. | Water Dilution | 200 | 200 | 200 | 200 | 200 |
| 7. | Yield | | | | | |
| | Aqueous Pigment Dispersion | 550 | 550 | 600 | 550 | 550 |
| B. | Polymerization Step | | | | | |
| 8. | Surface Active Agent* | | | | | |
| | a. Quantity, type | 12[2] | 30[3] | — | 40[3] | 10[2] |
| | b. Quantity, type | 20[3] | — | — | — | 20[3] |
| | Water | 68 | 70 | 100 | 60 | 70 |
| 9. | Monomer Material Non Crosslinking | | | | | |
| | Vinyltoluene | 30 | 45 | — | 20 | 50 |
| | Cyclohexylmethacrylate | 10 | — | 45 | 20 | — |
| | Acrylonitrile | 5 | — | — | 5 | — |
| 10. | Polymerizaton Initiator | | | | | |
| | AZDN[5] | — | 2.5 | 2.5 | 2.5 | — |
| | Potassium Persulfate | 2.5 | — | — | — | 2.5 |
| | Sodium Bisulfite | 1.25 | — | — | — | 1.25 |
| 11. | Polymerization Conditions | | | | | |
| | Time, hours | 6 | 5 | 5 | 5 | 6 |
| | Temperature, °C. | 70 | 80 | 80 | 80 | 70 |
| | Conversion Approx. 100% (X) | X | X | X | X | X |
| 12. | Intraleucospheruloid Pigment Dispersion | | | | | |
| | Yield | 695 | 695 | 745 | 695 | 700 |

TABLE 30-continued

Preparation of Intraleucospheruloid Pigment Compositions
(parts by weight)

| Example No. 30- | 1 | 2 | 3 | 4 | 5 |
|---|---|---|---|---|---|
| Latex (X) | — | — | — | X | — |

*capable of effecting emulsion polymerization
[1]sodium salt of condensed napthaline sulfonic acid
[2]sodium lauryl sulfate (100% active)
[3]octylphenoxy polyethoxy ethanol (70% active)
[4]substituted imidazoline of tall oil (100% active)
[5]azobisisobutyronitrile
Celite 281 tradename for JMC diatomaceous silica
HiSil 233 tradename for PPG Industries precipitated silica, reinforcing grade
HiSil 404 tradename for PPG Industries precipitated silica, paper grade
Cab-O-Sil H5 tradename for Cabot Corporation pyrogenic silica
Silene EF tradename for PPG Industries precipitated silica, calcium modified.

TABLE 31

Preparation of Intraleucospheruloid Pigment Compositions
(parts by weight)

| Example No. 31- | | 1 | 2 | 3 | 4 | 5 |
|---|---|---|---|---|---|---|
| A. | Dispersion and/or Micronizing Step | | | | | |
| 1. | Trade Name HO | Al-Sil-Ate Zirconium | Excelopax grade Silicate | Reinforcing grade Wet PP Silica | Paper Colloidal Wet PP Silica | Ludox Silica HS 40 |
| | Pigment, dry basis | 30 | 40 | 35 | 35 | 40 |
| 2. | Surface Active Agent* Material | | | | | |
| | Alipal CO 433[1] | 10 | 10 | — | — | — |
| | Duponol ME[2] | 1 | 1 | 2 | — | — |
| | Armac T[3] | 2 | 2 | 2 | 2 | — |
| | Triton 400[4] | — | — | — | — | — |
| | Triton X 405[5] | — | — | 10 | 10 | — |
| | Acetic Acid | — | — | — | — | — |
| | Ammonium Hydroxide 28% | 2 | 2 | 2 | 2 | — |
| 3. | Water, Quantity | 255 | 245 | 249 | 251 | 260 |
| 4. | Dispersion or Micronizing | | | | | |
| | Method | Sand | Sand | Sand | Sand | — |
| | Time, hours, approx. | 24 | 48 | 24 | 24 | — |
| | Temperature °C. | 28 | 28 | 28 | 28 | 28 |
| | Average Particle Size Diameter (microns) | <0.2 | <0.2 | <0.1 | <0.2 | <0.02 |
| 5. | Separation, Screening (X) | X | X | X | X | — |
| 6. | Water Dilution | 200 | 300 | 200 | 200 | 200 |
| 7. | Yeild Aqueous Pigment Dispersion | 500 | 600 | 500 | 500 | 500 |
| B. | Polymerization Step | | | | | |
| 8. | Surface Active Agent* | | | | | |
| | a. Quantity, type | 10[2] | 10[2] | 10[1] | 10[2] | 40[5] |
| | b. Quantity, type | 20[5] | 20[5] | 30[5] | 20[5] | — |
| | Water | 70 | 70 | 60 | 70 | 60 |
| 9. | Monomer Material Non Crosslinking | | | | | |
| | Styrene | 40 | — | 20 | 20 | 21 |
| | 4-Vinylpyridine | — | — | — | — | 10.5 |
| | Methacrylic Acid | — | 2 | — | — | 8.5 |
| | Acrylonitrile | 10 | — | 5 | 5 | — |
| | Methylmethacrylate | — | 48 | 20 | 20 | 30 |
| 10. | Polymerization Initiator | | | | | |
| | AZDN[6] | 2 | 2 | 2 | 2 | — |
| | Potassium Persulfate | — | — | — | — | 3 |
| | Sodium Bisulfite | — | — | — | — | 1.5 |
| 11. | Polymerization Conditions | | | | | |
| | Time, hours | 4 | 4 | 4 | 4 | 6 |
| | Temperature, °C. | 80 | 80 | 80 | 80 | 70 |
| | Conversion, Approx. 100% (X) | X | X | X | X | X |
| 12. | Intraleucospheruloid Pigment Dispersion | | | | | |
| | Yeild | 650 | 750 | 645 | 645 | 670 |
| | Latex (X) | — | — | X | — | X |

*capable of effecting emulsion polymerization
[1]sodium salt of a sulfate ester of an alkyphenoxy poly(ethyleneoxy) ethanol (28% active)
[2]sodium lauryl sulfate (100% active)
[3]N-tallow amine acetate (100% active)
[4]stearyl dimethyl benzyl ammonium chloride (82% active)
[5]octylphenoxy polyethoxy ethanol (70% active)
[6]azobisisobutyronitrile
Al-Sil-Ate HO tradename for Freeport Kaolin Aluminum silicate
Excelopax tradename for NL Industries Zirconium silicate
Ludox HS 40 tradename for DuPont colloidal silica

TABLE 32

Preparation of Intraleucospheruloid Pigment Compositions
(parts by weight)

| Example No. 32- | | 1 | | 2 | |
|---|---|---|---|---|---|
| A. | Dispersion and/or Micronizing Step | | | | |
| | 1. Trade Name | HiSil 233 | TiPure R941 Slurry | HiSil 404 | Zirconium Oxide |
| | Pigment, dry basis | 20 | 40 | 20 | 40 |
| | 2. Surface Active Agent* Material | | | | |
| | Duomeen T[1] | 20 | | — | |
| | Triton X 405[2] | — | | 10 | |
| | Alipal CO 433[3] | — | | 20 | |
| | Acetic Acid | 10 | | — | |
| | Ammonium Hydroxide 28% | — | | 10 | |
| | 3. Water, Quantity | 310 | | 300 | |
| | 4. Dispersion or Micronizing | | | | |
| | Method | Ball | | Sand | |
| | Time, hours, approx. | 60 | | 48 | |
| | Temperature °C. | 28 | | 28 | |
| | Average Particle Size Diameter (microns) | <0.1 | | <0.2 | |
| | 5. Separation, Screening (X) | X | | X | |
| | 6. Water Dilution | 300 | | 300 | |
| | 7. Yield | | | | |
| | Aqueous Pigment Dispersion | 700 | | 700 | |
| B. | Polymerization Step | | | | |
| | 8. Surface Active Agent* | | | | |
| | a. Quantity, type | 20[1] | | 20[2] | |
| | b. Quantity, type | — | | 25[3] | |
| | Water | 70 | | 55 | |
| | Acetic Acid | 10 | | — | |
| | 9. Monomer Material Non Crosslinking | | | | |
| | Methylmethacrylate | 10 | | 15 | |
| | Styrene | 40 | | 35 | |
| | Dimethylaminoethylmethacrylate | — | | 5 | |
| | 10. Polymerization Initator | | | | |
| | AZDN[4] | 3 | | 3 | |
| | 11. Polymerization Conditions | | | | |
| | Time, hours | 5 | | 5 | |
| | Temperature, °C. | 80 | | 80 | |
| | Conversion, approx. 100% (X) | X | | X | |
| | 12. Intraleucospheruloid Pigment | | | | |
| | Dispersion Yield | 850 | | 855 | |
| | Latex (X) | X | | — | |

*capable of effecting emulsion polymerization
[1]N-tallow trimethylene diamine (85% active)
[2]octylphenoxy polyethoxy ethanol (70% active)
[3]sodium salt of a sulfate ester of an alkylphenoxy poly(ethylenoxy) ethanol (28% active)
[4]azobisisobutyronitrile
HiSil 233 tradename for PPG Industries precipitated silica, reinforcing grade
TiPure R941 tradename for DuPont titanium Dioxide pigment
HiSil 404 tradename for PPG Industries precipitated silica, paper grade

TABLE 33

Preparation of Intraleucospheruloid Pigment Compositions
(parts by weight)

| Example No. 33- | | 1 | | 2 | |
|---|---|---|---|---|---|
| A. | Dispersion and/or Micronizing Step | | | | |
| | 1. Trade Name | Silene D | Alumina | HiSil 233 | Zinc Oxide |
| | Pigment, Dry Basis | 20 | 30 | 20 | 30 |
| | 2. Surface Active Agent* Material | | | | |
| | Duponol ME[1] | 5 | | 5 | |
| | Triton X405[2] | 15 | | 15 | |
| | Monaquat TIBO[3] | 2 | | — | |
| | Ammonium Hydroxide 28% | 5 | | — | |
| | 3. Water, Quantity | 273 | | 280 | |
| | 4. Dispersing or Micronizing Step | | | | |
| | Method | Ball | | Sand | |
| | Time, hours, approx. | 60 | | 48 | |
| | Temperature °C. | 28 | | 28 | |
| | Average particle size Diameter (microns) | <0.2 | | <0.2 | |
| | 5. Separation, Screening (X) | X | | X | |
| | 6. Water Dilution | 250 | | 300 | |
| | 7. Yield | | | | |
| | Aqueous Pigment Dispersion | 600 | | 650 | |
| B. | Polymerization Step | | | | |
| | 8. Surface Active Agent* | | | | |
| | a. Quantity, type | 10[1] | | 10[1] | |
| | b. Quantity, type | 10[2] | | 10[2] | |
| | Water | 80 | | 80 | |
| | 9. Monomer Material Non Crosslinking | | | | |
| | Vinyltoluene | 10 | | 50 | |

TABLE 33-continued

Preparation of Intraleucospheruloid Pigment Compositions
(parts by weight)

| Example No. 33- | 1 | 2 |
|---|---|---|
| Diethylaminoethylmethacrylate | 5 | 5 |
| Styrene | 40 | — |
| 10. Polymerization Initator | | |
| AZDN[4] | 2.5 | 2.5 |
| 11. Polymerization Conditions | | |
| Time, hours | 5 | 5 |
| Temperature, °C. | 80 | 80 |
| Conversion, Approx. 100% (X) | X | X |
| 12. Intraleucospheruloid | | |
| Pigment Dispersion | | |
| Yield | 755 | 805 |

*capable of effecting emulsion polymerization
[1] sodium lauryl sulfate (100% active)
[2] octylphenoxy polyethoxy ethanol (70% active)
[3] substituted imidazoline quaternized with benzyl chloride (100% active)
[4] azobisisobutyronitrile
Silene D tradename for PPG Industries precipitated silica, calcium modified
HISil 233 tradename for PPG Industries silica, reinforcing grade

TABLE 34

Preparation of Intraleucospheruloid Pigment Compositions
(parts by weight)

| Example No. 34- | 1 | 2 | 3 | 4 | 5 |
|---|---|---|---|---|---|
| A. Dispersion and/or Micronizing Step | | | | | |
| 1. Trade Name | TiPure R941 Slurry | Zinc Oxide | Alumina | Microcel T38 | Cab-O-Sil H-5 |
| Pigment, dry basis | 40 | 30 | 40 | 40 | 40 |
| 2. Surface Active Agent* | | | | | |
| Material | | | | | |
| Triton X405[1] | 10 | — | — | 10 | 10 |
| Duponol ME[2] | — | 2 | 2 | — | 2 |
| Tamol SN[3] | — | 2 | 2 | 2 | — |
| N-group polymer[5] | 20 | — | — | — | — |
| Tamol 731[4] | — | 20 | — | — | 20 |
| SAMV Amphoteric Copolymer[6] | — | — | 20 | 20 | — |
| 3. Water, Quantity | 280 | 246 | 286 | 278 | 278 |
| 4. Dispersing or Micronizing Step | | | | | |
| Method | Sand | Ball | Sand | Sand | Sand |
| Time, hours, approx. | 48 | 36 | 36 | 24 | 36 |
| Average particle size Diameter (microns) | 0.1-0.2 | <0.2 | <0.2 | <0.2 | <0.02 |
| Temperature °C. | 28 | 28 | 28 | 28 | 28 |
| 5. Separation, Screening (x) | X | X | X | X | X |
| 6. Water Dilution | 250 | 200 | 250 | 250 | 250 |
| 7. Yield | | | | | |
| Aqueous Pigment Dispersion | 600 | 500 | 600 | 600 | 600 |
| B. Polymerization Step | | | | | |
| 8. Surface Active Agent* | | | | | |
| a. Quantity, type | 40[1] | 10[2] | 20[1] | 10[2] | 10[1] |
| b. Quantity, type | — | — | 10[2] | — | 10[2] |
| Water | 50 | 85 | 65 | 85 | 75 |
| Ammonium Hydroxide 28% | 10 | 5 | 5 | 5 | 5 |
| 9. Monomer Material Non Crosslinking | | | | | |
| Methylmethacrylate | 40 | 20 | — | 20 | 45 |
| Cyclohexylmethacrylate | — | 20 | 40 | 25 | — |
| Acrylonitrile | 5 | 5 | 5 | — | 5 |
| 10. Polymerization Initiator | | | | | |
| AZDN[7] | 2 | 2 | 2 | 2 | 2 |
| 11. Polymerization Conditions | | | | | |
| Time, hours | 5 | 5 | 5 | 5 | 5 |
| Temperature, °C. | 80 | 80 | 80 | 80 | 80 |
| Conversion, Approx. 100% (X) | X | X | X | X | X |
| 12. Intraleucospheruloid | | | | | |
| Pigment Dispersion | | | | | |
| Yield | 745 | 645 | 745 | 745 | 750 |

TABLE 34-continued

Preparation of Intraleucospheruloid Pigment Compositions
(parts by weight)

| Example No. 34- | 1 | 2 | 3 | 4 | 5 |
|---|---|---|---|---|---|
| Latex (X) | X | — | — | — | X |

*capable of effecting emulsion polymerization
[1] octylphenoxy polyethoxy ethanol (70% active)
[2] sodium lauryl sulfate (100% active)
[3] sodium salt of condensed napthalene sulfonic acid
[4] sodium salt of polymeric carboxylic acid (100% active)
[5] homopolymer of 4-vinylpyridine
[6] copolymer of styrene, acrylonitrile, methacrylic acid and 4-vinylpyridine, ratio 25/10/29/36
[7] azobisisobutyronitrile
TiPure R941 tradename for DuPont titanium dioxide pigment
Micro-cel T38 Tradename for Johns-Mansville Corp. calcium silicate
Cab-O-Sil tradename for Cabot Corporation pyrogenic silica

TABLES 35–40

Preparation of Intraleucospheruloid/Organic Color Pigment Compositions, the Polymer Portion thereof being Noncross-linked

TABLE 35

Preparation of Intraleucospheruloid/Organic Color Pigment Compositions
(parts by weight)

| Example No. 35- | | 1 | 2 | 3 | 4 | 5 |
|---|---|---|---|---|---|---|
| 1. | Intraleucospheruloid Pigment Dispersion | | | | | |
| | Table No. | 28-1 | 28-2 | 28-3 | 28-4 | 28-5 |
| | Amount | 755 | 805 | 745 | 750 | 750 |
| | Amount dry basis | 95 | 95 | 85 | 90 | 90 |
| | Water | 1245 | 1195 | 1255 | 1250 | 1250 |
| | pH | 8–9 | 8–9 | 5–6 | 8–9 | 8–9 |
| 2. | Organic Pigment Dispersion | | | | | |
| | Table No. | 21-1 | 21-2 | 21-3 | 21-4 | 21-5 |
| | Quantity | 450 | 450 | 450 | 450 | 450 |
| | Pigment Solids | 25 | 25 | 20 | 30 | 20 |
| | Water | 50 | 50 | 50 | 50 | 50 |
| | pH | 8–9 | 5–6 | 8–9 | 8–9 | 5–6 |
| 3. | Temperature °C. | 28 | 28 | 28 | 28 | 28 |
| | pH | 8–9 | 6–7 | 6–7 | 8–9 | 6–7 |
| 4. | Nitrogenous Material | | | | | |
| | Tetraethylenepentamine | .2 | — | — | 2 | 2 |
| 5. | Temperature °C. | 28 | 28 | 28 | 28 | 28 |
| | pH | 8–9 | 6–7 | 6–7 | 8–9 | 6–7 |
| 6. | Bonding Agent Material | | | | | |
| | "N" sodium silicate 28% | 50 | — | — | — | 17 |
| | Z6020 Silane[1] | — | — | 4 | — | 2 |
| | Aminoplast Dispersion[2] | — | — | — | 10 | — |
| 7. | Destabilizing Agent Material | | | | | |
| | (a) Acid (X)[3] | X | — | — | X | — |
| | (b) Base (X) | — | — | — | — | — |
| | (c) Alcohol (X)[4] | — | X | X | — | X |
| 8. | Temperature, °C. | 28 | 28 | 28 | 28 | 28 |
| | pH | 5–6 | 6–7 | 6–7 | 5–6 | 6–7 |
| 9. | Reaction Temperature, °C. | 75 | 70 | 70 | 75 | 70 |
| 10. | Reaction Time, hours, Approx. | 5 | 5 | 4 | 5 | 5 |
| 11. | Primary Particle Size Diameter (microns) | <4.0 | <4.0 | <4.0 | <4.0 | <4.0 |
| 12. | Yield-Intraleucospheruloid/ Organic Pigment Composition Dispersion Approx. | 2500 | 2500 | 2500 | 2500 | 2500 |
| 13. | Pigment Recovery Method | | | | | |
| | (a) Filtration (X) | X | — | X | X | X |
| | (b) Spray Drying (X) | — | X | — | — | — |
| 14. | Product Available as: | | | | | |
| | (a) Wet Coagulum (X) | X | — | X | X | X |
| | (b) Dry Coagulum (X)[5] | X | — | X | X | X |
| | (c) Spray Dried Powder (X) | — | X | — | — | — |
| 15. | Intraleucospheruloid/ Organic pigment Composition | | | | | |

TABLE 35-continued

Preparation of Intraleucospheruloid/Organic Color Pigment Compositions
(parts by weight)

| Example No. 35- | 1 | 2 | 3 | 4 | 5 |
|---|---|---|---|---|---|
| Yield (Dry Basis) | 134 | 176 | 109 | 130 | 117 |

[1] N-(2-aminoethyl)-3-aminopropyltrimethoxysilane
[2] preformed condensation product from the aqueous reaction of 1 mole of urea with 1½ mole of formaldehyde water dispersible
[3] aq. HCl
[4] isopropyl
[5] when dried

TABLE 36

Preparation of Intraleucospheruloid/Organic Pigment Compositions
(parts by weight)

| Example No. 36 | | 1 | 2 | 3 | 4 | 5 |
|---|---|---|---|---|---|---|
| 1. | Intraleucospheruloid Pigment Dispersion | | | | | |
| | Table No. | 29-1 | 29-2 | 29-3 | 29-4 | 29-5 |
| | Amount | 645 | 700 | 645 | 695 | 645 |
| | Amount Dry Basis | 75 | 90 | 75 | 85 | 75 |
| | Water | 1355 | 1300 | 1355 | 1305 | 1355 |
| | pH | 7–8 | 5–6 | 7–8 | 7–8 | 7–8 |
| 2. | Organic Pigment Dispersion | | | | | |
| | Table No. | 22-1 | 22-2 | 22-3 | 22-4 | 22-5 |
| | Quantity | 450 | 450 | 450 | 450 | 450 |
| | Pigment Solids | 30 | 30 | 25 | 25 | 20 |
| | Water | 50 | 50 | 50 | 50 | 50 |
| | pH | 8–9 | 8–9 | 5–6 | 7–8 | 7–8 |
| 3. | Temperature °C. | 28 | 28 | 28 | 28 | 28 |
| | pH | 7–8 | 6–7 | 6–7 | 7–8 | 7–8 |
| 4. | Nitrogenous Material | | | | | |
| | Monazoline T[1] | 2 | — | — | — | — |
| | PEI 18[2] | — | 10 | — | — | — |
| | Tetraehylenepentamine | — | — | 2 | — | 2 |
| 5. | Temperature °C. | 28 | 28 | 28 | 25 | 25 |
| | pH | 7–8 | 6 | 6–7 | 7–8 | 7–8 |
| 6. | Bonding Agent Material | | | | | |
| | Z6020 Silane[3] | 1 | — | — | — | — |
| | Urea | — | 10 | — | — | — |
| | Formaldehyde 30% | — | 30 | — | — | — |
| 7. | Destabilizing Agent Material | | | | | |
| | (a) Acid (X)[4] | — | X | X | — | X |
| | (b) Base (X) | — | — | — | — | — |
| | (c) Alcohol (x)[5] | X | — | — | X | — |
| 8. | Temperature, °C. | 28 | 28 | 28 | 28 | 28 |
| | pH | 7–8 | 5–6 | 5–6 | 7–8 | 5–6 |
| 9. | Reaction Temperature, °C. | 75 | 80 | 75 | 80 | 75 |
| 10. | Reaction Time, hours, Approx. | 5 | 5 | 4 | 5 | 5 |
| 11. | Primary Particle Size Diameter (microns) | <4.0 | <4.0 | <4.0 | <4.0 | <4.0 |
| 12. | Yield - Intraleucospheruloid/ Organic Pigment Composition Dispersion Approx. | 2500 | 2500 | 2500 | 2500 | 2500 |
| 13. | Pigment Recovery Method | | | | | |
| | (a) Filtration (X) | — | X | X | X | X |
| | (b) Spray Drying (X) | X | — | — | — | — |
| 14. | Product Available As | | | | | |
| | (a) Wet Coagulum (X) | — | X | X | X | X |
| | (b) Dry Coagulum (X)[6] | — | X | X | X | X |
| | (c) Spray Dried Powder (X) | X | — | — | — | — |
| 15. | Intraleucospheruloid/ Organic Pigment Composition | | | | | |

TABLE 36-continued

Preparation of Intraleucospheruloid/Organic Pigment Compositions
(parts by weight)

| Example No. 36 | 1 | 2 | 3 | 4 | 5 |
|---|---|---|---|---|---|
| Yield (dry basis) | 149 | 142 | 100 | 110 | 95 |

[1] substituted imidazoline of tall oil 100% active
[2] water soluble polyethyleneimine
[3] —N-(2-aminoethyl)-3-aminopropyltrimethoxysilane
[4] acetic
[5] isopropyl
[6] when dried

TABLE 37

Preparation of Intraleucospheruloid/Organic Color Compositions
(parts by weight)

| Example No. 37- | 1 | 2 | 3 | 4 | 5 |
|---|---|---|---|---|---|
| 1. Intraleucospheruloid Pigment Dispersion | | | | | |
| Table No. | 30-1 | 30-2 | 30-3 | 30-4 | 30-5 |
| Amount | 695 | 695 | 745 | 695 | 700 |
| Amount Dry Basis | 95 | 85 | 85 | 85 | 90 |
| Water | 1305 | 1305 | 1255 | 1305 | 1300 |
| pH | 7–8 | 5–6 | 5–6 | 5–6 | 7–8 |
| 2. Organic Pigment Dispersion | | | | | |
| Table No. | 23-1 | 23-2 | 23-3 | 23-4 | 23-5 |
| Quantity | 36 | 450 | 45 | 450 | 450 |
| Pigment Solids | 2 | 25 | 3 | 20 | 25 |
| Water | 64 | 50 | 55 | 50 | 50 |
| pH | 5–6 | 7–8 | 8–9 | 8–9 | 7–8 |
| 3. Temperature ° C. | 28 | 28 | 28 | 28 | 28 |
| pH | 6–7 | 6–7 | 6–7 | 6–7 | 7–8 |
| 4. Nitrogenous Material | | | | | |
| Tetraethylenepentamine | — | 2 | 1 | — | 1 |
| Monaquat TIBC[1] | — | — | 1 | — | 1 |
| 5. Temperature ° C. | 28 | 28 | 28 | 28 | 28 |
| pH | 6–7 | 6 | 6 | 6 | 7–8 |
| 6. Bonding Agent Material | | | | | |
| "N" Sodium Silicate 28% | 25 | — | — | — | 50 |
| Z6020 Silane[2] | — | — | — | 2 | — |
| 7. Destabilizing Agent Material | | | | | |
| (a) Acid (X)[3] | X | X | X | X | X |
| (b) Base (X) | — | — | — | — | — |
| (c) Alcohol (X) | — | — | — | — | — |
| 8. Temperature, ° C. | 28 | 28 | 28 | 28 | 28 |
| pH | 5–6 | 5–6 | 5–6 | 5–6 | 5–6 |
| 9. Reaction Temperature, ° C. | 80 | 80 | 80 | 80 | 80 |
| 10. Reaction Time, Hours, Approx. | 4 | 4 | 4 | 4 | 4 |
| 11. Primary Particle Size Diameter (microns) | <4.0 | <4.0 | <4.0 | <4.0 | <4.0 |
| 12. Yield - Intraleucospheruloid/ Organic Pigment Composition Dispersion | 2100 | 2500 | 2100 | 2500 | 2500 |
| 13. Pigment Recovery Method | | | | | |
| (a) Filtration (X) | X | X | X | X | X |
| (b) Spray Drying (X) | — | — | — | — | — |
| 14. Product Available As | | | | | |
| (a) Wet Coagulum (X) | X | X | X | X | X |
| (b) Dry Coagulum (X)[4] | X | X | X | X | X |
| (c) Spray Dried Powder (X) | — | — | — | — | — |
| 15. Intraleucospheruloid/ Organic Pigment Composition Yield (dry basis) | 104 | 110 | 88 | 107 | 129 |

[1] substituted imidazoline of tall oil quaternized with benzyl chloride 100% active
[2] —N-(2-aminoethyl)-3-aminopropyltrimethoxysilane
[3] dil. H$_2$SO$_4$
[4] when dried

TABLE 38

Preparation of Intraleucospheruloid/Organic Color Pigment Compositions
(parts by weight)

| Example No. 38- | 1 | 2 | 3 | 4 | 5 |
|---|---|---|---|---|---|
| 1. Intraleucospheruloid Pigment Dispersion | | | | | |
| Table No. | 31-1 | 31-2 | 31-3 | 31-4 | 31-5 |
| Amount | 650 | 750 | 645 | 645 | 670 |
| Amount Dry Basis | 80 | 90 | 80 | 80 | 110 |
| Water | 1350 | 1250 | 1355 | 1355 | 1330 |
| pH | 7–8 | 7–8 | 7–8 | 7–8 | 7–8 |
| 2. Organic Pigment Dispersion | | | | | |
| Table No. | 24-1 | 24-2 | 24-3 | 24-4 | 24-5 |
| Quantity | 450 | 450 | 45 | 36 | 450 |
| Pigment Solids | 25 | 30 | 2 | 2 | 25 |
| Water | 50 | 50 | 55 | 64 | 50 |
| pH | 8–9 | 8–9 | 5–6 | 5–6 | 8–9 |
| 3. Temperature ° C. | 28 | 28 | 28 | 28 | 28 |
| pH | 7–8 | 7–8 | 6–7 | 6–7 | 7–8 |
| 4. Nitrogenous Material | | | | | |
| Duomac T[1] | 2 | — | — | — | 2 |
| Armac T[2] | — | 2 | — | — | — |
| 5. Temperature ° C. | 28 | 28 | 28 | 28 | 28 |
| pH | 7–8 | 7–8 | 6–7 | 6–7 | 7–8 |
| 6. Bonding Agent Material | | | | | |
| Urea | 10 | — | — | — | — |
| Formaldehyde 37% | 20 | 20 | — | — | — |
| Melamine (recrystallized) | 10 | 10 | — | — | — |
| Aminoplast dispersion[3] | — | — | — | — | 20 |
| 7. Destabilizing Agent Material | | | | | |
| (a) Acid (X)[4] | X | X | — | — | X |
| (b) Base (X) | — | — | — | — | — |
| (c) Alcohol (X)[5] | — | — | X | X | X |
| 8. Temperature, ° C. | 28 | 28 | 28 | 28 | 28 |
| pH | 5–6 | 5–6 | 6–7 | 6–7 | 5–6 |
| 9. Reaction Temperature, ° C. | 80 | 80 | 80 | 80 | 80 |
| 10. Reaction Time, hours, approx. | 5 | 5 | 5 | 5 | 5 |
| 11. Primary Particle Size Diameter (microns) | <4.0 | <4.0 | <4.0 | <4.0 | <4.0 |
| 12. Yield - Intraleucospheruloid Organic Pigment Composition Dispersion | 2500 | 2500 | 2100 | 2100 | 2500 |
| 13. Pigment Recovery Method | | | | | |
| (a) Filtration (X) | X | X | — | X | — |
| (b) Spray Drying (X) | — | — | X | — | X |
| 14. Product Available As | | | | | |
| (a) Wet Coagulum (X) | X | X | — | X | — |
| (b) Dry Coagulum (X)[6] | X | X | — | X | — |
| (c) Spray Dried Powder (X) | — | — | X | — | X |
| 15. Intraleucospheruloid/ Organic Pigment Composition Yield (dry basis) | 105 | 120 | 82 | 82 | 135 |

[1] N-tallow trimethylene diamine diacetate 85% active
[2] N-tallow amine acetate 100% active
[3] preformed condensation product from the aqueous reaction of 1 mole of urea with 1½ moles of formaldehyde water dispersible
[4] acetic
[5] isopropyl
[6] when dried

TABLE 39

Preparation of Intraleucospheruloid/Organic Color Pigment Compositions
(parts by weight)

| Example No. 39- | 1 | 2 | 3 | 4 |
|---|---|---|---|---|
| 1. Intraleucospheruloid Pigment Dispersion | | | | |
| Table No. | 32-1 | 32-2 | 33-1 | 33-2 |
| Amount | 850 | 855 | 755 | 805 |
| Amount Dry Basis | 110 | 115 | 105 | 105 |
| Water | 1150 | 1145 | 1245 | 1195 |
| pH | 5 | 8–9 | 7–8 | 7–8 |
| 2. Organic Pigment Dispersion | | | | |
| Table No. | 25-1 | 25-2 | 25-3 | 25-4 |
| Quantity | 450 | 450 | 450 | 450 |
| Pigment Solids | 25 | 20 | 30 | 25 |
| Water | 50 | 50 | 50 | 50 |
| pH | 8–9 | 5–6 | 8–9 | 8–9 |
| 3. Temperature, ° C. | 28 | 28 | 28 | 28 |
| pH | 6–7 | 6–7 | 8–9 | 8–9 |
| 4. Nitrogenous Material | | | | |
| Tetraethylenepentamine | 2 | — | 2 | — |
| Monazoline T[1] | — | 2 | — | 2 |
| 5. Temperature ° C. | 28 | 28 | 28 | 28 |
| pH | 6–7 | 6–7 | 8–9 | 8–9 |
| 6. Bonding Agent Material | | | | |
| "N" Sodium silicate 28% | 50 | — | 50 | — |

TABLE 39-continued
Preparation of
Intraleucospheruloid/Organic Color Pigment Compositions
(parts by weight)

|   |   |   |   |   |   |
|---|---|---|---|---|---|
| | Urea | — | 10 | — | — |
| | Formaldehyde 37% | — | 30 | — | — |
| | Z 6020 Silane[2] | — | — | — | 2 |
| 7. | Destabilizing Agent Material | | | | |
| | (a) Acid (X)[3] | X | X | X | — |
| | (b) Base (X) | — | — | — | — |
| | (c) Alcohol (X)[4] | — | — | — | X |
| 8. | Temperature, °C. | 28 | 28 | 28 | 28 |
| | pH | 5–6 | 5–6 | 5–6 | 8–9 |
| 9. | Reaction Temperature, °C. | 75 | 75 | 75 | 80 |
| 10. | Reaction Time, hours Approx. | 4 | 4 | 4 | 5 |
| 11. | Primary Particle Size Diameter (microns) | <4.0 | <4.0 | <4.0 | <4.0 |
| 12. | Yield-Intraleucospheruloid/ Organic Pigment Composition Dispersion | 2500 | 2500 | 2500 | 2500 |
| 13. | Pigment Recovery Method | | | | |
| | (a) Filtration (X) | X | X | X | X |
| | (b) Spray Drying (X) | — | — | — | — |
| 14. | Product Available As | | | | |
| | (a) Wet Coagulum (X) | X | X | X | X |
| | (b) Dry Coagulum (X) | X | X | X | X |
| | (c) Spray Dried Powder (X) | — | — | — | — |
| 15. | Intraleucospheruloid/ Organic Pigment Composition Yield (dry basis) | 149 | 147 | 149 | 132 |

[1]substituted imidazoline of tall oil 100% active
[2]N-(2-aminoethyl)-3-aminopropyltrimethoxysilane
[3]acetic
[4]isopropyl
[5]when dried

TABLE 40
Preparation of
Intraleucospheruloid/Organic Color Pigment Compositions
(parts by weight)

| Example No. 40- | | 1 | 2 | 3 | 4 | 5 |
|---|---|---|---|---|---|---|
| 1. | Intraleucospheruloid Pigment Dispersion | | | | | |
| | Table No. | 34-1 | 34-2 | 34-3 | 34-4 | 34-5 |
| | Amount | 745 | 645 | 745 | 745 | 750 |
| | Amount Dry Basis | 85 | 75 | 85 | 85 | 90 |
| | Water | 1255 | 1355 | 1255 | 1255 | 1250 |
| | pH | 5–6 | 7–8 | 7–8 | 7–8 | 7–8 |
| 2. | Organic Pigment Dispersion | | | | | |
| | Table No. | 26-1 | 26-2 | 27-1 | 27-2 | 26-1 |
| | Quantity | 450 | 450 | 50 | 43 | 450 |
| | Pigment Solids | 20 | 20 | 4 | 3 | 20 |
| | Water | 50 | 50 | 50 | 57 | 50 |
| | pH | 5–6 | 8–9 | 8–9 | 5–6 | 6–7 |
| 3. | Temperature °C. | 28 | 28 | 28 | 28 | 28 |
| | pH | 5–6 | 8–9 | 8–9 | 6–7 | 6–7 |
| 4. | Nitrogenous Material Tetraethylenepentamine | 2 | 2 | 2 | 2 | 2 |
| 5. | Temperature °C. | 28 | 28 | 28 | 28 | 28 |
| | pH | 5–6 | 8–9 | 8–9 | 6–7 | 6–7 |
| 6. | Bonding Agent Material | | | | | |
| | SAMV amphoteric copolymer 20%[1] | 50 | — | — | — | — |
| | SMA copolymer 20%[2] | — | — | 50 | 50 | 50 |
| 7. | Destabilizing Agent Material | | | | | |
| | (a) Acid (X)[3] | — | X | X | X | — |
| | (b) Base (X)[4] | X | — | — | — | — |
| | (c) Alcohol (X)[5] | — | — | — | — | X |
| 8. | Temperature, °C. | 28 | 28 | 28 | 28 | 28 |
| | pH | 9–10 | 5–6 | 5–6 | 5–6 | 6–7 |
| 9. | Reaction Temperature, °C. | 75 | 80 | 80 | 80 | 80 |
| 10. | Reaction Time, hours, Approx. | 5 | 4 | 4 | 4 | 4 |
| 11. | Primary Particle Size Diameter (Microns) | <4.0 | <4.0 | <4.0 | <4.0 | <4.0 |
| 12. | Yield-Intraleucospheruloid/ Organic Pigment Composition Dispersion | 2500 | 2500 | 2500 | 2500 | 2500 |
| 13. | Pigment Recovery Method | | | | | |
| | (a) Filtration (X) | X | X | X | X | — |
| | (b) Spray Drying (X) | — | — | — | — | X |
| 14. | Product Available As | | | | | |
| | (a) Wet Coagulum (X)[6] | X | X | X | X | — |
| | (b) Dry Coagulum (X)[6] | X | X | X | X | — |
| | (c) Spray Dried Powder (X) | — | — | — | — | X |
| 15. | Intraleucospheruloid/ Organic Pigment Composition Yield (Dry Basis) | 115 | 90 | 99 | 98 | 164 |

[1]Copolymer of styrene, acrylonitrile, methacrylic acid and 4-vinylpyridine, ratio 25/10/29/36
[2]Copolymer of styrene, methacrylic acid and acrylonitrile, ratio 25/65/10
[3]aq. HCl
[4]aq. NaOH
[5]isopropyl
[6]when dried

Other Examples

It was shown in Example 3 that the spheruloids of the composition may be produced initially as noncross-linked particles, and be thereafter cross-linked by absorbing cross-linking monomer thereinto and subjecting the same to further polymerization. It has been thus shown that any of the noncross-linked products exemplified may be prepared in cross-linked form by the concurrent or sequential polymerization therewith of cross-linking monomers.

Since the criteria common to the noncross-linked and cross-linked embodiments of the invention are that the products be insoluble in the vehicle of intended use and have a different refractive index than the latter, it will be apparent from the foregoing that the cross-linking monomers, in the Examples producing cross-linked products, may also be replaced by noncross-linking monomers, where the criteria will be satisfied by the environment of use.

While there have been described herein what are at present considered preferred embodiments of the invention, it will be obvious to those skilled in the art that modifications and changes may be made therein without departing from the essence of the invention. For example, the micronized materials in liquid media may be stored after preparation, especially if they contain adequate emulsifier, such previously prepared micronized dispersions may be blended, preferably under further micronization, to provide in liquid media micronized mixed pigments for the process; the modes of combining, heating and polymerizing the ingredients may be varied dependent upon the volumes of materials being handled in manners known to those skilled in the emulsion polymerization art; etc. It is therefore understood that the exemplary embodiments are illustrative and not restrictive of the invention, the scope of which is defined in the appended claims, and that all modifications that come within the meaning and range of equivalents of the claims are intended to be included therein.

This application is one of the following series of applications:

| Number | Case Number | Serial Number | Title |
|---|---|---|---|
| First | 90-A | 712,257 | Intrachromospheruloid Pigments and Processes for Producing Same |
| Second | 90-B | 712,254 | Intraleucospheruloid Pigments and Processes for Producing Same |
| Third | 90-C | 712,255 | Intrachromospheruloid/Inorganic Pigment Compositions and Processes for Producing Same |
| Fourth | 90-D | 712,256 | Intraleucospheruloid/Organic Color Pigment Compositions and Processes for Producing Same |
| Fifth | 90-E | 712,252 | Intrachromospheruloid/Intraleucospheruloid Pigment Compositions and Processes for Producing Same |
| Sixth | 90-F | 712,253 | Intrachromoleucospheruloid Pigment Compositions and Processes for Producing Same |

All of the cases of this series are herein incorporated by reference. The titles of the respective cases indicate the lines of division between the subjects matter thereof. Thus the product of the first case consists essentially of transparent emulsion polymer particles, preferably cross-linked to insolubility in physical solvents and having primary particles of colloidal size (spheruloids), enhancing the optical properties of still smaller particles of organic color pigment (chromo pigment) embedded within them (intra). The second case, in lieu of the organic color pigment has embedded within its spheruloids inorganic white pigment (leuco pigment) enhanced thereby. The product of the third case is a special combination of intrachromospheruloid pigment affixed to leuco pigment and coloring the light reaching and reflected from the latter. The product of the fourth case is a special combination of intraleucospheruloid pigment having chromo pigment material affixed thereto and illuminating the same. The product of the fifth case is a special combination of intrachromospheruloid and intraleucospheruloid pigments bonded together giving mutually enhanced tinctorial properties. The product of the sixth case differs from the foregoing in that its spheruloids have embedded therein and enhance the tinctorial effects of composite particles of essentially transparent organic color (chromo) and inorganic white (leuco) components wedded to each other.

Also incorporated by reference herein are our copending applications Ser. Nos. 712,213 and 712,160 (Cases 88 and 89) filed concurrently herewith and respectively entitled "Improved Vinylic Filler Products and Processes for Producing Same" and "Improved Vinylic Filler Pigments and Processes for Producing Same", which copending applications apply to materials different from those concerned in the above listed series of applications, i.e. non-intrachromo- and non-intraleuco- pigment materials, the applicants' soft powdering techniques constituting parts of certain combinations disclosed and claimed in the present application.

What is claimed is:

1. A process for producing insoluble intraleucospheruloid/organic color pigment composition, which process comprises, in combination:
   (a) providing in liquid medium a particulate pigment composition consisting essentially of inorganic leuco pigment composition dispersed in said liquid medium with 0–100% by weight of the total of surface active agent material set forth in (c), said inorganic pigment composition being selected from the class consisting of the inorganic opaque white pigments and the inorganic transparent white pigments having refractive indicies different from that of the cross-linked organic polymer produced by step (d), and combinations of any two or more of the foregoing, having primary particles of an average size less than 0.2 microns in diameter
   (b) forming an aqueous emulsion polymerization system consisting essentially of (1) the composition of (a), (2) the balance, if any, of 100% of the total of surface active agent material set forth in (c), (3) monomer material selected in a ratio of said monomer material to said pigment composition lying in the range of 100:1 to 1:20 by weight, said monomer material being ethylenically unsaturated and being monomer material selected from the class consisting of (i) monomer material polymerizable through a single ethylenically unsaturated group in the amount of 0% to 99.8% by weight of said added monomer material and (ii) monomer material polymerizable through a plurality of ethylenically unsaturated groups in an amount, in the range of 0.2 to 100% by weight of said added monomer material, sufficient to produce polymer cross-linked to essential insolubility in any physical solvent and (4) emulsion polymerization initiator in an effective amount in the range of 0.2 to 10% by weight of the said added monomer material dispersed in an aqueous medium;
   (c) the ratio of the total of the surface active agent material present after (b) to said particulate pigment composition and monomer material lying in the range of 2:1 to 1:40 by weight and said total of surface active agent material being selected from the class of polymeric and nonpolymeric surface active agents and combinations thereof capable of effecting emulsion polymerization of the selected ethylenically unsaturated monomer material to yield polymer particles with the inorganic pigment provided in step (a) imbedded therein;
   (d) effecting polymerization of the combination formed in (b) at sufficient temperatures in the range of 0 to 200° C. for sufficient time in the range of a few minutes to 24 hours to permit the polymerization to proceed far enough in the range from 50 to 100% conversion by weight of said monomer material to produce in aqueous dispersion an intraleucospheruloid pigment consisting essentially of spheruloids of organic polymer material, cross-linked to essential insolubility in any physical solvent, having primary particles of an average size not exceeding 4 microns in diameter, and having embedded therein the still smaller size particles of said inorganic particulate pigment composition;
   (e) providing a particulate organic color pigment combination consisting essentially of organic color pigment composition dispersed in an aqueous medium with from 0 to 150 parts by weight of surface active agent material per 100 parts by weight of said organic color pigment composition, said organic color pigment composition being essentially insoluble in water and having primary particles of an average size less than 0.2 micron in diameter, and said surface active agent material being selected from the class consisting of the polymeric and nonpolymeric surface active agents and combinations thereof;
   (f) combining in a weight ratio in the range of 1:100 to 100:1, dry basis, the aqueous dispersions formed in steps (d) and (e), with from 0 to an equal weight, based on the organic color pigment present, of pigment bonding agent material, and from 0 to an equal weight, based on the organic color pigment present, of nitrogeneous material, and destabilizing the combination to form an aqueous slurry of intraleucospheruloid/organic color pigment composition; and
   (g) recovering said intraleucospheruloid/organic color pigment composition.

2. A process as claimed in claim 1, in which the ratio in step (c) is selected to produce intraleucospheruloid pigment dispersion in step (d) in the form of a latex for combining in step (f).

3. A process according to claim 1, in which the ethylenically unsaturated monomer material in step (b) comprises several portions sequentially added and sequentially polymerized in step (d), at least one of said several portions comprising monomer material polymerizable through at least two ethylenically unsaturated groups in a sufficient proportion to cross-link the polymer of the intraleucospheruloids to essential insolubility in any physical solvent.

4. A process according to claim 1, in which the intraleucospheruloid pigment composition formed in step (d) has its primary particles of an average size not exceeding 0.5 micron in diameter.

5. A process according to claim 1, in which the monomer material in step (b) (ii) having a plurality of polymerizable ethylenically unsaturated groups, consists essentially of material copolymerizable with vinyl monomers and selected from the unsaturated conjugated drying oils and their acids and derivatives of the foregoing, the ratio of said drying oil material to the other monomer material in step (b) lying in the range of 0.2:99.8 to 20:80 by weight.

6. A process according to claim 1, wherein said organic color pigment composition supplied for step (e) is a relatively coarse particulate organic color pigment composition and in step (e) is micronized in the aqueous medium with the aid of the surface active agent present therein until said organic color pigment composition has primary particles of an average size of less then 0.02 micron in diameter.

7. A process according to claim 1, wherein said inorganic pigment composition supplied for step (a) is a relatively coarse particulate inorganic pigment composition and in step (a) is micronized in the liquid medium with the aid of any surface active agent present therein until said inorganic pigment composition has primary particles of an average size less than 0.2 micron in diameter.

8. A process according to claim 7, wherein said inorganic pigment composition supplied for step (a) is micronized therein until said inorganic pigment composition has primary particles of an average size greater than 0.1 micron and less than 0.2 micron in diameter.

9. A process according to claim 7, wherein the said inorganic pigment composition supplied for step (a) is micronized with at least 2% by weight of the pigment bonding agent material set forth in step (a), based on the inorganic pigment composition.

10. A process according to claim 7, wherein the said inorganic pigment composition supplied for step (a) is micronized with at least 2% by weight of the nitrogenous material set forth in step (a), based on the inorganic pigment composition.

11. A process according to claim 7, wherein the said inorganic pigment composition supplied for step (a) is micronized with at least 2% by weight of the monomer material supplied in step (b(2)), based on the inorganic pigment composition.

12. A process according to claim 1, wherein the said 2% by weight of monomer material consists essentially of amine monomer material.

13. A process according to claim 1, in which the surface active agent material employed in step (c) and (e) comprises polymeric surface active agent.

14. A process according to claim 13, in which said polymeric surface active agent in one of steps (c) and (e) has basic groups at least in part in the form of water soluble salts and in the other of said steps (c) and (e) has acidic groups at least in part in the form of water soluble salts.

15. A process according to claim 1, wherein step (g) is practiced by separating serum from the coagulum to provide the intraleucospheruloid/organic color pigment composition as wet coagulum.

16. A process according to claim 1, which comprises, in step (g) drying the intraleucospheruloid/organic color pigment produced by step (f).

17. A process according to claim 1, wherein (h) as part of step (g) the intraleucospheruloid/organic color pigment composition produced in aqueous slurry in step (f) is modified to contain 0.5 to 35 parts of material selected from the soft powdering agents per 100 parts of said pigment composition, dry basis by weight.

18. A process according to claim 17, which further comprises (i) as a part of step (g), after step (f), drying the modified composition to obtain the intraleucospheruloid/organic color pigment composition in soft powder form.

19. A process according to claim 17, which further comprises (i) as a part of step (g), after step (f), spray drying the modified composition to obtain the intraleucospheruloid/organic color pigment composition in particulate soft powder form.

20. A process according to claim 1, which further comprises
 (i) selecting cationic surface active agent in steps (c) and (e) to provide the aqueous dispersions formed in steps (d) and (f) with cationic surface active agent and
 (ii) in step (f) causing the said spheruloid pigment and the said organic color pigment to be coagulated by reacting the combination formed in step (f) with water soluble organic coagulant having groups selected from the class consisting of carboxyl, sulfate and sulfonic acid groups and salts thereof.

21. A process according to claim 20, wherein said organic coagulant is itself polymeric in nature.

22. A process according to claim 1, which comprises, in step (g), destabilizing the aqueous dispersion of intraleucospheruloid pigment composition and organic color pigment composition formed in step (f) with the aid of coagulant selected from the class consisting of
 (i) water soluble alcohols,
 (ii) pH adjustment materials of the group consisting of water soluble inorganic acids and inorganic bases,
 (iii) sodium chloride, and
 (iv) combinations of any two or more of the foregoing.

23. A process according to claim 1, which comprises in step (e),
 (i) combining, with the organic color pigment composition, from 5% to 100% by weight, based on the pigment, of resin selected from the class consisting of the water soluble and dispersible aminoplast resins preformed and formed in situ, and
 (ii) in step (f) insolubilizing the resin to facilitate the formation of the intraleucospheruloid/organic pigment composition.

24. A process according to claim 1, which further comprises
 (i) selecting in step (b) monomer material containing sufficient acidic monomer to provide the intraleucospheruloid pigment with groups selected from the class consisting of acid groups and their alkali metal and ammonium salts, and
 (ii) selecting in step (e) the surface active agent material so that the organic color pigment composition is combined with at least 2%, based on the weight thereof, of anionic surface active agent material, and
 (iii) in step (f) effecting the destabilization by causing the said spheruloid pigments and the organic color pigment combination to react with water soluble and dispersible organic materials selected from the class consisting of amines and imines and salts thereof.

25. A process according to claim 1, which further comprises
(i) selecting in step (b) monomer material containing sufficient monomer from the class consisting of amine monomers and salts thereof, to provide the intraleucospheruloid pigment with reactive groups, and
(ii) selecting in step (f) enough of said nitrogenous material so that the organic color pigment composition has combined thereon at least 2% based on the weight thereof, of said nitrogenous material, and
(iii) in step (f) effecting the destabilization by causing the said spheruloid pigment and the said organic color pigment to react with water soluble organic material having groups selected from the class consisting of carboxyl, sulfate and sulfonic acid groups and salts thereof.

26. A process according to claim 1, which further comprises
(i) selecting anionic surface active agent in steps (c) and (e) to provide the aqueous dispersions in steps (d) and (f) with anionic surface active agent and
(ii) in step (f) causing the said spheruloid pigments and the said organic color pigment composition to be coagulated by reacting the combination formed in step (f) with water soluble organic material selected from the class consisting of amines and imines and salts thereof.

27. A process according to claim 1, which further comprises
(i) selecting in steps (b) monomer material containing sufficient acidic monomer to form spheruloids which contain acidic groups and which after neutralization with water soluble base, are coagulable, and
(ii) after step (d) neutralizing with a water soluble base the acidic groups of the aqueously dispersed intraleucospheruloid pigment formed in step (d),
(iii) selecting in step (e) the surface active agent material so that the organic pigment composition is combined with at least 2%, based on the weight thereof, of anionic surface active agent material, and
(iv) in step (f) effecting the destabilization by coagulating the spheruloids and the organic color pigment material with water soluble coagulant selected from the class consisting of water soluble (i) alkaline-earth metal compounds, (ii) aluminum salts, (iii) zinc salts, (iv) oleophilic amine acid salts, and (v) combination of the foregoing.

28. A process according to claim 1, which further comprises selecting anionic surface active agent in steps (c) and (e), and in step (f) effecting the destabilization by coagulating the combined aqueous dispersion of intraleucospheruloid pigment and organic color pigment with water soluble coagulant selected from the class consisting of water soluble (i) alkaline-earth metal compounds, (ii) aluminum salts, (iii) zinc salts, (iv) oleophilic amine acid salts, and (v) combinations of the foregoing.

29. A process according to claim 1, in which the inorganic pigment composition in step (a) consists essentially of silica pigment composition having primary particles of an average size less than 0.2 microns in diameter and titanium dioxide pigment composition having primary particles of an average size in the range of about 0.2 to 0.1 micron in diameter, in a weight ratio in the range of 1:10 to 10:1.

30. A process according to claim 1, in which the inorganic pigment composition in step (a) consists essentially of silica pigment composition having primary particles of an average size less than 0.1 micron in diameter and titanium dioxide pigment composition having primary particles of an average size less than 0.2 micron in diameter, in a weight ratio in the range of 1:10 to 10:1.

31. A process according to claim 1, in which the selected inorganic pigment composition in step (a) consists essentially of siliceous pigment selected from the sub-class consisting essentially of (a) wet, and dried, paper grade precipitated hydrated silica pigments having primary particles of an average size in the range of 0.1 to 0.2 micron in diameter, (b) wet, and dried, reinforcing grade precipitated hydrated silica pigments having primary particles of an average size in the range of less than 0.1 micron in diameter, and (c) pyrogenic silica pigment.

32. A process according to claim 1, in which the inorganic pigment composition in step (a) consists essentially of titanium dioxide pigment/composition having primary particles of an average size in the range of about 0.2 to 0.1 micron in diameter.

33. A process according to claim 31, in which the titanium dioxide pigment composition in step (a) consists essentially of titanium dioxide pigment having thereon surface modifier selected from the following groups (i) silicas, (ii) alkaline-earth metal silicates, (iii) alkaline-earth metal oxides, (iv) aluminum hydroxide, (v) alumina, (vi) aluminum silicate, (vii) zinc oxide, (viii) zinc silicate, and (ix) combinations of any two or more of the foregoing.

34. A process according to claim 1, in which the inorganic pigment composition in step (a) consists essentially of titanium dioxide pigment composition having primary particles of an average size less than 0.1 micron in diameter.

35. A process as claimed in claim 1, in which the ratio in step (c) is selected to produce intraleucospheruloid pigment dispersion in step (d) in the form of a latex.

36. A process according to claim 7, wherein in step (f) the liquid medium in which the inorganic leuco pigment composition is micronized consists essentially of an aqueous solution of from 1% to 10% by weight of the total of surface active agent set forth in (c).

37. A process according to claim 7, wherein in step (f) the liquid medium in which the inorganic leuco pigment composition is micronized consists essentially of monomer material employed in step (b), and in which the surface active agent material employed in step (b) is dissolved in sufficient water to provide an emulsion polymerization system in step (f).

38. An intraleucospheruloid/organic color pigment composition consisting essentially of (a) intraleucospheruloid pigment consisting of spheruloids of organic polymer material cross-linked to essential insolubility in any physical solvent, said polymer material consisting essentially of polymerized monomer material selected from the class consisting of the monoethylenically unsaturated and polyethylenically unsaturated polymerizable compounds, and said spheruloids having primary particles of an average size not exceeding 4 microns in diameter and having embedded therein particulate pigment composition consisting essentially of inorganic leuco pigment material having primary particles of an average size not exceeding 0.2 micron in diameter, and (b) organic color material having primary particles of an average size not exceeding 0.2 micron in diameter, the weight ratio of said intraleucospheruloid pigment to said organic color pigment material in said composition being in the range of 100:1 to 1:100; the weight ratio of said organic polymer material to said pigment composition in (a) being in the range of 100:1 to 1:20, and the inorganic leuco pigment material being selected from the class consisting of the opaque white pigments and the transparent white pigments having refractive indicies different from that of the cross-linked organic polymer of the spheruloids.

39. An intraleucospheruloid/organic color pigment composition according to claim 38 in the form of a wet coagulum.

40. An intraleucospheruloid/organic color pigment composition according to claim 38, in powder form.

41. An intraleucospheruloid/organic color pigment composition according to claim 38, in soft powder form.

42. An intraleucospheruloid/organic color pigment composition according to claim 38, in which the inorganic pigment material consists essentially of silica pigment composition having primary particles of an average size in the range of about 0.2 to 0.1 micron in diameter in a weight ratio in the range of 1:10 to 10:1.

43. An intraleucospheruloid/organic color pigment composition according to claim 38, in which the inorganic pigment material consists essentially of silica pigment composition having primary particles of an average size less than 0.2 micron in diameter and titanium dioxide pigment composition having primary particles of an average size in the range of about 0.2 to 0.1 micron in diameter, in a weight ratio in a range of 1:10 to 15:1.

44. An intraleucospheruloid/organic color pigment composition according to claim 38, the inorganic pigment composition thereof being selected from the class consisting of the following groups (1) siliceous pigment compositions selected from (i) the natural silica pigments, (ii) the precipitated silica pigments, (iii) the pyrogenic silica pigments, (vi) the alkaline earth silicate pigments, (v) the aluminum silicate pigments, (vi) the zinc silicate pigments, (vii) the zirconium silicate pigments and (viii) combinations of any two or more of the foregoing; (2) titanium dioxide pigment compositions; (3) pigment compositions selected from (i) alkaline-earth metal carbonate and sulfate pigments, (ii) alumina pigments, (iii) hydrated aluminum oxide pigments, (iv) antimony oxide pigments, (v) zinc oxide pigments, (vi) zirconium oxide pigments and (vii) combinations of any two or more of the foregoing, and (4) combinations of any two or more members selected respectively from classes (1), (2) and (3); the particulate pigment composition containing from 0 to an equal weight of pigment bonding agent material selected from the class consisting of water insoluble deposits from (i) water soluble alkali metal silicates, (ii) water soluble titanium compounds, (iii) water soluble and dispersible aminoplasts preformed and formed in situ, (iv) water soluble and dispersible phenoplasts preformed and formed in situ, (v) water soluble and dispersible organic polymers having carboxyl, amine, sulfate and sulfonic acid groups and salts thereof, and (vi) water soluble and dispersible organic silanes; and the particulate pigment composition having from 0 to an equal weight of nitrogenous material thereon, said nitrogenous material being selected from the class consisting of (i) oleophilic amines, (ii) oleophilic imines, (iii) oleophilic amine carboxylates, (iv) the oleophilic quaternary ammonium compounds, (v) water soluble polyamines, (vi) water soluble polyimines, and (vii) combinations of two or more members of the foregoing.

45. An intraleucospheruloid pigment composition according to claim 44, in which the particulate pigment composition has thereon at least 2%, based on the weight thereof, of pigment bonding agent material.

46. An intraleucospheruloid pigment composition according to claim 44, in which the particulate pigment composition has thereon at least 2%, based on the weight thereof, of said nitrogenous material.

47. An intraleucospheruloid/organic color pigment composition according to claim 38, in which the inorganic pigment material consists essentially of silica pigment composition selected from the group consisting of (a) wet, and dried, paper grade precipitated hydrated silica pigments having primary particles of an average size in the range of 0.1 to 0.2 micron in diameter, (b) wet, and dried, reinforcing grade precipitated hydrated silica pigments having primary particles of an average size in the range of less than 0.1 micron in diameter, and (c) pyrogenic silica pigment.

48. An intraleucospheruloid/organic color pigment composition according to claim 38, in which the inorganic pigment material consists essentially of titanium dioxide pigment composition having primary particles of an average size in the range of about 0.2 to 0.1 micron in diameter.

49. An intraleucospheruloid/organic color pigment composition according to claim 38, in which the composition further comprises reaction products of anionic surface active agent material with organic material having groups selected from the class consisting of amine and imine groups and salts thereof.

50. An intraleucospheruloid/organic color pigment composition according to claim 38 in which the composition further comprises reaction products of surface active agent having groups selected from the class consisting of amine and imine groups and salts thereof, with organic material having groups selected from the class consisting of carboxyl, sulfate and sulfonic acid groups and salts thereof.

51. A pigment composition according to claim 38, which particles of the intraleucospheruloid/organic color pigment composition have on their spheruloids groups selected from the class consisting of acid groups and their alkali metal and ammonium salts and the organic color material has anionic surface active agent material and which have formed reaction products with water soluble material selected from the class consisting of (i) the alkaline-earth metal salts, (ii) aluminum salts, (iii) zinc salts, (iv) oleophilic amine salts, and (v) combination of the foregoing.

52. A pigment composition according to claim 38, in which particles of the intraleucospheruloid/organic color pigment composition further comprise reaction products of anionic surface active agent with water soluble material selected from the class consisting (i) alkaline-earth metal salts, (ii) aluminum salts, (iii) zinc salts, (iv) oleophilic amine salts, and (v) combinations of the foregoing.

53. An intraleucospheruloid/organic color pigment composition according to claim 38, in which the organic color pigment material consists of an essentially homogenous mixture of two or more chemically different organic color pigments, said intraleucospheruloid/organic color pigment exhibiting a coloration different from that of either of said color pigments.

54. A process according to claim 1, in which
(I) a pigment modifying agent is incorporated in at least one of steps (a), (e) and (f), which pigment modifying agent is selected from the class consisting of pigment bonding agents and nitrogenous materials; and in which
(II) the pigment bonding agents are from the group consisting of (i) water soluble alkali metal silicates precipitated in the presence of at least a part of the pigment composition, (ii) water soluble titanium compounds precipitated in the presence of at least a part of the pigment composition, (iii) water soluble and dispersible aminoplasts preformed and formed in situ and adhered to at least a part of the pigment composition, (iv) water soluble and dispersible phenoplasts preformed and formed in situ and adhered to at least a part of the pigment composition, (v) water soluble and dispersible organic polymers having carboxyl, amine, sulfate and sulfonic acid groups and salts thereof precipitated in the presence of at least a part of the pigment composition, and (vi) water soluble and dispersible organic silanes adhered to at least a part of the pigment composition; and (III) the nitrogenous materials are from the group consisting of (1) oleophilic amines, (ii) oleophilic imines, (ii) oleophilic amine carboxylates, (iv) the oleophilic quaternary ammonium compounds, (v) water soluble polyamines, (vi) water soluble imines, and (vii) combinations of two or more members of the foregoing.

55. A process according to claim 1, in which the inorganic pigment composition is selected from the class consisting of the following groups (1) siliceous pigment compositions selected from (i) the natural silica pigments, (ii) the precipitated silica pigments, (iii) the pyrogenic silica pigments, (iv) the alkaline-earth metal silicate pigments, (v) the aluminum silicate pigments, (vi) the zinc silicate pigments, (vii) the zirconium silicate pigments and (viii) combinations of any two or more of the foregoing; (2) titanium dioxide pigment compositions; (3) pigment compositions selected from the class consisting of the following groups (i) alkaline-earth metal carbonate and sulfate pigments (ii) alumina pigments, (iii) hydratedaluminum oxide pigments, (iv) antimony oxide pigments, (v) zinc oxide pigments, (vi) zironium oxide pigments and (vii) combinations of any two or more of the foregoing, and (4) combinations of any two or more members selected respectively from groups of (1), (2) and (3).

* * * * *